(12) United States Patent
Hayashi

(10) Patent No.: US 8,811,785 B2
(45) Date of Patent: Aug. 19, 2014

(54) MULTI-CORE OPTICAL FIBER

(71) Applicant: Sumitomo Electric Industries, Ltd., Osaka (JP)

(72) Inventor: Tetsuya Hayashi, Yokohama (JP)

(73) Assignee: Sumitomo Electric Industries, Ltd., Osaka-shi, Osaka (JP)

(*) Notice: Subject to any disclaimer, the term of this patent is extended or adjusted under 35 U.S.C. 154(b) by 0 days.

(21) Appl. No.: 13/776,946

(22) Filed: Feb. 26, 2013

(65) Prior Publication Data
US 2013/0243381 A1 Sep. 19, 2013

Related U.S. Application Data

(60) Provisional application No. 61/604,620, filed on Feb. 29, 2012, provisional application No. 61/722,917, filed on Nov. 6, 2012.

(30) Foreign Application Priority Data

Feb. 29, 2012 (JP) .................. 2012-044633
Jul. 10, 2012 (JP) .................. 2012-154940

(51) Int. Cl.
*G02B 6/028* (2006.01)
*G02B 6/036* (2006.01)

(52) U.S. Cl.
USPC .......................................... 385/124; 385/126

(58) Field of Classification Search
USPC .......................................................... 385/126
See application file for complete search history.

(56) References Cited

U.S. PATENT DOCUMENTS

2011/0206331 A1* 8/2011 Imamura ................... 385/127

OTHER PUBLICATIONS

G. Bosco et al., "Analytical results on channel capacity in uncompensated optical links with coherent detecetion", Optics Express, vol. 19, No. 26, 2011, p. B438-p. B449.
T. Hayashi et al., "Characterization of Crosstalk in Ultra-Low-Crosstalk Multi-Core Fiber", Journal of Lightwave Technology, vol. 30, No. 4, Feb. 15, 2012, p. 583-p. 589.
T. Hayashi et al., "Low-Loss Large-Aeff and Low-crosstalk Multi-core Fiber Enabling High SNR", The 2003 IEICE Society Conference No. 2, Aug. 28, 2012, p. 183.
T. Hayashi et al., "Design and fabrication of ultra-low crosstalk and low-loss multi-core fiber", Optics Express, vol. 19, No. 17, Aug. 2011, p. 16576-p. 16592.
K. Imamura et al., "Trench Assisted Multi-Core Fiber with Large Aeff over 100 μm² and Low Attenuation Loss", ECOC Technical Digest, 2011, p. Mo.1.LeCervin.1.
S. Matsuo et al., "Large-effective-area ten-core fiber with cladding diameter of about 200μm", Optics Letters, vol. 36, No. 23, Dec. 2011, p. 4626-p. 4628.

(Continued)

*Primary Examiner* — Omar Rojas
(74) *Attorney, Agent, or Firm* — Drinker Biddle & Reath LLP

(57) ABSTRACT

The present invention relates to a multi-core optical fiber including a plurality of cores, in each of which an effective area at the wavelength of 1550 nm, a transmission loss at the wavelength of 1550 nm, a chromatic dispersion at the wavelength of 1550 nm, a cable cutoff wavelength, and a bending loss in a bending radius of 30 mm at the wavelength of 1625 nm are set so as to increase a transmission capacity in each core in a state in which a difference of the transmission loss at the wavelength of 1550 nm between different cores is controlled to at most 0.02 dB/km or less.

13 Claims, 92 Drawing Sheets

(56) References Cited

OTHER PUBLICATIONS

H. Takara et al., "1000-km 7-core fiber transmission of 10 x 96-Gb/s PDM-16QAM using Raman amplification with 6.5 W per fiber", Optics Express, vol. 20, No. 9, Apr. 2012, p. 10100-10105.

K. Takenaga et al., "A Large Effective Area Multi-Core Fibre with an Optimised Cladding Thickness", ECOC Technical Digest 2011, p. Mo.1LeCervin.2.

K. Takenaga et al., "A large effective area multi-core fiber with an optimized cladding thickness", Optics Express, vol. 19, No. 26, 2011, p. B543-p. B550.

Y. Yamamoto et al., "A New Class of Optical Fiber to Support Large Capacity Transmission", OSA/OFC/NFOEC, 2011, paper OWA6.

B. Yao et al., "Reduction of Crosstalk by Hole-Walled Multi-Core Fibers", OFC/NFOEC Technical Digest, 2012, p. OM2D.5.

* cited by examiner

MULTI-CORE OPTICAL FIBER

BACKGROUND OF THE INVENTION

1. Field of the Invention

The present invention relates to a multi-core optical fiber.

2. Related Background of the Invention

A multi-core optical fiber with a plurality of cores extending along the fiber axis (center axis) in a common cladding is expected as an optical transmission line that can transmit a large volume of information. For example, J. Lightwave Technol., Vol. 30, No. 4, pp. 583-589, February 2012 (Non Patent Literature 1), ECOC2011, p. Mo. 1. LeCervin. 1 (Non Patent Literature 2), Opt. Express, Vol. 19, No. 26, pp. B543-B550, November 2011 (Non Patent Literature 3), Opt. Lett., Vol. 36, No. 23, pp. 4626-4628, December 2011 (Non Patent Literature 4), OFC2012, p. OM2D.5 (Non Patent Literature 5), Opt. Express, Vol. 20. No. 9, pp. 10100-10105, April 2012 (Non Patent Literature 6), and OFC2011, paper OWA6 (Non Patent Literature 7), a variety of studies have been conducted for the purpose of transmitting a larger volume of information, on the multi-core optical fiber of this kind.

For increasing the transmission capacity of the multi-core optical fiber (MCF), it is necessary to increase the number of cores forming the multi-core optical fiber or to increase the transmission capacity of each of the individual cores forming the multi-core optical fiber. As methods of the latter, Non Patent Literatures 2 to 5 disclose the studies to increase the effective area ($A_{eff}$) of the multi-core optical fiber. Non Patent Literature 1 discloses MCFs reducing transmission loss and crosstalk, and Non Patent Literature 6 discloses MFCs reducing crosstalk between cores. It is also necessary to investigate an improvement in optical signal-to-noise ratio (OSNR) of signal light after propagation through the cores, for increase in the transmission capacity of each of the individual cores embedded in the MCF. Non Patent Literature 7 describes the study on an improvement in OSNR in a single-core optical fiber.

SUMMARY OF THE INVENTION

The Inventor conducted the research on the conventional multi-core optical fibers and found the problem as described below. Namely, the transmission capacity in each core in the multi-core optical fiber was studied without consideration to influence of crosstalk as noise and was not satisfactorily large when compared to the transmission capacity of one core in the conventional single-core optical fibers.

The present invention has been accomplished in view of the above circumstances and it is an object of the present invention to provide a multi-core optical fiber with a plurality of cores having their respective increased transmission capacities.

In order to achieve the above object, a multi-core optical fiber according to an embodiment of the present invention is a multi-core optical fiber comprising a plurality of cores. Particularly, as a first aspect of the embodiment, each of the cores has an effective core sectional area (which will be referred to hereinafter as effective area) of not less than 120 $\mu m^2$ at the wavelength of 1550 nm, a transmission loss of not more than 0.195 dB/km at the wavelength of 1550 nm, a chromatic dispersion of not less than about 17 ps/(nm·km) at the wavelength of 1550 nm, a cable cutoff wavelength of not more than 1530 nm, and a bending loss per 100 turns of not more than 0.5 dB in a bending radius of 30 mm at the wavelength of 1625 nm. Furthermore, a difference of the transmission loss at the wavelength of 1550 nm between different cores out of the plurality of cores is at most 0.02 dB/km or less.

The multi-core optical fiber according to the first aspect is obtained as a multi-core optical fiber with a sufficient transmission capacity ensured in each core, a large effective area, a reduced transmission loss, a large chromatic dispersion, and little dispersion of properties among the cores.

As a second aspect applicable to the first aspect, a preferred configuration is as follows: a fiber length of the multi-core optical fiber is not less than 100 km and core-to-core crosstalk in the cores is not more than −20 dB. This configuration provides the multi-core optical fiber with further reduced crosstalk.

As a third aspect applicable to at least either one of the first and second aspects, at the wavelength of 1550 nm, a maximum that a sum of statistical averages of crosstalks to a certain core from the other cores out of the plurality of cores after 80 km propagation can take, can be not more than −32.9 dB.

As a fourth aspect of the multi-core optical fiber according to the embodiment, a sum $\eta_{WC}$ [/km] of power coupling coefficients to a first core with the largest crosstalk from other cores, from the other cores out of the plurality of cores in the multi-core optical fiber according to the fourth aspect, a chromatic dispersion D [ps/(nm·km)] of the first core, an effective area $A_{eff}$ [$\mu m^2$] of the first core, and a transmission loss $\alpha_{dB}$ [dB/km] of the first core preferably satisfy a relation of Expression (1) below at the wavelength of 1550 nm.

$$\eta_{WC} \le 1.57 \times 10^{-5}\left[0.71 - 1.39\frac{(10^{10\alpha_{dB}} - 1)}{(|D|A_{eff}^2 \alpha_{dB} 10^{10\alpha_{dB}})^{\frac{1}{3}}}\right] \quad (1)$$

As a multi-core optical fiber (comprising a plurality of cores) according to a fifth aspect, under a condition of a fiber length of 80 km, a sum $\mu_{X,WC}^{[dB]}$ [dB] of statistical averages of crosstalks to a first core with the largest crosstalk from other cores, from the other cores out of the plurality of cores, a chromatic dispersion D [ps/(nm·km)] of the first core, an effective area $A_{eff}$ [$\mu m^2$] of the first core, and a transmission loss $\alpha_{dB}$ [dB/kmm] of the first core preferably satisfy a relation of Expression (2) below at the wavelength of 1550 nm.

$$-49.3 \le \frac{10}{3}\log_{10}\left[|D|A_{eff}^2 \frac{\alpha_{dB} 10^{8\alpha_{dB}}}{(10^{8\alpha_{dB}} - 1)^3}\right] + \mu_{X,WC}^{[dB]} \le -31.8 \quad (2)$$

As a multi-core optical fiber (comprising a plurality of cores) according to a sixth aspect, each of the cores preferably has an effective area of not less than 80 $\mu m^2$ at the wavelength of 1550 nm, a transmission loss of not more than 0.195 dB/km at the wavelength of 1550 nm, a chromatic dispersion of not less than about 17 ps/(nm·km) at the wavelength of 1550 nm, a cable cutoff wavelength of not more than 1530 nm, and a bending loss per 100 turns of not more than 0.5 dB in a bending radius of 30 mm at the wavelength of 1625 nm. Furthermore, the following configuration is preferable in this sixth aspect: at the wavelength of 1550 nm, a maximum that a sum of statistical averages of crosstalks to a certain core from other cores out of the plurality of cores after 80 km propagation can take is from −53.4 dB to −33.9 dB and a difference of the transmission loss at the wavelength of 1550 nm between different cores is at most 0.02 dB/km or less.

The multi-core optical fiber according to the sixth aspect is also obtained as a multi-core optical fiber with a sufficient transmission capacity ensured in each core, a large effective area, a reduced transmission loss, a large chromatic dispersion, and little dispersion of properties among the cores.

As a seventh aspect applicable to at least any one of the first to sixth aspects, a preferred configuration is as follows: when κ represents a mode coupling coefficient between different cores out of the plurality of cores, Λ a core pitch, and β a propagation constant of each core, $\Lambda_{th}$ is defined as Λ satisfying Expression (3) below:

$$\frac{\kappa^2}{\Lambda} = \frac{\beta}{12}10^{-6}; \quad (3)$$

the plurality of cores in the multi-core optical fiber according to the seventh aspect include a core of a structure satisfying any one of conditions that $\Lambda_{th}$ is not more than 44.4 μm at the wavelength of 1550 nm, that $\Lambda_{th}$ is not more than 44.9 μm at the wavelength of 1565 nm, and that $\Lambda_{th}$ is not more than 46.7 μm at the wavelength of 1625 nm; and the shortest Λ between different cores out of the plurality of cores is not less than $\Lambda_{th}$.

The multi-core optical fiber according to the seventh aspect has the sufficiently large transmission capacity in each core and the core pitch between adjacent cores smaller than those of the conventional step-index type optical fibers.

As an eighth aspect applicable to at least any one of the first to seventh aspects, a preferred configuration is as follows: a core neighboring region including at least any one of the plurality of cores in the multi-core optical fiber has a trench type structure comprised of a cladding (common cladding) surrounding an outer peripheral surface of a certain core and having a refractive index lower than the core, a trench layer provided between the core and the cladding and having a refractive index lower than the cladding, and an inner cladding layer provided between the trench layer and the core and having a refractive index higher than the trench layer and lower than the core.

When the trench type structure is adopted in the core neighboring region as in the eighth aspect, it becomes easier to realize the multi-core optical fiber with the increased transmission capacity in each core.

As a ninth aspect applicable to at least any one of the first to eighth aspects, the cable cutoff wavelength is preferably not less than 1460 mm. When the cable cutoff wavelength is set in the foregoing range, the core pitch in the multi-core optical fiber can be set smaller.

As a tenth aspect applicable to at least any one of the first to eighth aspects, the cable cutoff wavelength may be not less than 1360 nm and not more than 1460 nm. In this case, the multi-core optical fiber is obtained as one with the reduced core pitch while being applicable to the S-band.

As an eleventh aspect applicable to at least any one of the first to sixth aspects, a core neighboring region including at least any one of the cores in the multi-core optical fiber is comprised of a cladding (common cladding) surrounding an outer peripheral surface of a certain core and having a refractive index lower than the core, a trench layer provided between the core and the cladding and having a refractive index lower than the cladding, and an inner cladding layer provided between the trench layer and the core and having a refractive index higher than the trench layer and lower than the core. In this configuration, when Ra represents a ratio of an outside diameter of the core (core diameter) to an outside diameter of the inner cladding layer (inner cladding diameter), Δ1 a relative index difference of the core with respect to a certain refractive index, Δ3 a relative index difference of the trench layer with respect to the certain refractive index, and Δ4 a relative index difference of the cladding with respect to the certain refractive index, Ra, Δ1, Δ3, and Δ4 preferably satisfy either: a first condition (Ra of not less than about 0.5, Δ3−Δ4 of not more than about −0.53%, and Δ1−Δ4 of not more than about 0.28%); or, a second condition (Ra of not less than about 0.6, Δ3−Δ4 of not more than about −0.51%, and Δ1−Δ4 of not more than about 0.30%).

The foregoing eleventh aspect enables implementation of the multi-core optical fiber of the trench type structure with the core pitch smaller than in the conventional step-index type multi-core optical fibers.

In a twelfth aspect applicable to at least any one of the first to sixth aspects, as a configuration effectively achieving the foregoing action, a core neighboring region including at least any one of the plurality of cores in the multi-core optical fiber is comprised of a cladding (common cladding) surrounding an outer peripheral surface of a certain core and having a refractive index lower than the core, a trench layer provided between the core and the cladding and having a refractive index lower than the cladding, and an inner cladding layer provided between the trench layer and the core and having a refractive index higher than the trench layer and lower than the core. In this configuration, when 2a represents an outside diameter of the core (core diameter), Ra a ratio of the outside diameter 2a of the core to an outside diameter of the inner cladding layer (inner cladding diameter), Rb a ratio of the outside diameter of the inner cladding layer to an outside diameter of the trench layer (trench diameter), Δ1 a relative index difference of the core with respect to a certain refractive index, Δ2 a relative index difference of the inner cladding layer with respect to the certain refractive index, Δ3 a relative index difference of the trench layer with respect to the certain refractive index, and Δ4 a relative index difference of the cladding with respect to the certain refractive index, 2a, Ra, Rb, Δ1, Δ2, Δ3, and Δ4 preferably satisfy the following relations:

12.1 ≤ 2a(μm) ≤ 13.3;

0.496 ≤ Ra ≤ 0.739;

0.713 ≤ Rb;

0.21 ≤ Δ1(%) ≤ 0.28;

−0.07 ≤ Δ2(%) ≤ 0.04;

−1.62 ≤ Δ3(%);

−0.02 ≤ Δ4(%) ≤ 0.05.

As a thirteenth aspect applicable to the twelfth aspect, a core pitch between the cores in the multi-core optical fiber is preferably not less than 43.3 μm. In this case, it is feasible to realize reduction of crosstalk.

In a fourteenth aspect applicable to at least any one of the first to sixth aspects, as another configuration effectively achieving the foregoing action, a core neighboring region including at least any one of the plurality of cores in the multi-core optical fiber is comprised of a cladding (common cladding) surrounding an outer peripheral surface of a certain core and having a refractive index lower than the core, a trench layer provided between the core and the cladding and having a refractive index lower than the cladding, and an inner cladding layer provided between the trench layer and the core and having a refractive index higher than the trench layer and lower than the core. In this configuration, when 2a represents an outside diameter of the core (core diameter), Ra a ratio of the outside diameter 2a of the core to an outside diameter of the inner cladding layer (inner cladding diameter), Rb a ratio of the outside diameter of the inner cladding layer to an outside diameter of the trench layer (trench diameter), Δ1 a relative index difference of the core with respect to a certain refractive index, Δ2 a relative index difference of the inner cladding layer with respect to the certain refractive index, Δ3 a relative index difference of the trench layer with respect to the certain refractive index, and Δ4 a relative index difference of the cladding with respect to the certain refractive index, 2a, Ra, Rb, Δ1, Δ2, Δ3, and Δ4 preferably satisfy the following relations:

$11.7 \leq 2a(\mu m) \leq 12.4;$ $0.596 \leq Ra \leq 0.699;$ $0.618 \leq Rb \leq 0.787;$ $0.18 \leq \Delta 1(\%) \leq 0.22;$ $-0.05 \leq \Delta 2(\%) \leq 0.02;$ $-0.59 \leq \Delta 3(\%) \leq -0.25;$ $-0.01 \leq \Delta 4(\%) \leq 0.04.$ As a fifteenth aspect applicable to the fourteenth aspect, a core pitch between the cores in the multi-core optical fiber is preferably not less than 34.9 μm. In this case, it is feasible to realize reduction of crosstalk.

Furthermore, in a sixteenth aspect applicable to at least any one of the first to sixth aspects, as still another configuration effectively achieving the foregoing action, a core neighboring region including at least any one of the plurality of cores in the multi-core optical fiber is comprised of a cladding (common cladding) surrounding an outer peripheral surface of a certain core and having a refractive index lower than the core, a trench layer provided between the core and the cladding and having a refractive index lower than the cladding, and an inner cladding layer provided between the trench layer and the core and having a refractive index higher than the trench layer and lower than the core. In this configuration, when 2a represents an outside diameter of the core (core diameter), Ra a ratio of the outside diameter 2a of the core to an outside diameter of the inner cladding layer (inner cladding diameter), Rb a ratio of the outside diameter of the inner cladding layer to an outside diameter of the trench layer (trench diameter), Δ1 a relative index difference of the core with respect to a certain refractive index, Δ2 a relative index difference of the inner cladding layer with respect to the certain refractive index, Δ3 a relative index difference of the trench layer with respect to the certain refractive index, and Δ4 a relative index difference of the cladding with respect to the certain refractive index, 2a, Ra, Rb, Δ1, Δ2, Δ3, and Δ4 preferably satisfy the following relations:

$11.7 \leq 2a(\mu m) \leq 13.2;$ $0.537 \leq Ra \leq 0.704;$ $0.623 \leq Rb \leq 0.792;$ $0.20 \leq \Delta 1(\%) \leq 0.26;$ $-0.06 \leq \Delta 2(\%) \leq 0.10$ $-0.83 \leq \Delta 3(\%) \leq -0.32;$ $-0.03 \leq \Delta 4(\%) \leq 0.02.$ As a seventeenth aspect applicable to the sixteenth aspect, a core pitch between the plurality of cores in the multi-core optical fiber is preferably not less than 38.7 μm. In this case, it is feasible to realize reduction of crosstalk.

DESCRIPTION OF THE PREFERRED EMBODIMENTS

Embodiments of the present invention will be described below in detail with reference to the accompanying drawings. The same elements will be denoted by the same reference signs in the description of the drawings, without redundant description.

Figure 1:
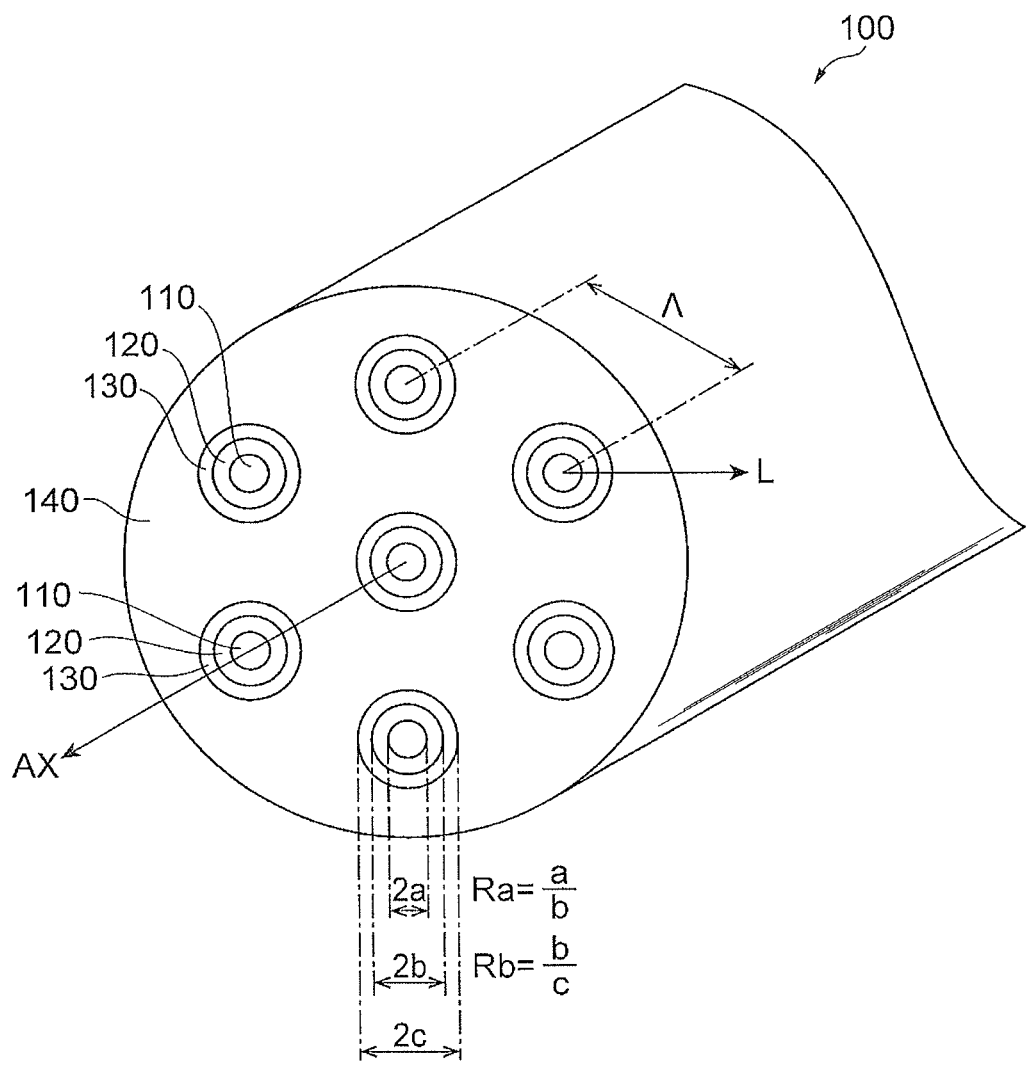
FIG. 1 is a drawing showing an example of a cross-sectional structure of a multi-core optical fiber according to an embodiment of the present invention.
Figure 2:
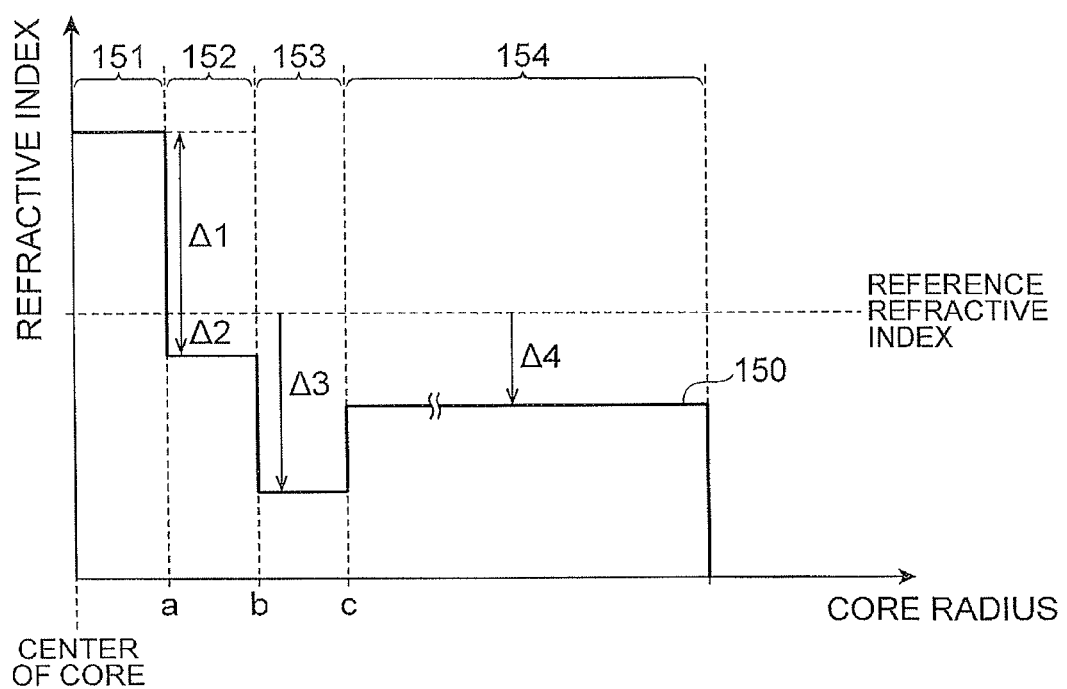
FIG. 2 is a refractive index profile of each core and its peripheral region.

FIG. 1 is a drawing showing a cross-sectional configuration of a multi-core optical fiber 100 (7-core fiber) including seven cores, as an example of the multi-core optical fiber according to the present embodiment. FIG. 2 is a refractive index profile of each core 110 and its surrounding region.

The multi-core optical fiber 100 of the example shown in FIG. 1 includes seven cores 110 and each of these cores 110 has a structure surrounded by a common cladding 140 (which will be referred to hereinafter simply as cladding) having a refractive index lower than each core 110. A trench layer 130 having a refractive index lower than the cladding 140 is provided between an outer peripheral surface of each core 110 and the cladding 140, and an inner cladding layer 120 having a refractive index higher than the trench layer 130 and lower than each core 110 is provided between the outer peripheral surface of each core 110 and the trench layer 130. Each core 110 has an outside diameter 2a, the inner cladding layer 120 has an outside diameter 2b, and the trench layer 130 has an outside diameter 2c. The inner cladding layer 120 and the trench layer 130 have a ring-like cross-sectional shape, as shown in FIG. 1, and their respective outside diameters are defined by diameters of their outside contours. A ratio Ra of the outside diameter 2a of each core 110 to the outside diameter 2b of the inner cladding layer 120 is given by a/b, and a ratio Rb of the outside diameter 2b of the inner cladding layer 120 to the outside diameter 2c of the trench layer 130 by b/c. Furthermore, a distance Λ (core pitch) between neighboring cores between which crosstalk can occur, is defined by a center-to-center distance between the neighboring cores.

FIG. 2 is the index profile of each core 110 and its surrounding region shown in FIG. 1, which shows the refractive indices of the respective parts on a line L in FIG. 1. This index profile 150 is separated into region 151 corresponding to the core 110, region 152 corresponding to the inner cladding layer 120, region 153 corresponding to the trench layer 130, and region 154 corresponding to the cladding 140. Relative index differences with respect to a reference refractive index, of the respective parts of core 110, inner cladding layer 120, trench layer 130, and cladding 140 are represented by Δ1, Δ2, Δ3, and Δ4, respectively.

Next, the multi-core optical fiber 100 according to the present embodiment is a transmission medium with an increased transmission capacity of each core 110, and the below will first describe problems in the conventional multi-core optical fibers.

For increasing the transmission capacity of a multi-core fiber (MCF), it is necessary to increase the number of embedded cores or to increase the transmission capacities of the individual cores embedded in the MCF. For increasing the transmission capacities of the individual cores embedded in the MCF, it is necessary to increase a signal-to-noise ratio (SNR) of signal light after propagation through each core and thereby allow increase in modulation order. For improving the SNR, it is necessary to enhance the intensity of signal light input into each core or to reduce a transmission loss of the core so as to reduce noise due to signal amplification. Since noise due to non-linear phenomena increases with increase in intensity of signal light input into the core, the SNR can degrade in some cases on the contrary. A countermeasure against it is to increase the effective area $A_{eff}$ or to use a material with a small non-linear refractive index $n_2$, thereby reducing the non-linearity of the core. By this, the noise due to the non-linear phenomena can be suppressed even with incidence of signal light of greater intensity.

In the case of the MCF, however, core-to-core crosstalk (XT) is further added as a noise source and therefore the improvement of SNR cannot be achieved without consideration to influence of XT on SNR. This will be discussed below.

According to "G. Bosco, P. Poggiolini, a. Carena, V. Curri, and F. Forghieri, "Analytical results on channel capacity in uncompensated optical links with coherent detection," Opt. Express, vol. 19, no. 29, pp. B438-B449, November 2011. (Reference Literature 1)," it is known that the signal-to-noise ratio (SNR) of a Nyquist wavelength division multiplexing (WDM) transmission link (SC transmission link) composed of a single core (SC)-single mode fiber (SMF) and an erbium-doped optical fiber amplifier (EDFA) is expressed by Expressions (101) to (104) below.

$$SNR_{SC} = \frac{P_{signal}}{P_{noise}} = \frac{P_{Tx,ch}}{P_{ASE}|_{B_n=R_S} + P_{NLI}|_{B_n=R_S}} \quad (101)$$

$$P_{ASE} = N_s F G h \nu B_n, \quad P_{NLI} \approx N_{NLI} P_{Tx,ch}^3 \quad (102)$$

$$G = \exp(\alpha L_s) - 1 = 10^{\frac{\alpha_{dB} L_s}{10}} - 1 \approx \exp(\alpha L_s) = 10^{\frac{\alpha_{dB} L_s}{10}}, \quad (103)$$
$$(G \gg 1)$$

$$N_{NLI} \approx \left(\frac{2}{3}\right)^3 N_s \gamma^2 L_{eff} \frac{\ln(\pi^2|\beta_2|L_{eff} N_{ch}^2 R_s^2)}{\pi|\beta_2| R_s^3} B_n \quad (104)$$

Concerning the SNR of a similar transmission link (MC transmission link) constructed using a multi-core (MC) fiber instead of the SC fiber, the core-to-core crosstalk (XT) is considered to be noise, which has not been taken into consideration heretofore, and the SNR of a certain core (a core with the largest XT to that core/first core) in the MCF can be expressed by Expressions (105), (106) below.

$$SNR_{MC} = \frac{P_{Tx,ch} - P_{XT}}{P_{ASE}|_{B_n=R_S} + R_{NLI}|_{B_n=R_S} + P_{XT}} \approx \quad (105)$$
$$\frac{P_{Tx,ch}}{P_{ASE}|_{B_n=R_S} + P_{NLI}|_{B_n=R_S} + R_{XT}},$$
$$(P_{XT} \ll P_{Tx,ch})$$

$$P_{XT} = \quad (106)$$
$$\mu_{X,WC} P_{Tx,ch} \approx \left[\sup\left\{\sum_{m \neq n} \eta_{nm}\right\} N_s L_s\right] P_{Tx,cn} \approx [(N_c \eta) N_s L_s] P_{Tx,ch},$$
$$(\mu_{X,WC} \ll 1)$$

The parameters in the foregoing Expressions (101) to (106) are as described in Table 1 below. $\eta_{WC} = \sup\{\Sigma \eta_{nm}\}$ represents the upper limit of values that $\Sigma \eta_{nm}$ can take. Furthermore, $\eta_{nm}$ is a power coupling coefficient per unit length from core m to core n.

In the foregoing Expression (105), "$-P_{XT}$" in the term with the numerator of "$P_{Tx,ch} - P_{XT}$" indicates that the signal light power is reduced because of XT to the other cores. That term has the denominator including "$+P_{XT}$," and this indicates that noise increases because of XT from the other cores. The foregoing Expression (106) is valid as long as XT is small. The below will discuss the scope in which Expressions (105), (106) hold with $\mu_{X,WC}$ being −20 dB.

TABLE 1

| | |
|---|---|
| $P_{signal}$ | signal light power (time average) |
| $P_{noise}$ | noise light power (time average) |
| $P_{Tx,ch}$ | transmission power per channel (time average) |
| $P_{ASE}$ | power of ASE noise in band $B_n$ (time average) |
| $P_{NLI}$ | power of non-linear noise in band $B_n$ (time average) |
| $P_{XT}$ | power of noise due to core-core XT (time average) |
| $N_s$ | number of spans |
| $L_s$ | span length |
| $\alpha$ | loss coefficient [/unit length] |
| $\alpha_{dB}$ | loss coefficient [dB/unit length] |
| F | noise figure (NF) of EDFA (F linear value; $F_{dB}$ decibel value) |
| h | Planck's constant |
| $\nu$ | center frequency of entire band of WDM |
| $N_{ch}$ | number of WDM channels |
| $\gamma$ | non-linear coefficient $\gamma = 2\pi n_2/\lambda A_{eff})$ $n_2$: non-linear refractive index |
| $\beta_2$ | second order differential $\partial^2\beta/\partial\omega^2$[(unit time)$^2$/unit length] of propagation coefficient $\beta$ by angular rate $\omega$; can be represented by $\beta_2 = -\lambda^2 D/(2\pi c)$ D: chromatic dispersion [unit time/(unit length)$^2$] $\lambda$: wavelength |

TABLE 1-continued

| | |
|---|---|
| | c: velocity of light in vacuum |
| $L_{eff}$ | effective length $L_{eff} = [1 - \exp(-\alpha L_s)]/\alpha$ |
| $R_s$ | symbol rate |
| $\mu_{X,WC}$ | sum (statistical average) of XTs to core with worst XT (Worst Core) |
| $N_c$ | maximum number of neighboring cores |
| $\eta$ | power coupling coefficient per unit length |

It is seen herein from the foregoing Expressions (101), (105), and (106) that relations of Expressions (107a), (107b) below hold.

$$SNR_{MC}^{-1} = SNR_{SC}^{-1} + \mu_{X,WC} \quad (107a)$$

$$\frac{SNR_{SC}}{SNR_{MC}} = 1 + SNR_{SC}\mu_{X,WC} \quad (107b)$$

It is found herein from Expression (107a) that $SNR_{MC}$ without any XT is $SNR_{SC}$. Furthermore, Expression (107b) corresponds to a linear value of SNR penalty due to XT. In the both cases of SC/MC transmission links, the SNR is maximized with $P_{Tx,ch} = [P_{ASE}/2N_{NLI}]^{1/3}$ and their maxima are represented by Expressions (108), (109) below.

$$SNR_{SC,max} = \left[3\left(\frac{P_{ASE}}{2}\right)^{\frac{2}{3}} N_{NLI}^{\frac{1}{3}}\right]^{-1}\Bigg|_{B_n=B_s} \quad (108)$$

$$SNR_{MC,max} = \left[3\left(\frac{P_{ASE}}{2}\right)^{\frac{2}{3}} N_{NLI}^{\frac{1}{3}} + \mu_{X,WC}\right]^{-1}\Bigg|_{B_n=R_s} \quad (109)$$

By substituting Expressions (102), (103), and (106) into the foregoing Expressions (108), (109) and rearranging them, we obtain Expressions (110), (111) below.

$$SNR_{SC,max} \approx \left\{2^{\frac{1}{3}} N_s [FGh\nu\gamma L_{eff}]^{\frac{2}{3}} \left[\frac{\ln(\pi^2|\beta_2|L_{eff}N_{ch}^2 R_s^2)}{\pi|\beta_2|L_{eff}}\right]^{\frac{1}{3}}\right\}^{-1} \quad (110)$$

$$SNR_{MC,max} \approx \quad (111)$$
$$N_s^{-1}\left\{2^{\frac{1}{3}}[FGh\nu\gamma L_{eff}]^{\frac{2}{3}}\left[\frac{\ln(\pi^2|\beta_2|L_{eff}N_{ch}^2 R_s^2)}{\pi|\beta_2|L_{eff}}\right]^{\frac{1}{3}} + \eta_{WC}L_s\right\}^{-1}$$

In Expressions (110), (111), the interior of the ln( ) term includes fiber-related parameters, system parameters, and so on, but, with a sufficiently large WDM band ($N_{ch}R_s$), a small parameter change will cause little change in SNR and is thus negligible. Then Expression (110) can be rearranged like Expression (112). $C_{system}$ herein is a constant not related to the parameters of the optical fiber (including the system parameters and the ln( ) term).

$$SNR_{SC,max}^{[dB]} = \frac{10}{3}\log_{10}\left[|D|\left(\frac{A_{eff}}{n_2}\right)^2\right] - \frac{10}{3}\log_{10}(G^2 L_{eff}) + C'_{system} \quad (112)$$
$$= \frac{10}{3}\log_{10}\left[|D|\left(\frac{A_{eff}}{n_2}\right)^2 \alpha \frac{e^{\alpha L_s}}{(e^{\alpha L_s}-1)^3}\right] + C'_{system}$$

$$= \frac{10}{3}\log_{10}\left[|D|\left(\frac{A_{\it eff}}{n_2}\right)^2 \frac{\alpha_{dB}10^{\alpha_{dB}L_s/10}}{(10^{\alpha_{dB}L_s/10}-1)^3}\right] + C_{system}$$

Now, a difference ($\Delta SNR_{SC}$) of $SNR_{SC,max}$ [dB] between different SC fibers can be approximately calculated using Expression (112). $\Delta SNR_{SC}$ is obtained by canceling out all the system parameters except for $L_s$ and the difference ($\Delta SNR_{SC}$) of maximum SNR of the system due to the difference of fibers can be expressed by only the fiber parameters. In the case of the MC transmission link, $SNR_{MC,max}$ [dB] cannot be rearranged into a simple expression like Expression (112), but it can be confirmed from Expression (111) that $\Delta SNR_{MC}$ is independent of $N_s$ (which is canceled out during the calculation).

The above results tell us the following five points.
(1) The fiber-caused SNR improvement $\Delta SNR_{SC}$ of the SC transmission link can be expressed by the span length $L_s$ and the fiber parameters (D, $A_{\it eff}$, $n_2$, $\alpha$, $L_{\it eff}$) only.
(2) The fiber-caused SNR improvement $\Delta SNR_{MC}$ of the MC transmission link is hard to be simplified, different from $\Delta SNR_{SC}$, and is dependent on the system parameters.
(3) Without XT, $SNR_{MC}$ of the MC transmission link is $SNR_{SC}$, and $\Delta SNR_{MC}$ is $\Delta SNR_{SC}$.
(4) $\Delta SNR_{SC}$ and $\Delta SNR_{MC}$ both are independent of the number of spans $N_s$.
(5) If we find "$SNR_{SC}$ as SNR with XT being ignored" and "$\mu_{X,WC} \approx N_c \eta L_s$" after propagation through one span, we can derive $SNR_{MC}$ in the MC transmission link and can obtain the SNR improvement $\Delta SNR_{MC}$ independent of the number of spans.

For investigating effects of the various fiber parameters on $\Delta SNR_{MC}$, let us evaluate maximum SNR improvements $\Delta SNR_{MC}$ of systems using various MCFs described in published literatures, with respect to a maximum SNR of a system using a standard SMF. The properties of the various MCFs are provided in Table 2.

and Low Attenuation Loss," in Eur. CONF. Opt. Commun. (ECOC), 2011, p. Mo. 1. LeCervin. 1.
iii) K. Takenaga, Y. Arakawa, Y. Sasaki, S. Tanigawa, S. Matsuo, K. Saitoh, and M. Koshiba, "A large effective area multi-core fiber with an optimized cladding thickness," Opt. Express, vol. 19, no. 26, pp. B543-B550, November 2011.
iv) S. Matsuo, K. Takenaga, Y. Arakawa, Y. Sasaki, S. Tanigawa, K. Saitoh, and M. Koshiba, "Large-effective-area ten-core fiber with cladding diameter of about 200 μm," Opt. Lett., vol. 36, no. 23, pp. 4626-4628, December 2011.
v) B. Yao, K. Ohsono, N. Shiina, F. Koji, A. Hongo, E. H. Sekiya, and K. Saito, "Reduction of Crosstalk by Hole-Walled Multi-Core Fibers," in Opt. Fiber Commun. CONF. (OFC), 2012, p.OM2D.5.
vi) H. Takara, H. Ono, A. Yoshiteru, H. Masuda, K. Takenaga, S. Matsuo, H. Kubota, K. Shibahara, T. Kobayashi, and Y. Miyamoto, "Ultra-High Capacity WDM Transmission Using Spectrally-Efficient PDM16-QAM Modulation and C- and EXTended L-Band Wideband Optical Amplification," Opt. Express, vol. 20, no. 9, pp. 10100-10105, April 2012.

Figure 92:
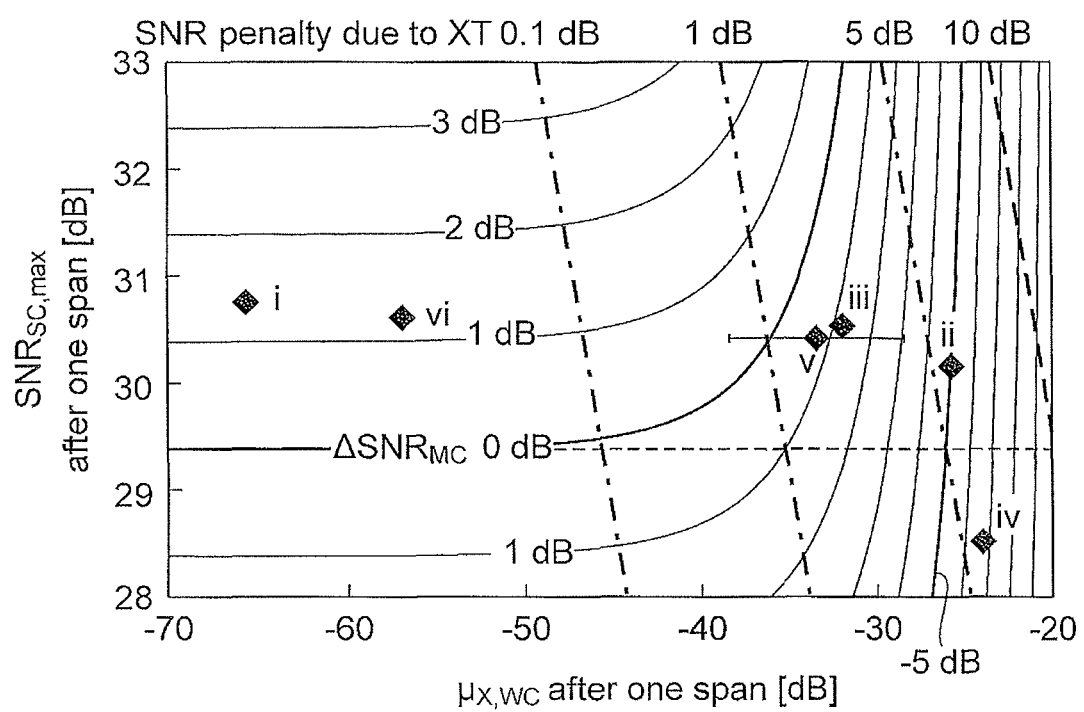
FIG. 92 is a drawing showing influence of $SNR_{SC,max}$ and $\mu_{X,WC}$ after propagation through one span on SNR, on the assumption of $N_{ch}R_s$=10 THz.

FIG. 92 shows the effects of $SNR_{SC,max}$ and $\mu_{X,WC}$ after propagation through one span on SNR on the assumption of $N_{ch}R_s$=10 THz. In FIG. 92, dash-dotted lines represent contours of SNR penalty due to XT ($SNR_{SC}$/$SNR_{MC}$, Expression (107b)), a dashed line represents $SNR_{SC,max}$ ($\Delta SNR_{SC}$=0) of the standard SMF, and solid lines represent contours of SNR improvement $\Delta SNR_{MC}$ with respect to the standard SMF, of individual cores in each MCF with consideration to XT. Rhombic marks represent correspondences between "$SNR_{SC,max}$ after propagation through one span (on the vertical axis)" and "$\mu_{X,WC}$ after propagation through one span (on the horizontal axis)" of the respective fibers described in Table 2.

FIG. 92 suggests the following points.
(A) At the points of all the MCFs except for the MCF of the source (iv) with a large loss, the positions on the vertical axis

TABLE 2

| Fiber type (MCF i-vi) | $\alpha_{dB}$ [dB/km] | $A_{\it eff}$ [μm²] | D [ps/(nm · km)] | $\mu_X$ [dB] between two adjacent cores | Fiber length [km] | $N_c$ | $N_c\eta$ [/km] | $\mu_{X,WC}$ [dB] after 80 km propagation | $\mu_{X,WC}$ [dB] after 100 km propagation |
|---|---|---|---|---|---|---|---|---|---|
| standard SMF | 0.195 | 80 | 16.7 | | | 0 | 0 | 0 | 0 |
| MCF i | 0.178*¹ | 80*¹ | 22.2*¹ | −79.5*¹ | 17.4 | 6 | ~3 × 10⁻⁹ | −65.7*³ | −64.7*³ |
| MCF ii | 0.20 | 102 | N/A*² | ~−53.5 | ~0.8 | 6 | ~3 × 10⁻⁵ | ~−25.7 | ~−24.7 |
| MCF iii | 0.198 | 112.4 | N/A*² | −56 | 1.905 | 6 | ~8 × 10⁻⁶ | −32 | −31 |
| MCF iv | 0.242 | 116 | N/A*² | −40 | 3.962 | 2 | ~5 × 10⁻⁵ | −24 | −23 |
| MCF v*⁴ | 0.214*¹ | 133.4*¹ | 20.6*¹ | −48.5 | 5.0 | 2 | ~7 × 10⁻⁷ | −33.4 | −32.4 |
| MCF vi | 0.195*⁵ | 110 | 20.65*⁵ | −65 | 75 | 6 | ~3 × 10⁻⁸ | −56.9 | −56.0 |

*¹average over all cores.
*²21 ps/(nm · km) assumed in calculation.
*³value directly calculated from total average crosstalk to the center core.
*⁴Since XT-related values were values not subjected to statistical averaging (wavelength averaging), the calculation was conducted on the assumption that $\mu_X$ between two adjacent cores was the median of dB values of XT between two adjacent cores.
*⁵the medium among all cores.
**$n_2$: 2.2 × 10⁻²⁰ m²/W assumed for PSCF, and 2.34 × 10⁻²⁰ m²/W assumed for Ge-doped fiber.

The sources of the MCFs described in Table 2 are as listed below.
i) T. Hayashi, T. Taru, O. Shimakawa, T. Sasaki, and E. Sasaoka, "Characterization of Crosstalk in Ultra-Low-Crosstalk multi-Core Fiber," J. Lightwave Technol., vol. 30, no. 4, pp. 583-589, February 2012.

ii) K. Imamura, K. Mukasa, and R. Sugizaki, "Trench Assisted Multi-Core Fiber with Large Aeff over 100 μm² are higher than that of the standard SMF and it is considered that SNR ($SNR_{SC, max}$) is improved without consideration to XT.

(B) With the MCFs of the sources (ii) to (iv), however, $\mu_{X,WC}$ is too large and it is therefore considered that even if $SNR_{SC,max}$ is better than that of the standard SMF, $SNR_{MC,max}$ becomes worse than SNR of the standard SMF because of the SNR penalty due to XT.

(C) The SNR penalty due to XT shows a drastic increase when $\mu_{X,WC}$ exceeds a specific threshold range and the threshold varies depending upon the value of $SNR_{SC,max}$. This is because $\mu_{X,WC}$ needs to be sufficiently smaller than the ASE noise and non-linear noise, in order to keep $\Delta SNR_{MC}$ from being affected by XT. On the other hand, it is seen that suppression of $\mu_{X,WC}$ more than necessary results in little contribution to $\Delta SNR_{MC}$ improvement.

(D) Concerning the MCF of the source (i) and the MCF of the source (vi), the suppression of $\mu_{X,WC}$ is considered to be excessive. The reason for it is that the suppression of $\mu_{X,WC}$ requires decrease of $A_{\text{eff}}$ and increase of core pitch and it can cause degradation of SNR and large decrease of core density.

The below will more quantitatively discuss desired "$\mu_{X,WC}$" and "relations between fiber parameters and $\mu_{X,WC}$," for SNR improvement (or for prevention of degradation). On the basis of Expression (107b), Expression (113) below needs to be satisfied, in order to keep $SNR_{penalty}$ [dB] as the SNR penalty due to XT in a specific range, i.e., in the range of $SNR_{penalty,min}$ [dB]$\leq SNR_{penalty}$ [dB]$\leq SNR_{penalty,max}$ [dB]. In this expression, $SNR_{SC}^{-1}$ is a ratio of ASE and non-linear noise to signal. By converting Expression (113) into decibel expression and approximately rewriting it, it can be rewritten into Expressions (114a) to (114c) below.

$$\left(10^{SNR_{penalty,min}^{[dB]}/10} - 1\right) SNR_{SC,max}^{-1} \leq \qquad (113)$$
$$\mu_{X,WC} \leq \left(10^{SNR_{penalty,max}^{[dB]}/10} - 1\right) SNR_{SC,max}^{-1}$$

$$10\log_{10}\left(10^{SNR_{penalty,max}^{[dB]}/10} - 1\right) - SNR_{SC,max}^{[dB]}\Big|_{MCF} \leq \mu_{X,WC}^{[dB]} \leq \qquad (114a)$$
$$10\log_{10}\left(10^{SNR_{penalty,max}^{[dB]}/10} - 1\right) - SNR_{SC,max}^{[dB]}\Big|_{MCF}$$

$$C_{penalty,max} - \left(SNR_{SC,max}^{[dB]}\Big|_{SSMF} - FoM_{SSMF}\right) \leq FoM_{MCF} + \mu_{X,WC}^{[dB]} \leq$$
$$C_{penalty,max} - \left(SNR_{SC,max}^{[dB]}\Big|_{SSMF} + FoM_{MCF} - FoM_{SSMF}\right)$$

$$C_{penalty} = 10\log_{10}\left(10^{SNR_{penalty}^{[dB]}/10} - 1\right) \qquad (114b)$$

$$FoM = \frac{10}{3}\log_{10}\left[|D|A_{eff}^2 \frac{\alpha_{dB} 10^{\alpha_{dB} L_s/10}}{(10^{\alpha_{dB} L_s/10} - 1)^3}\right] \qquad (114c)$$

$C_{penalty}$ herein takes the values shown in Table 3 for some values of $SNR_{penalty}$ [dB]. Examples of FoM and $SNR_{SC,max}$ [dB] are as follows for the case of the standard SMF (on the assumption of $n_2$ of 2.34×10$^{-20}$ m$^2$/W) in Table 2: FoM is about 4.12 dB at $L_s$=80 km and about 1.45 dB at $L_s$=100 km (the units of the respective parameters herein are D [ps/(nm·km)], $A_{eff}$ [μm$^2$], $\alpha_{dB}$ [dB/km], and $L_s$ [km]). System parameter dependences of $SNR_{SC,max}$ [dB] in the standard SMF are as provided in Table 4. The dependence on $F_{dB}$ is approximately $-(\frac{2}{3})F_{dB}$ and the dependence on $L_s$ approximately $-(\frac{2}{3})\alpha_{dB}L_s$. The dependence on $N_{ch}R_s$(WDM band) can be approximated to about $-0.27 \ln(N_h R_s)$ and the influence thereof is found to be little.

TABLE 3

| | SNR$_{penalty}^{[dB]}$ [dB] | | | | | | | |
|---|---|---|---|---|---|---|---|---|
| | 0.02 | 0.03 | 0.05 | 0.1 | 0.2 | 0.3 | 0.5 | 1 | 2 |
| C$_{penalty}$ [dB] | −23.36 | −21.59 | −19.36 | −16.33 | −13.27 | −11.46 | −9.14 | −5.87 | −2.33 |

TABLE 4

| | | L$_s$ [km] | | | | | | |
|---|---|---|---|---|---|---|---|---|
| | | 80 | | | | 100 | | |
| | | F$_{dB}$ [dB] | | | | | | |
| | | 3 | 4 | 5 | 6 | 3 | 4 | 5 | 6 |
| N$_{ch}$R$_s$ [THz] | 1 | 30.68 | 30.01 | 29.35 | 28.68 | 28.01 | 27.34 | 26.67 | 26.01 |
| | 2 | 30.46 | 29.79 | 29.13 | 28.46 | 27.79 | 27.12 | 26.45 | 25.79 |
| | 3 | 30.35 | 29.68 | 29.01 | 28.35 | 27.67 | 27.00 | 26.34 | 25.67 |
| | 4 | 30.27 | 29.60 | 28.94 | 28.27 | 27.59 | 26.93 | 26.26 | 25.59 |
| | 5 | 30.21 | 29.55 | 28.88 | 28.21 | 27.54 | 26.87 | 26.20 | 25.54 |
| | 6 | 30.17 | 29.50 | 28.83 | 28.17 | 27.49 | 26.83 | 26.16 | 25.49 |
| | 7 | 30.13 | 29.46 | 28.80 | 28.13 | 27.46 | 26.79 | 26.12 | 25.46 |
| | 8 | 30.10 | 29.43 | 28.77 | 28.10 | 27.43 | 26.76 | 26.09 | 25.43 |
| | 9 | 30.07 | 29.41 | 28.74 | 28.07 | 27.40 | 26.73 | 26.07 | 25.40 |
| | 10 | 30.05 | 29.38 | 28.72 | 28.05 | 27.38 | 26.71 | 26.04 | 25.38 |

In the case of an MCF with cores equivalent to the standard SMF, in order to prevent the degradation of SNR due to XT, $SNR_{penalty}$ [dB] is more preferably not more than at least 1 dB, still more preferably not more than 0.5 dB, and yet more preferably not more than 0.1 dB. In order to prevent the SNR degradation due to excessive XT suppression, $SNR_{penalty}$ [dB] is preferably not less than 0.02 dB, more preferably not less than 0.03 dB, and still more preferably not less than 0.05 dB.

It is found by calculation using Expression (114a) and the numeral values in Tables 3 and 4 that, for example, in the case where $N_{ch}R_s$=10 THz and $F_{dB}$=3 dB, Expression (A1) below is preferably to be satisfied, in order to keep $SNR_{penalty}$ [dB] not less than 0.02 dB and not more than 1 dB.

$$-23.36 - (30.05 - 4.12) \leq \frac{10}{3}\log_{10}\left[|D|A_{eff}^2 \frac{\alpha_{dB} 10^{8\alpha_{dB}}}{(10^{8\alpha_{dB}} - 1)^3}\right] + \mu_{X,WC}^{[dB]} \leq \qquad (A1)$$
$$-5.87 - (30.05 - 4.12) - 49.3 \leq$$
$$\frac{10}{3}\log_{10}\left[|D|A_{eff}^2 \frac{\alpha_{dB} 10^{8\alpha_{dB}}}{(10^{8\alpha_{dB}} - 1)^3}\right] + \mu_{X,WC}^{[dB]} \leq -31.8.$$

Expression (A2) below is preferably to be satisfied, in order to keep $SNR_{penalty}$[dB] not less than 0.05 dB and not more than 1 dB.

$$-19.36 - (30.05 - 4.12) \leq \frac{10}{3}\log_{10}\left[|D|A_{eff}^2 \frac{\alpha_{dB} 10^{8\alpha_{dB}}}{(10^{8\alpha_{dB}} - 1)^3}\right] + \mu_{X,WC}^{[dB]} \leq \qquad (A2)$$
$$-5.87 - (30.05 - 4.12) - 45.3 \leq$$
$$\frac{10}{3}\log_{10}\left[|D|A_{eff}^2 \frac{\alpha_{dB} 10^{8\alpha_{dB}}}{(10^{8\alpha_{dB}} - 1)^3}\right] + \mu_{X,WC}^{[dB]} \leq -31.8.$$

Furthermore, Expression (A3) below is preferably to be satisfied, in order to keep $SNR_{penalty}$ [dB] not less than 0.05 dB and not more than 0.5 dB.

$$-19.36 - (30.05 - 4.12) \leq \frac{10}{3}\log_{10}\left[|D|A_{\it eff}^2 \frac{\alpha_{dB}10^{8\alpha_{dB}}}{(10^{8\alpha_{dB}}-1)^3}\right] + \mu_{X,WC}^{[dB]} \leq \quad (A3)$$

$$-9.14 - (30.05 - 4.12) - 45.3 \leq$$

$$\frac{10}{3}\log_{10}\left[|D|A_{\it eff}^2 \frac{\alpha_{dB}10^{8\alpha_{dB}}}{(10^{8\alpha_{dB}}-1)^3}\right] + \mu_{X,WC}^{[dB]} \leq -35.1$$

It is found by calculation using these that in the case of $N_{ch}R_s$=10 THz in the MCF with cores equivalent to the standard SMF, $\mu_{X,WC}$ necessary for $SNR_{penalty}$ [dB] to take the values in Table 3 can be calculated as in Table 5.

TABLE 5

| | | \multicolumn{7}{c}{$L_s$ [km]} |
|---|---|---|---|---|---|---|---|---|
| | | \multicolumn{4}{c}{80} | \multicolumn{4}{c}{100} |
| | | \multicolumn{7}{c}{$F_{dB}$ [dB]} |
| | | 3 | 4 | 5 | 6 | 3 | 4 | 5 | 6 |
| $SNR_{penalty}^{[dB]}$ [dB] | 0.02 | −53.41 | −52.74 | −52.07 | −51.41 | −50.73 | −50.07 | −49.40 | −48.73 |
| | 0.03 | −51.64 | −50.97 | −50.31 | −49.64 | −48.97 | −48.30 | −47.63 | −46.97 |
| | 0.05 | −49.41 | −48.75 | −48.08 | −47.41 | −46.74 | −46.07 | −45.40 | −44.74 |
| | 0.1 | −46.38 | −45.71 | −45.04 | −44.38 | −43.70 | −43.04 | −42.37 | −41.70 |
| | 0.2 | −43.32 | −42.65 | −41.98 | −41.32 | −40.64 | −39.98 | −39.31 | −38.64 |
| | 0.3 | −41.51 | −40.84 | −40.17 | −39.51 | −38.83 | −38.16 | −37.50 | −36.83 |
| | 0.5 | −39.19 | −38.52 | −37.85 | −37.19 | −36.51 | −35.84 | −35.18 | −34.51 |
| | 1 | −35.92 | −35.25 | −34.58 | −33.92 | −33.24 | −32.58 | −31.91 | −31.24 |
| | 2 | −32.38 | −31.71 | −31.05 | −30.38 | −29.70 | −29.04 | −28.37 | −27.70 |

Therefore, when it is considered that the span length of standard transmission links is 80 km and NF of EDFA is 6 dB, $\mu_{X,WC}$ after 80 km propagation is preferably not more than at least −33.9 dB, more preferably not more than −37.2 dB, and still more preferably not more than −44.4 dB, in order to prevent the degradation of SNR due to XT. When NF of EDFA is considered to be 3 dB, $\mu_{X,WC}$ after 80 km propagation is preferably not more than at least −35.9 dB, more preferably not more than −39.2 dB, and still more preferably not more than −46.4 dB. In order to prevent the SNR degradation due to excessive XT suppression, when NF of EDFA is considered to be 6 dB, $\mu_{X,WC}$ after at least 80 km propagation is preferably not less than −51.4 dB, more preferably not less than −49.6 dB, and still more preferably not less than −47.4 dB. When NF of EDFA is considered to be 3 dB, $\mu_{X,WC}$ after at least 80 km propagation is preferably not less than −53.4 dB, more preferably not less than −51.6 dB, and still more preferably not less than −49.4 dB.

For example, when $A_{eff}$ is 120 μm², out of the parameters of the standard SMF, FoM is about 5.29 dB at $L_s$=80 km and about 2.62 dB at $L_s$=100 km; therefore, FoM is improved by 1 dB or more when compared to the case of $A_{eff}$ of 80 μm². In this case, $SNR_{penalty}$ [dB] is more preferably not more than at least 2 dB, still more preferably not more than 1 dB, yet more preferably not more than 0.5 dB, and yet still more preferably not more than 0.1 dB. Therefore, when it is considered that the span length of standard transmission links is 80 km and NF of EDFA is 6 dB, it is found by Expression (114) that, in order to prevent the degradation of SNR due to XT, $\mu_{X,WC}$ after 80 km propagation is preferably not more than at least −32.9 dB, more preferably not more than −36.4 dB, still more preferably not more than −39.7 dB, and yet more preferably not more than −46.9 dB. When NF of EDFA is considered to be 3 dB, $\mu_{X,WC}$ after 80 km propagation is preferably not more than at least −33.6 dB, more preferably not more than −37.1 dB, still more preferably not more than −40.4 dB, and yet more preferably not more than −47.6 dB. In order to prevent the SNR degradation due to excessive XT suppression, when NF of EDFA is considered to be 6 dB, $\mu_{X,WC}$ after at least 80 km propagation is preferably not less than −53.9 dB, more preferably not less than −52.2 dB, and still more preferably not less than −49.9 dB. When NF of EDFA is considered to be 3 dB, $\mu_{X,WC}$ after at least 80 km propagation is preferably not less than −54.6 dB, more preferably not less than −52.8 dB, and still more preferably not less than −50.6 dB.

For improving $SNR_{MC,max|MCF}$ by $\Delta SNR_{MC}$ [dB] more than $SNR_{SC,max|SSMF}$, Expression (115) below needs to be satisfied.

$$\frac{SNR_{MC,max}|_{MCF}}{SNR_{SC,max}|_{SSMF}} \geq 10^{\frac{\Delta SNR_{MC}}{10}} \quad (115)$$

$$SNR_{SC,max}\Big|_{SSMF}\left(\frac{1}{SNR_{SC,max}|_{MCF}} + \mu_{X,WC}\right) \leq 10^{-\frac{\Delta SNR_{MC}}{10}}$$

$$\frac{SNR_{SC,max}|_{SSMF}}{SNR_{SC,max}|_{MCF}} + SNR_{SC,max}\Big|_{SSMF}\mu_{X,WC} \leq 10^{-\frac{\Delta SNR_{MC}}{10}}$$

$$\frac{10^{-\frac{FoM_{SSMF}}{10}}}{10^{-\frac{FoM_{MCF}}{10}}} + SNR_{SC,max}\Big|_{SSMF}\mu_{X,WC} \leq 10^{-\frac{\Delta SNR_{MC}}{10}}$$

$$\mu_{X,WC} \leq \frac{1}{SNR_{SC,max}|_{SSMF}}\left(10^{-\frac{\Delta SNR_{MC}}{10}} - \frac{10^{-\frac{FoM_{SSMF}}{10}}}{10^{-\frac{FoM_{SSMF}}{10}}}\right)$$

$$\eta_{WC} \leq \frac{1}{L_s SNR_{SC,max}|_{SSMF}}\left(10^{-\frac{\Delta SNR_{MC}}{10}} - \frac{10^{-\frac{FoM_{SSMF}}{10}}}{10^{-\frac{FoM_{MCF}}{10}}}\right)$$

However, there is the condition of Expression (116) herein.

$$10^{\frac{FoM}{10}} = \frac{(|D|A_{\it eff}^2 \alpha_{dB}10^{\alpha_{dB}L_s/10})^{\frac{1}{3}}}{(10^{\alpha_{dB}L_s/10}-1)} \quad (116)$$

10^(−$\Delta SNR_{MC}$/10) is, for example, about 0.71 with $\Delta SNR_{MC}$=1.5 dB, about 0.63 with $\Delta SNR_{MC}$=2 dB, and about 0.50 with $\Delta SNR_{MC}$=3 dB. 10^($FoM_{SSMF}$/10) is about 2.58 at $L_s$=80 km and about 1.39 at $L_s$=100 km and therefore the relations of Expressions (117), (118) below are obtained from the foregoing Expressions (115), (116).

(In the case of $L_s = 80$ km)

$$\eta_{WC} \leq \frac{1}{L_s SNR_{SC,max}|_{SSMF}} \left\{10^{-\frac{\Delta SNR_{MC}}{10}} - 2.58\left[\frac{(10^{\alpha_{dB}L_s}-1)}{(|D|A_{eff}^2\alpha_{dB}10^{\alpha_{dB}L_s})^{\frac{1}{3}}}\right]_{MCF}\right\} \quad (117)$$

(In the case of $L_s = 100$ km)

$$\eta_{WC} \leq \frac{1}{L_s SNR_{SC,max}|_{SSMF}} \left\{10^{-\frac{\Delta SNR_{MC}}{10}} - 1.39\left[\frac{(10^{\alpha_{dB}L_s}-1)}{(|D|A_{eff}^2\alpha_{dB}10^{\alpha_{dB}L_s})^{\frac{1}{3}}}\right]_{MCF}\right\} \quad (118)$$

Since $SNR_{SC|SSMF}$ is linear values of the values in Table 3, the system parameter dependences can be summarized as in Table 6 below.

TABLE 6

|  |  | $L_s$ [km] | | | | | | | |
|---|---|---|---|---|---|---|---|---|---|
|  |  | 80 | | | | 100 | | | |
|  |  | $F_{dB}$ [dB] | | | | | | | |
|  |  | 3 | 4 | 5 | 6 | 3 | 4 | 5 | 6 |
| $N_{ch}R_s$ [THz] | 1 | $1.17 \times 10^3$ | $1.00 \times 10^3$ | $8.60 \times 10^2$ | $7.38 \times 10^2$ | $6.32 \times 10^2$ | $5.42 \times 10^2$ | $4.65 \times 10^2$ | $3.99 \times 10^2$ |
|  | 2 | $1.11 \times 10^3$ | $9.54 \times 10^2$ | $8.18 \times 10^2$ | $7.01 \times 10^2$ | $6.01 \times 10^2$ | $5.15 \times 10^2$ | $4.42 \times 10^2$ | $3.79 \times 10^2$ |
|  | 3 | $1.08 \times 10^3$ | $9.29 \times 10^2$ | $7.96 \times 10^2$ | $6.83 \times 10^2$ | $5.85 \times 10^2$ | $5.02 \times 10^2$ | $4.30 \times 10^2$ | $3.69 \times 10^2$ |
|  | 4 | $1.06 \times 10^3$ | $9.12 \times 10^2$ | $7.83 \times 10^2$ | $6.71 \times 10^2$ | $5.75 \times 10^2$ | $4.93 \times 10^2$ | $4.23 \times 10^2$ | $3.63 \times 10^2$ |
|  | 5 | $1.05 \times 10^3$ | $9.01 \times 10^2$ | $7.72 \times 10^2$ | $6.63 \times 10^2$ | $5.67 \times 10^2$ | $4.87 \times 10^2$ | $4.17 \times 10^2$ | $3.58 \times 10^2$ |
|  | 6 | $1.04 \times 10^3$ | $8.91 \times 10^2$ | $7.65 \times 10^2$ | $6.56 \times 10^2$ | $5.61 \times 10^2$ | $4.82 \times 10^2$ | $4.13 \times 10^2$ | $3.54 \times 10^2$ |
|  | 7 | $1.03 \times 10^3$ | $8.84 \times 10^2$ | $7.58 \times 10^2$ | $6.50 \times 10^2$ | $5.57 \times 10^2$ | $4.78 \times 10^2$ | $4.10 \times 10^2$ | $3.51 \times 10^2$ |
|  | 8 | $1.02 \times 10^3$ | $8.78 \times 10^2$ | $7.53 \times 10^2$ | $6.46 \times 10^2$ | $5.53 \times 10^2$ | $4.74 \times 10^2$ | $4.07 \times 10^2$ | $3.49 \times 10^2$ |
|  | 9 | $1.02 \times 10^3$ | $8.72 \times 10^2$ | $7.48 \times 10^2$ | $6.42 \times 10^2$ | $5.49 \times 10^2$ | $4.71 \times 10^2$ | $4.04 \times 10^2$ | $3.47 \times 10^2$ |
|  | 10 | $1.01 \times 10^3$ | $8.67 \times 10^2$ | $7.44 \times 10^2$ | $6.38 \times 10^2$ | $5.46 \times 10^2$ | $4.69 \times 10^2$ | $4.02 \times 10^2$ | $3.45 \times 10^2$ |

Therefore, when the standard SMF is defined as a reference and, for example, when it is assumed that $L_s=80$ km, $N_{ch}R_s=10$ THz, and $F_{dB}=6$ dB, $\eta_{WC}$ [/km], D [ps/(nm·km)], $A_{eff}$ [μm²], and $\alpha_{dB}$ [dB/km] need to satisfy Expression (119) below, for each core of MCF to realize $\Delta SNR_{MC} \geq 1.5$ dB.

$$\eta_{WC} \leq 1.96 \times 10^{-5}\left[0.71 - 2.58\frac{(10^{8\alpha_{dB}}-1)}{(|D|A_{eff}^2\alpha_{dB}10^{8\alpha_{dB}})^{\frac{1}{3}}}\right] \quad (119)$$

For realizing $\Delta SNR_{MC} \geq 2$ dB, they need to satisfy Expression (120) below.

$$\eta_{WC} \leq 1.96 \times 10^{-5}\left[0.63 - 2.58\frac{(10^{8\alpha_{dB}}-1)}{(|D|A_{eff}^2\alpha_{dB}10^{8\alpha_{dB}})^{\frac{1}{3}}}\right] \quad (120)$$

Furthermore, for realizing $\Delta SNR_{MC} \geq 3$ dB, they need to satisfy Expression (121) below.

$$\eta_{WC} \leq 1.96 \times 10^{-5}\left[0.50 - 2.58\frac{(10^{8\alpha_{dB}}-1)}{(|D|A_{eff}^2\alpha_{dB}10^{8\alpha_{dB}})^{\frac{1}{3}}}\right] \quad (121)$$

For example, when it is assumed that $L_s=80$ km, $N_{ch}R_s=10$ THz, and $F_{dB}=3$ dB, they need to satisfy Expression (122) below, for each core of MCF to realize $\Delta SNR_{MC} \geq 1.5$ dB.

$$\eta_{WC} \leq 1.24 \times 10^{-5}\left[0.71 - 2.58\frac{(10^{8\alpha_{dB}}-1)}{(|D|A_{eff}^2\alpha_{dB}10^{8\alpha_{dB}})^{\frac{1}{3}}}\right] \quad (122)$$

For realizing $\Delta SNR_{MC} \geq 2$ dB, they need to satisfy Expression (123) below.

$$\eta_{WC} \leq 1.24 \times 10^{-5}\left[0.63 - 2.58\frac{(10^{8\alpha_{dB}}-1)}{(|D|A_{eff}^2\alpha_{dB}10^{8\alpha_{dB}})^{\frac{1}{3}}}\right] \quad (123)$$

Furthermore, for realizing $\Delta SNR_{MC} \geq 3$ dB, they need to satisfy Expression (124) below.

$$\eta_{WC} \leq 1.24 \times 10^{-5}\left[0.50 - 2.58\frac{(10^{8\alpha_{dB}}-1)}{(|D|A_{eff}^2\alpha_{dB}10^{8\alpha_{dB}})^{\frac{1}{3}}}\right] \quad (124)$$

For example, when it is assumed that $L_s=100$ km, $N_{ch}R_s=10$ THz, and $F_{dB}=6$ dB, they need to satisfy Expression (125) below, for each core of MCF to realize $\Delta SNR_{MC} \geq 1.5$ dB.

$$\eta_{WC} \leq 1.57 \times 10^{-5}\left[0.71 - 1.39\frac{(10^{\alpha_{dB}}-1)}{(|D|A_{eff}^2\alpha_{dB}10^{10\alpha_{dB}})^{\frac{1}{3}}}\right] \quad (125)$$

For realizing $\Delta SNR_{MC} \geq 2$ dB, they need to satisfy Expression (126) below.

$$\eta_{WC} \leq 1.57 \times 10^{-5}\left[0.63 - 1.39\frac{(10^{10\alpha_{dB}}-1)}{(|D|A_{eff}^2\alpha_{dB}10^{10\alpha_{dB}})}\right] \quad (126)$$

Furthermore, for realizing $\Delta SNR_{MC} \leq 3$ dB, they need to satisfy Expression (127) below.

$$\eta_{WC} \leq 1.57 \times 10^{-5} \left[ 0.50 - 1.39 \frac{(10^{10\alpha_{dB}} - 1)}{(|D|A_{\text{eff}}^2 \alpha_{dB} 10^{10\alpha_{dB}})^{\frac{1}{3}}} \right] \quad (127)$$

For example, when it is assumed that $L_s=100$ km, $N_{ch}R_s=10$ THz, and $F_{dB}=3$ dB, they need to satisfy Expression (128) below, for each core of MCF to realize $\Delta\text{SNR}_{MC} \geq 1.5$ dB.

$$\eta_{WC} \leq 9.89 \times 10^{-6} \left[ 0.71 - 1.39 \frac{(10^{10\alpha_{dB}} - 1)}{(|D|A_{\text{eff}}^2 \alpha_{dB} 10^{10\alpha_{dB}})^{\frac{1}{3}}} \right] \quad (128)$$

For realizing $\Delta\text{SNR}_{MC} \geq 2$ dB, they need to satisfy Expression (129) below.

$$\eta_{WC} \leq 9.89 \times 10^{-6} \left[ 0.63 - 1.39 \frac{(10^{10\alpha_{dB}} - 1)}{(|D|A_{\text{eff}}^2 \alpha_{dB} 10^{10\alpha_{dB}})^{\frac{1}{3}}} \right] \quad (129)$$

Furthermore, for realizing $\Delta\text{SNR}_{MC} \geq 3$ dB, they need to satisfy Expression (130) below.

$$\eta_{WC} \leq 9.89 \times 10^{-6} \left[ 0.50 - 1.39 \frac{(10^{10\alpha_{dB}} - 1)}{(|D|A_{\text{eff}}^2 \alpha_{dB} 10^{10\alpha_{dB}})^{\frac{1}{3}}} \right] \quad (130)$$

For improving SNR of each core in MCF, it is necessary, of course, to implement the design to keep XT in the appropriate range as described above, but it is also necessary to improve $\text{SNR}_{SC,max}$. It is found from the foregoing Expression (112) that the smaller $\alpha_{dB}$, the larger $A_{\text{eff}}$, or the larger the absolute value of D, the more $\text{SNR}_{SC,max}$ is improved. The reduction of transmission loss and the increase of $A_{\text{eff}}$ are achieved in the single-core optical fibers and the optimum value of $A_{\text{eff}}$ is reported to be 130 μm², with consideration to splice loss and others as well, while also achieving an extremely low transmission loss (0.161 dB/km). This is described in "Y. Yamamoto et al., "A New Class of Optical Fiber to Support Large Capacity Transmission," OFC2011, paperOWA6 (Reference Literature 2)."

However, the effective area $A_{\text{eff}}$ achieved in the multi-core optical fibers is at most in the level of 110 μm² and the transmission loss in that case is about 0.2 dB/km. This is described in "K. Imamura et al., "Trench Assisted Multi-Core Fiber with Large Aeff over 100 μm² and Low Attenuation Loss," ECOC2011, paper Mo. 1. LeCervin. 1. (Reference Literature 3)" and "K. Takenaga et al., "A Large Effective Area Multi-Core Fibre with an Optimised Cladding Thickness," ECOC2011, paper Mo. 1. LeCervin. 2. (Reference Literature 4)." Furthermore, "T. Hayashi et al., "Design and Fabrication of Ultra-Low-Crosstalk and Low-Loss Multi-Core Fiber," Optics Express, vol. 19, no. 17, pp. 16576-16592 (2011). (Reference Literature 5)" realized the low transmission loss (0.175 to 0.181 dB/km), but $A_{\text{eff}}$ in that case is about 80 μm². As described above, it is the present status of the conventional technologies that there are no examples achieving both of large $A_{\text{eff}}$ of 130 μm² (or 120 μm² or more even with consideration to manufacturing dispersion of 110 m²) and low transmission loss equivalent to that of the standard single-mode fibers (not more than 0.195 dB/km and more preferably not more than 0.185 dB/km) in the case of MCFs.

In the case of the MCF, for increasing the transmission capacity per MCF, it is preferable to achieve both of $A_{\text{eff}}$ of not less than at least 120 μm² and the low transmission loss equal to or less than at least that of the standard single-mode fiber, in the MCF, and thereby to improve the transmission capacity of each individual core in the MCF to a level equivalent to that of the single-core low-nonlinearity optical fiber described in Reference Literature 2. The absolute value of chromatic dispersion D is also preferably set as large as possible, for the improvement in transmission capacity, and it is more preferable to realize the chromatic dispersion (approximately 17 ps/nm/km or more at the wavelength of 1550 nm) larger than that of the standard single-mode optical fiber, simultaneously with the increase of $A_{\text{eff}}$ and the low transmission loss. The chromatic dispersion is more preferably realized in the range of not less than about 20 ps/nm/km closer to the material dispersion of silica glass if possible.

It is reported in Reference Literature 5 and others that in the case of MCF, if the cores are too close to the cladding, propagation modes in the cores can be coupled with a mode in a coating material with high refractive index covering the cladding, so as to increase the transmission loss of the cores near the cladding. In application of MCF, the properties of the cores are preferably as uniform as possible, and differences of transmission losses among the cores of MCF, including dispersion of transmission losses among the cores due to manufacturing dispersion and the transmission loss differences due to the aforementioned differences of core positions, are preferably controlled to not more than at most 0.02 dB/km at the wavelength of 1550 nm.

Incidentally, in design of MCF with a large effective area $A_{\text{eff}}$, there is a possibility that confinement of light in the cores becomes weaker with increase of $A_{\text{eff}}$ and there is a need for increase in core pitch in order to control the crosstalk. In the case of MCF, it is preferable to control the increase of core pitch as low as possible, while achieving sufficiently large $A_{\text{eff}}$. Then, the below will discuss the shortest core pitch that can be determined by the structure of cores and permissible crosstalk.

A value of crosstalk from a first core to a second core out of a plurality of cores forming an MCF can be determined as follows: light is injected into the first core from one end face of the MCF, an emission power from the first core and an emission power from the second core are measured at the other end face, and a ratio is calculated as the crosstalk value by dividing the emission power from the second core by the emission power from the first core. Since the crosstalk of MCF has statistical dispersion, an average of statistical dispersion of crosstalk can be obtained by measuring a spectrum of crosstalk with wavelength sweeping of a light source during the measurement and obtaining an average thereof, or, by performing time-averaged measurement with a broadband light source. When the crosstalk is simply referred to hereinafter, it means the average of statistical dispersion of crosstalk.

It is already disclosed in Reference Literature 5 and others that the crosstalk of MCF follows the power coupling equation, and, particularly, the power coupling coefficient η of an identical-core-type MCF can be expressed by Expression (6) below, using the mode coupling coefficient κ, the propagation constant β, the fiber bending radius R, and the core pitch Λ.

$$\eta = 2\frac{\kappa^2}{\beta}\frac{R}{\Lambda} \qquad (6)$$

Figure 3:
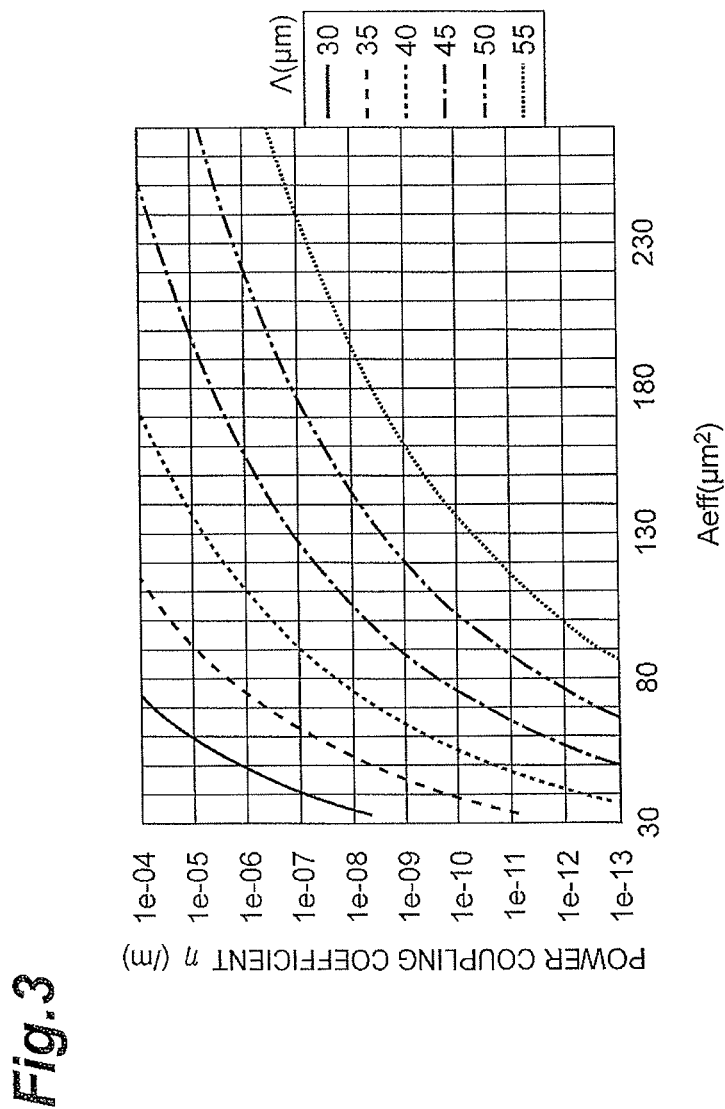
FIG. 3 is a drawing showing relations among $A_{eff}$, Λ, and h at the wavelength of 1565 nm, where the cable cutoff wavelength ($\lambda_{CC}$) is fixed at 1530 nm, with identical-core type MCFs (R=1 (m)) of step-index type cores.

FIG. 3 shows relations among the effective area $A_{\mathit{eff}}$(values at the wavelength of 1550 nm unless otherwise stated in particular, hereinbelow), the core pitch $\Lambda$, and the power coupling coefficient $\eta$ at the wavelength of 1565 nm, for example, in MCFs using step-index type cores with R=1 (m) and the cable cutoff wavelength ($\lambda_{CC}$) of 1530 nm. It is shown by FIG. 3 that the power coupling coefficient $\eta$ largely increases in the logarithmic scale with increase in $A_{\mathit{eff}}$.

Let us consider as an MCF, for example, a 7-core fiber consisting of a center core and six peripheral cores arranged as cores in a triangular grid pattern. In this case, supposing the fiber length is L, the crosstalk to the center core from the six peripheral cores is approximately 6 $\eta$L, and, in order to keep 6 $\eta$L not more than 0.01 after 100 km propagation, the relation of Expression (7) below needs to be satisfied. By rearranging this in accordance with the dependence on the core pitch $\Lambda$, we can obtain Expression (8).

$$\eta = 2\frac{\kappa^2}{\beta}\frac{R}{\Lambda} \le \frac{1}{6}10^{-7} \qquad (7)$$

$$\frac{\kappa^2}{\Lambda} \le \frac{\beta}{R}\frac{1}{12}10^{-7} \qquad (8)$$

With consideration to a tape-slot cable configuration or the like in which fibers are housed in a helical form in an actually fiber-installed state, the fiber bending radius R is assumed to be not less than at least 0.1 m. Therefore, for keeping 6 $\eta$L not more than 0.01 in the MCF, at least the relation of Expression (9) needs to be satisfied.

$$\frac{\kappa^2}{\Lambda} \le \frac{\beta}{12}10^{-6} \qquad (9)$$

Let us define herein $\Lambda_{th}$ as the core pitch $\Lambda$ satisfying Expression (10) below.

$$\frac{\kappa^2}{\Lambda} = \frac{\beta}{12}10^{-6} \qquad (10)$$

Figure 4:
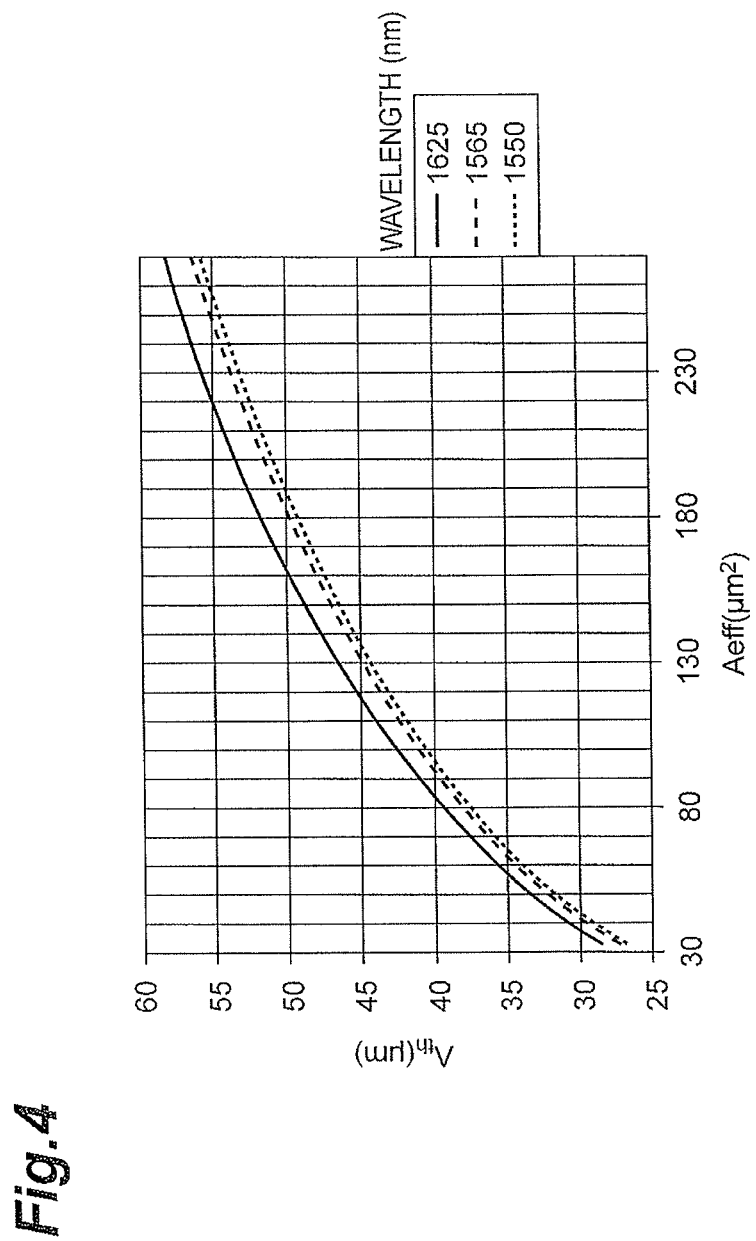
FIG. 4 is relations between $A_{eff}$ and $\Lambda_{th}$ at the wavelengths of the legends, where the cable cutoff wavelength ($\lambda_{CC}$) is fixed at 1530 nm, with identical-core type MCFs (R=0.1 (m)) of step-index type cores.

FIG. 4 shows relations between $A_{\mathit{eff}}$ at the wavelength 1550 nm and $\Lambda_{th}$ at 1550 nm, 1565 nm, and 1625 nm under the same conditions as in FIG. 3 (provided that R=0.1 µm). According to FIG. 4, in the case of the MCF in which the step-index type cores are arranged in the triangular grid pattern (two-dimensionally close-packed), the core pitch needs to be not less than at least $\Lambda_{th}$ in FIG. 4, in order to enable the transmission over the length of 100 km while keeping the crosstalk (XT) not more than 0.01 in the C-band (1530-1565 nm).

Figure 5:
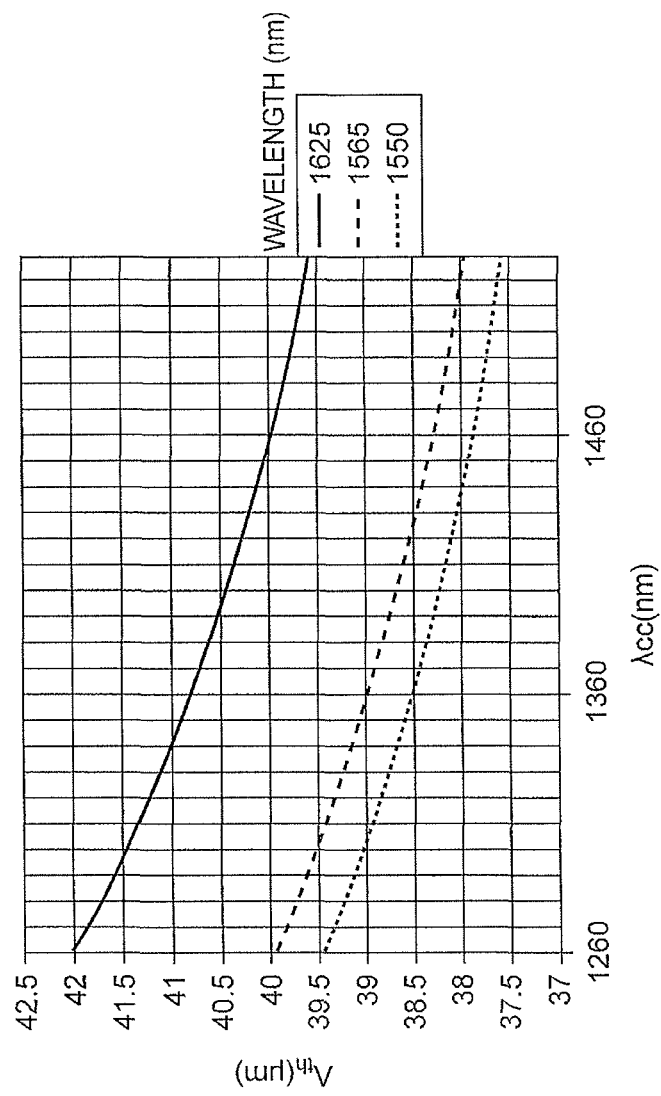
FIG. 5 is a drawing showing relations between $\lambda_{CC}$ and $\Lambda_{th}$ at the wavelengths of the legends, where $A_{eff}$ is fixed at 80 μm², with identical-core type MCFs (R=0.1 (m)) of step-index type cores.

For making $\Lambda_{th}$ smaller, it is necessary to enhance the confinement of light in the cores. For enhancing the confinement of light in the cores, the cutoff wavelength $\lambda_{CC}$ is preferably set as long as possible. FIG. 5 shows relations between $\lambda_{CC}$ and $\Lambda_{th}$ at 1550 nm, 1565 nm, and 1625 nm, in the case where the effective area $A_{\mathit{eff}}$ is fixed at 80 µm². It is shown by FIG. 5 that $\Lambda_{th}$ can be made smaller with increase of $\lambda_{CC}$.

When the multi-core optical fiber is applied, for example, to transmission in the C-band (1530-1565 nm) or in the (C+L) band (1530-1625 nm), $\lambda_{CC}$ is preferably not more than 1530 nm and is preferably a wavelength as long as possible. It is shown in FIG. 5 that, for example, as long as $\lambda_{CC}$ is set not less than 1460 nm, the increase of $\Lambda_{th}$ can be controlled to not more than about 0.41 µm, when compared to the case of $\lambda_{CC}$=1530 nm. When the multi-core optical fiber is applied to transmission in the (S+C+L) band (1460-1625 nm), $\lambda_{CC}$ is preferably not more than 1460 nm and is preferably a wavelength as long as possible. For example, when $\lambda_{CC}$ is not less than 1360 nm, the increase of $\Lambda_{th}$ can be controlled to not more than about 0.82 µm, when compared to the case of $\lambda_{CC}$=1460 nm, as shown in FIG. 5.

For increasing the transmission capacity of each core in the MCF, it is necessary to increase $A_{\mathit{eff}}$ of each core, in order to decrease the non-linearity of each core. However, the increase of $A_{\mathit{eff}}$ results in increase in $\Lambda_{th}$ and decrease in the number of cores per MCF sectional area (core density). Then, it is necessary to devise the structure of cores, so as to increase $A_{\mathit{eff}}$, while suppressing the increase of $\Lambda_{th}$ with enhanced confinement of light in the cores.

For enhancing the confinement of light in the cores, it is preferable to adopt the cores in a trench type structure with properties of (1) to (4), having (1) a core part in a central region, (2) a cladding with a refractive index lower than the core part, around the core part, (3) a trench layer with a refractive index lower than the cladding, between the core part and the cladding, and (4) an inner cladding layer with a refractive index higher than the trench layer and lower than the core part, between the trench layer and the core part, because it can enhance the confinement of light of the fundamental mode in the cores with an assist of the trench layer and $\Lambda_{th}$ can be made smaller in the relation of $A_{\mathit{eff}}$ and $\Lambda_{th}$ and the relation of $\lambda_{CC}$ and $\Lambda_{th}$.

Now, let us define $\Delta 1(\%)$ as a relative index difference of the core part with reference to a certain refractive index no, $\Delta 2(\%)$ as a relative index difference of the inner cladding layer with respect to the refractive index no, $\Delta 3(\%)$ as a relative index difference of the trench layer with respect to the refractive index no, $\Delta 4(\%)$ as a relative index difference of the cladding with respect to the refractive index no, 2a as an outside diameter of the core part, 2b as an outside diameter of the inner cladding layer, 2c as an outside diameter of the trench layer, Ra=a/b, and Rb=b/c. It is noted herein that a relative index difference $\Delta$ (%) of a refractive index n with respect to $n_0$ is defined by $\Delta$ (%)=100($n^2-n_0^2$)/($2n^2$). By arranging magnitude relations among $\Delta 1$, $\Delta 2$, $\Delta 3$, and $\Delta 4$, we obtain relations of $\Delta 1 > \Delta 4 > \Delta 3$ and $\Delta 1 > \Delta 2 > \Delta 3$.

In manufacture of a pure silica core fiber that can realize a low transmission loss, fluorine or the like is added to make the refractive indices of the inner cladding layer, trench layer, and cladding smaller than that of the pure silica core. However, an excessively large change of refractive index due to fluorine doping is not preferred for stable and low-cost manufacture. An example of a condition to enable stable and low-cost manufacture of pure silica core fiber to realize a low transmission loss is that $\Delta 1 - \Delta 3$ is not more than about 0.81%. The core of the pure silica core fiber herein is preferably comprised of pure silica glass or preferably comprised of a silica glass containing Cl less than 2000 molppm, F not less than 2000 molppm and not more than 10000 molppm, and $A_2O$ (A is an alkali element) not less than 1 molppm and not more than 10000 molppm. The pure silica glass herein contains Cl not less than 2000 molppm and not more than 20000 molppm which is added during a dehydration process in manufacture. The alkali element of $A_2O$ is preferably Na, K, Rb, or Cs.

On the basis of the condition in the case of $\Delta 1 - \Delta 3 = 0.81\%$ allowing the deepest trench layer, among the conditions enabling the stable and low-cost manufacture of pure silica core fiber as discussed above, let us study the design of preferred trench type cores as the cores of MCF. It is noted herein that in each design, adjustment of the effective area $A_{eff}$ can be implemented by adjustment of the core diameter 2a and, adjustment of the cutoff wavelength $\lambda_{CC}$ by adjustment of the ratio Rb of the outside diameter of the inner cladding layer and the outside diameter of the trench layer. Since $\Delta 1-\Delta 3=0.81\%$, $\Delta 2$ and $\Delta 4$ are parameters that can be adjusted as to the refractive index. Therefore, when $A_{eff}$ and $\lambda C_C$ are fixed, the adjustable parameters are Ra, $\Delta 2$, and $\Delta 4$.

Figure 6A:
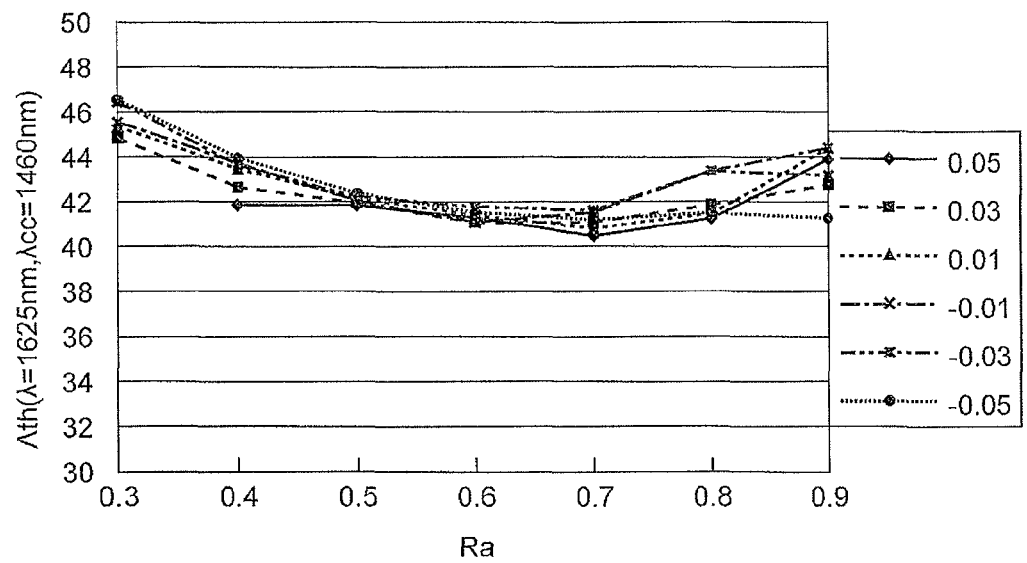
FIGS. 6A and 6B are drawings showing dependences of $\Lambda_{th}$ at the wavelength of 1625 nm on Ra, in the case of $A_{eff}$=130 μm².
Figure 6B:
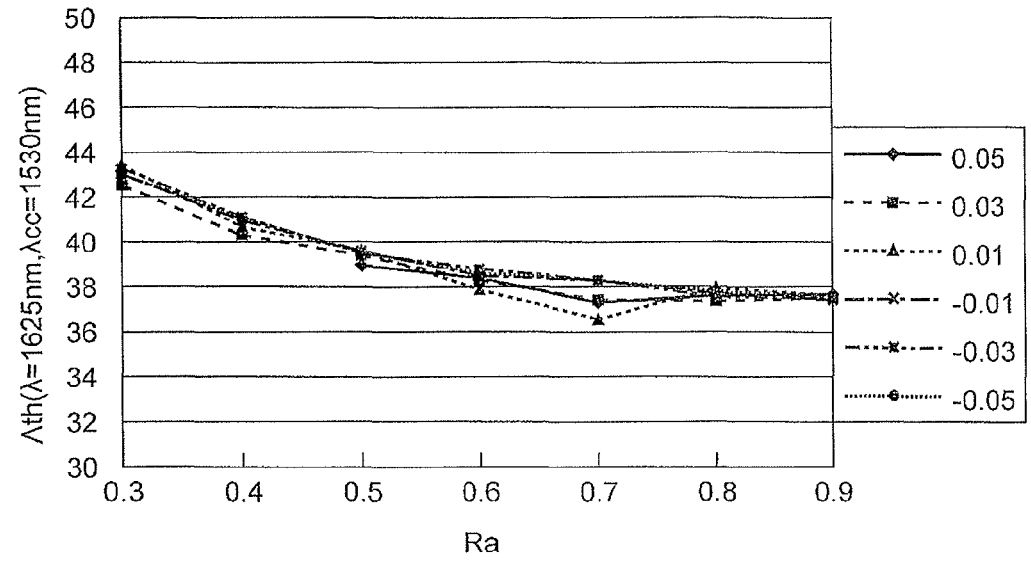

First, FIGS. 6A and 6B show dependences of $\Lambda_{th}$ on Ra and on $\Delta 2-\Delta 4$, for the case of $A_{eff}=130\,\mu m^2$ and $\lambda_{CC}=1460$ nm and for the case of $A_{eff}=130\,\mu m^2$ and $\lambda_{CC}=1530$ nm, with $\Delta 4$ being fixed so as to keep $\Delta 1-\Delta 4$ equal to 0.24%. The legends are values of $\Delta 2-\Delta 4$, and six types were set in the range of −0.05% to 0.05%, each of which was investigated. FIG. 6A shows the case of $\lambda_{CC}=1460$ nm and FIG. 6B the case of $\lambda_{CC}=1530$ nm. $\Delta 1$ though $\Delta 2-\Delta 4$ is different among the series, it is shown that $\Delta 2-\Delta 4$ causes little influence on $\Lambda_{th}$. Concerning Ra, in FIG. 6A for the case of $\lambda_{CC}=1460$ nm, $\Lambda_{th}$ becomes minimum near Ra of 0.6 to 0.8, and it is thus preferable to set Ra in the range of 0.6 to 0.8. In FIG. 6B for the case of $\lambda_{CC}=1530$ nm, the larger Ra, the smaller $\Lambda_{th}$; therefore, it is preferable to set Ra in the range of 0.6 to 1. In either case, when Ra is not more than 0.6, $\Lambda_{th}$ tends to increase with decrease of Ra; particularly, when Ra is below 0.5, the slopes of the graphs become larger and therefore it is preferable to set Ra not less than at least 0.5.

Figure 7A:
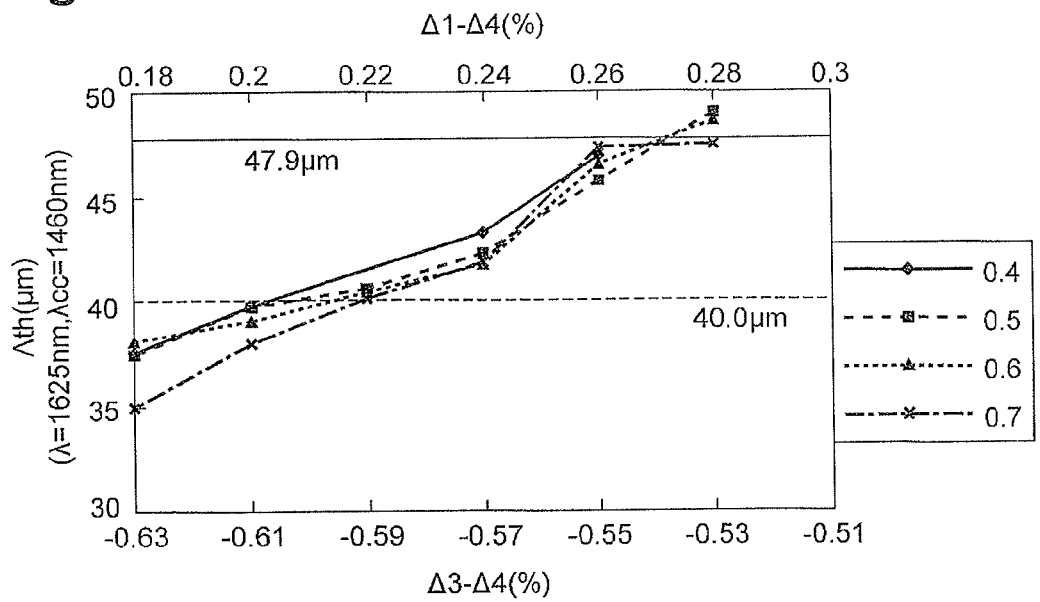
FIGS. 7A and 7B are drawings showing dependences of $\Lambda_{th}$ at the wavelength of 1625 nm on Δ1–Δ4 or on Δ3–Δ4, in the case of $A_{eff}$=130 m².
Figure 7B:
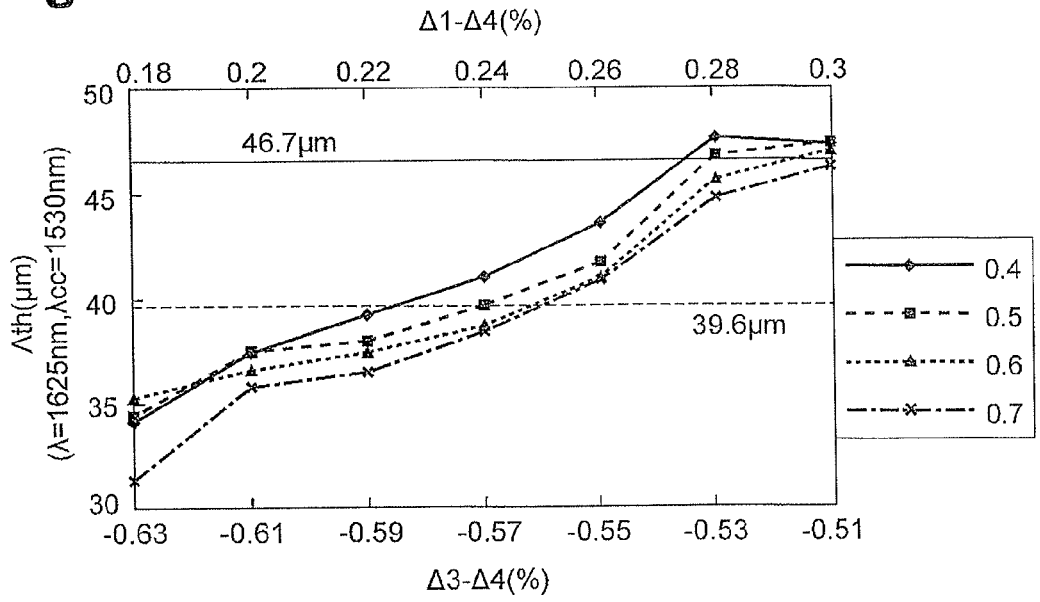

From the above results, in the light of little influence of $\Delta 2$ on $\Lambda_{th}$ and with the setting of $\Delta 2=\Delta 4$ for simplicity, FIGS. 7A and 7B show dependences of $\Lambda_{th}$ on Ra and on $\Delta 3-\Delta 4$ ($=\Delta 3-\Delta 2$, corresponding to the depth of the trench layer $\Delta$ relative to the cladding), for the case of $A_{eff}=130\,\mu m^2$ and $\lambda_{CC}=1460$ nm and for the case of $A_{eff}=130\,\mu m^2$ and $\lambda_{CC}=1530$ nm. FIG. 7A shows the case of $\Delta_{CC}=1460$ nm and FIG. 7B the case of $\lambda_{CC}=1530$ nm. Each of the figures include graphs where Ra is 0.4, 0.5, 0.6, and 0.7. In the drawings, a blue line indicates $\Lambda_{th}$ at the wavelength of 1625 nm in the case of the step-index type core with equal $A_{eff}$ and $\lambda_{CC}$ and a green line $\Lambda_{th}$ at the wavelength of 1625 nm in the case of the step-index type core with $A_{eff}$ of 80 $\mu m^2$ and equal $\lambda_{CC}$. Concerning Ra, $\Lambda_{th}$ tends to decrease slightly with increase of Ra, but it is not a significant dependence. In contrast to it, the dependence on $\Delta 3-\Delta 4$ is dominant, and it is shown from FIGS. 7A and 7B that $\Lambda_{th}$ decreases with decrease in $\Delta 3-\Delta 4$ (or with increase in depth $\Delta$ of the trench layer relative to the cladding).

Next, let us investigate $\Lambda_{th}$. Under the same conditions of $A_{eff}$ and $\lambda_{CC}$, $\Lambda_{th}$ is preferably smaller than at least those of the step-index type cores shown in FIG. 4. However, it should be noted that it is not the case that $\Lambda_{th}$ is always smaller than in the case of the step-index type cores as long as the cores are the trench type cores.

For example, in the case of the step-index type cores with $A_{eff}=130\,\mu m^2$ and $\lambda_{CC}=1530$ nm, it is shown by FIG. 4 that:
$\Lambda_{th}$ at the wavelength of 1550 nm is 44.4 µm,
$\Lambda_{th}$ at the wavelength of 1565 nm is 44.9 µm, and
$\Lambda_{th}$ at the wavelength of 1625 nm is 46.7 µm, and therefore, in the case of the cores with $A_{eff}$ of not less than 120 µm² and $\lambda_{CC}\le 1530$ nm, preferably,
$\Lambda_{th}$ at the wavelength of 1550 nm is not more than about 44.4 µm, or,
$\Lambda_{th}$ at the wavelength of 1565 nm is not more than about 44.9 µm, or,
$\Lambda_{th}$ at the wavelength of 1625 nm is not more than about 46.7 µm.

For example, in the case of the step-index type cores with $A_{eff}=130\,\mu m^2$ and $\lambda_{CC}=1460$ nm, it is shown by FIG. 4 that:
$\Lambda_{th}$ at the wavelength of 1550 nm is 45.5 µm,
$\Lambda_{th}$ at the wavelength of 1565 nm is 45.8 µm, and
$\Lambda_{th}$ at the wavelength of 1625 nm is 47.9 µm, and therefore, in the case of the cores with $A_{eff}$ of not less than 120 µm² and $\lambda_{CC}\le 1460$ nm, preferably,
$\Lambda_{th}$ at the wavelength of 1550 nm is not more than about 45.5 µm, or,
$\Lambda_{th}$ at the wavelength of 1565 nm is not more than about 45.8 µm, or,
$\Lambda_{th}$ at the wavelength of 1625 nm is not more than about 47.9 µm.

For example, in the case of the step-index type cores with $\lambda_{CC}=1530$ nm and $A_{eff}=80\,\mu m^2$, it is shown by FIG. 5 that:
$\Lambda_{th}$ at the wavelength of 1550 nm is about 37.6 µm,
$\Lambda_{th}$ at the wavelength of 1565 nm is about 38.0 µm, and
$\Lambda_{th}$ at the wavelength of 1625 nm is about 39.6 µm, and therefore,
in the case of the cores with $A_{eff}$ of not less than 120 µm² and $\lambda_{CC}\le 1530$ nm, more preferably,
$\Lambda_{th}$ at the wavelength of 1550 nm is not more than about 37.6 µm, or,
$\Lambda_{th}$ at the wavelength of 1565 nm is not more than about 38.0 µm, or,
$\Lambda_{th}$ at the wavelength of 1625 nm is not more than about 39.6 µm.

For example, in the case of the step-index type cores with $\lambda_{CC}=1460$ nm and $A_{eff}=80\,\mu m^2$, it is shown by FIG. 5 that:
$\Lambda_{th}$ at the wavelength of 1550 nm is about 37.9 µm,
$\Lambda_{th}$ at the wavelength of 1565 nm is about 38.3 µm, and
$\Lambda_{th}$ at the wavelength of 1625 nm is about 40.0 µm, and therefore,
in the case of the cores with $A_{eff}$ of not less than 120 µm² and $\lambda_{CC}\le 1460$ nm, more preferably,
$\Lambda_{th}$ at the wavelength of 1550 nm is not more than about 37.9 µm, or,
$\Lambda_{th}$ at the wavelength of 1565 nm is not more than about 38.3 µm, or,
$\Lambda_{th}$ at the wavelength of 1625 nm is not more than about 40.0 µm.

Since FIGS. 7A and 7B are the graphs about $\Lambda_{th}$ at the wavelength of 1625 nm for the case of $\lambda_{CC}=1460$ nm (FIG. 7A) and for the case of $\lambda_{CC}=1530$ nm (FIG. 7B) with $A_{eff}=130\,\mu m^2$, if $\Lambda_{th}$ is not more than 47.9 µm in the case of FIG. 7A, $\Lambda_{th}$ becomes smaller than in the case of the step-index type core with equal $A_{eff}$ and $\lambda_{CC}$. In the case of FIG. 7B, if $\Lambda_{th}$ is not more than 46.7 µm, $\Lambda_{th}$ becomes smaller than in the case of the step-index type core with equal $A_{eff}$ and $\lambda_{CC}$. It is, however, seen from FIGS. 7A and 7B that, even in the case of the trench type core, $\Lambda_{th}$ can be larger than in the case of the step-index type core with equal $A_{eff}$ and $\lambda_{CC}$, depending upon design.

Now, let us consider conditions for keeping $\Lambda_{th}$ smaller in the case of the trench type core under investigation than in the case of the step-index type core with equal $A_{eff}$ and $\lambda_{CC}$. In the case of $A_{eff}=130\,\mu m^2$ and $\lambda_{CC}=1530$ nm (FIG. 7B), when Ra is considered to be in the range of not less than about 0.5, it is preferable to satisfy the conditions that $\Delta 3-4$ is not more than about −0.53% and $\Delta 1-\Delta 4$ is not more than about 0.28%; or, when Ra is considered to be in the range of not less than about 0.6, it is preferable to satisfy the conditions that $\Delta 3-\Delta 4$ is not more than about −0.51% and $\Delta 1-\Delta 4$ is not more than about 0.30%.

For making $\Lambda_{th}$ smaller in the case of the trench type core under investigation than in the case of the step-index type core with equal $\lambda_{CC}$ and $A_{eff}$ of 80 µm², the preferred conditions for the case of $A_{eff}$=130 μm² and $\lambda_{CC}$=1530 nm (FIG. 7B) are as follows: when Ra is considered to be in the range of not less than about 0.5, it is preferable to satisfy the conditions that Δ3−Δ4 is not more than about −0.57% and Δ1−Δ4 is not more than about 0.24%; or, when Ra is considered to be in the range of not less than about 0.6, it is preferable to satisfy the conditions that Δ3−Δ4 is not more than about −0.56% and Δ1−Δ4 is not more than about 0.25%.

Examples of more specific design include structures of (i) to (iii) below.

(i) 2a=12.8 μm, Ra=0.6, Rb=0.819, Δ1=0.26%, Δ2=0%, Δ3=−0.55%, and Δ4=0%.
(ii) 2a=12.4 μm, Ra=0.6, Rb=0.622, Δ1=0.22%, Δ2=0%, Δ3=−0.59%, and Δ4=0%.
(iii) 2a=12.4 μm, Ra=0.6, Rb=0.673, Δ1=0.22%, Δ2=0%, Δ3=−0.59%, and Δ4=0%.

The properties in the respective structures are as described below.

In the case of (i), $A_{eff}$ is about 130 μm², $\lambda_{CC}$ is about from 1460 to 1480 nm, and $\Lambda_{th}$ is 43.3 μm at the wavelength of 1565 nm and 45.2 μm at the wavelength of 1625 nm n. The chromatic dispersion at the wavelength of 1550 nm is about 23 ps/nm/km.

In the case of (ii), $A_{eff}$ is about 130 μm², $\lambda_{CC}$ is about from 1490 to 1520 nm, and $\Lambda_{th}$ is 34.9 μm at the wavelength of 1565 nm and 36.6 μm at the wavelength of 1625 nm. The chromatic dispersion at the wavelength of 1550 nm is about 23 ps/nm/km.

In the case of (iii), $A_{eff}$ is about 130 μm², $\lambda_{CC}$ is about from 1430 to 1440 nm, and $\Lambda_{th}$ is 38.7 μm at the wavelength of 1565 nm and 40.7 μm at the wavelength of 1625 nm. The chromatic dispersion at the wavelength of 1550 nm is about 23 ps/nm/km.

It is noted herein that the certain refractive index $n_0$ may be the refractive index of pure silica or may be any other refractive index.

Among structures around the structure of (i), a preferred structure is also one satisfying structure (i.1):

$12.1 \leq 2a(\mu m) \leq 13.3$;

$0.496 \leq Ra \leq 0.739$;

$0.713 \leq Rb$;

$0.21 \leq \Delta 1(\%) \leq 0.28$;

$-0.07 \leq \Delta 2(\%) \leq 0.04$;

$-1.62 \leq \Delta 3(\%)$;

$-0.02 \leq \Delta 4(\%) \leq 0.05$.

This is the result of selection of the preferred numerical ranges of the respective parameters by the study described below. First, the necessary conditions for satisfying $\lambda_{CC} \leq 1530$ nm are as follows:

$2a(\mu m) \leq 13.3$;

$Ra \geq 0.496$;

$Rb \geq 0.713$;

$\Delta 1(\%) \leq 0.28$;

$\Delta 2(\%) \leq 0.04$;

$\Delta 3(\%) \geq -1.62$;

$\Delta 4(\%) \geq -0.02$.

Figure 8:
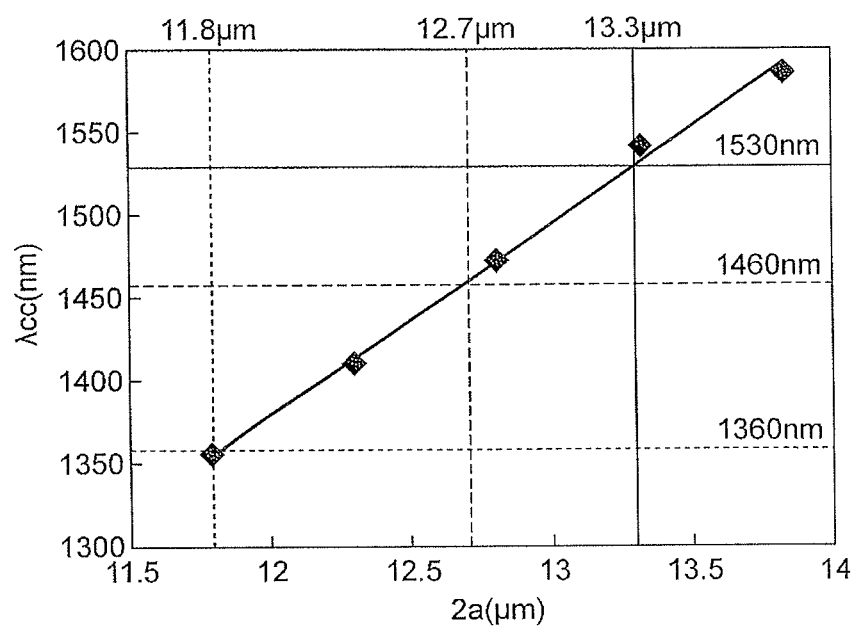
FIG. 8 is a drawing showing a relation between 2a and $\lambda_{CC}$ in trench type cores under the design center conditions of 2a=12.8 μm, Ra=0.6, Rb=0.819, Δ1=0.26%, Δ2=0%, Δ3=−0.55%, and Δ4=0%.
Figure 9:
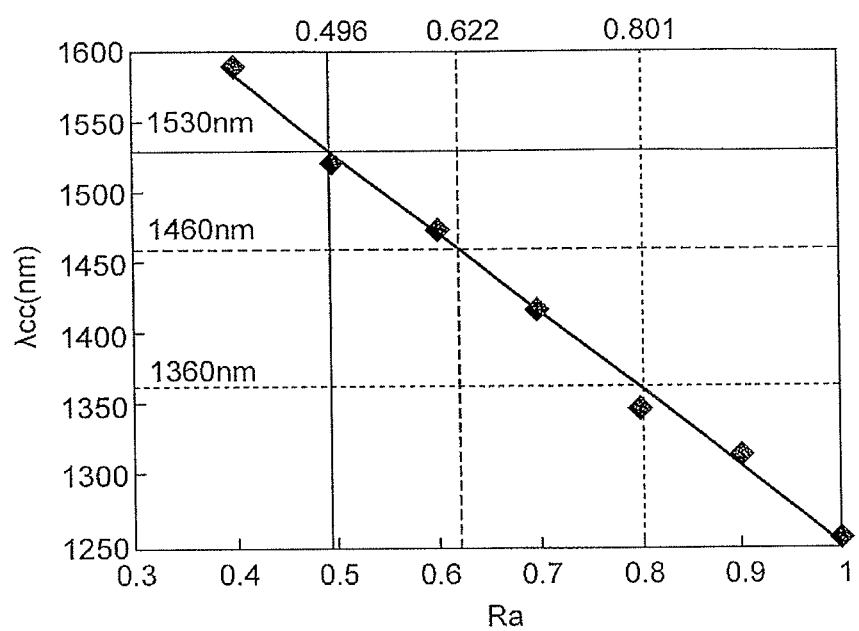
FIG. 9 is a drawing showing a relation between Ra and $\lambda_{CC}$ in the same trench type cores as in FIG. 8.
Figure 10:
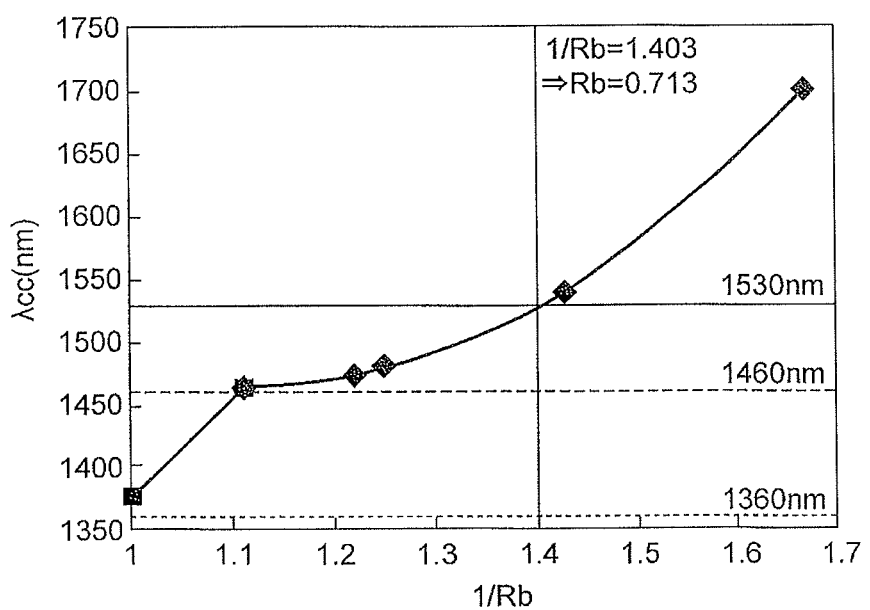
FIG. 10 is a drawing showing a relation between 1/Rb and $\lambda_{CC}$ in the same trench type cores as in FIG. 8.
Figure 11:
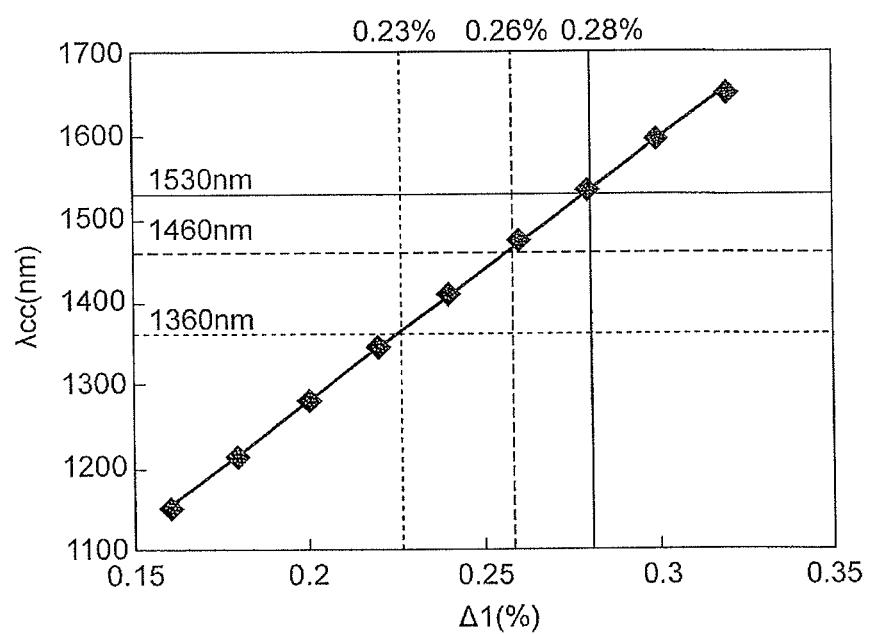
FIG. 11 is a drawing showing a relation between Δ1 and $\lambda_{CC}$ in the same trench type cores as in FIG. 8.
Figure 12:
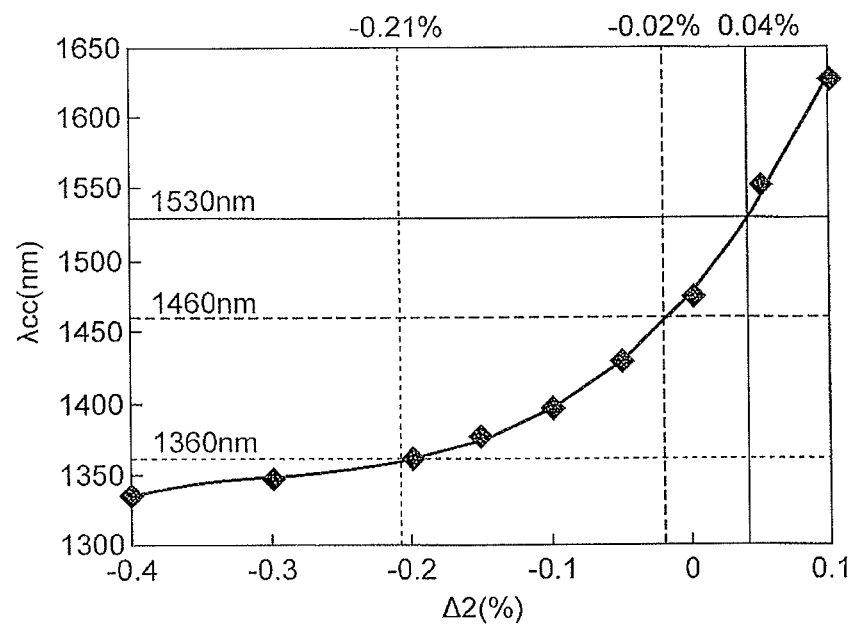
FIG. 12 is a drawing showing a relation between Δ2 and $\lambda_{CC}$ in the same trench type cores as in FIG. 8.
Figure 13:
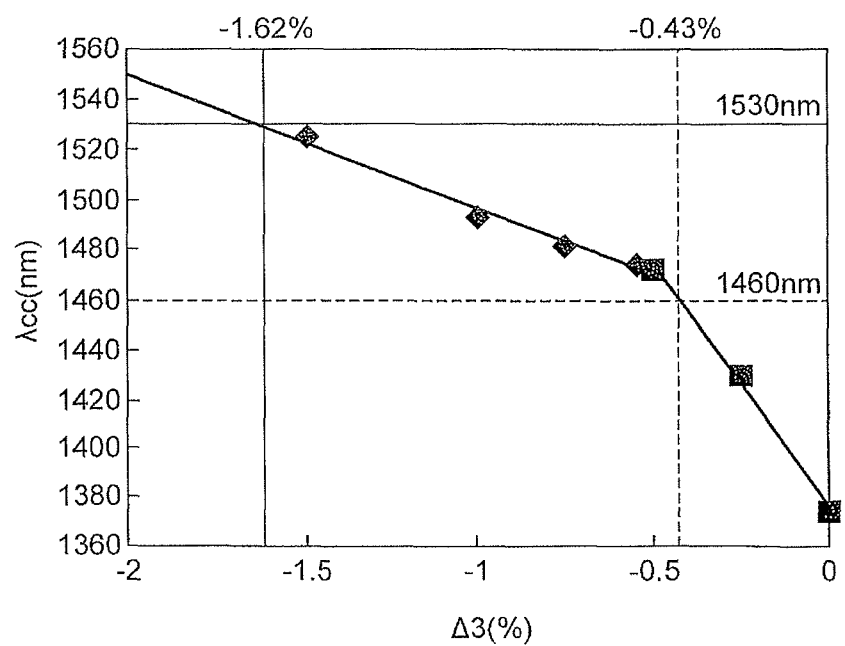
FIG. 13 is a drawing showing a relation between Δ3 and $\lambda_{CC}$ in the same trench type cores as in FIG. 8.
Figure 14:
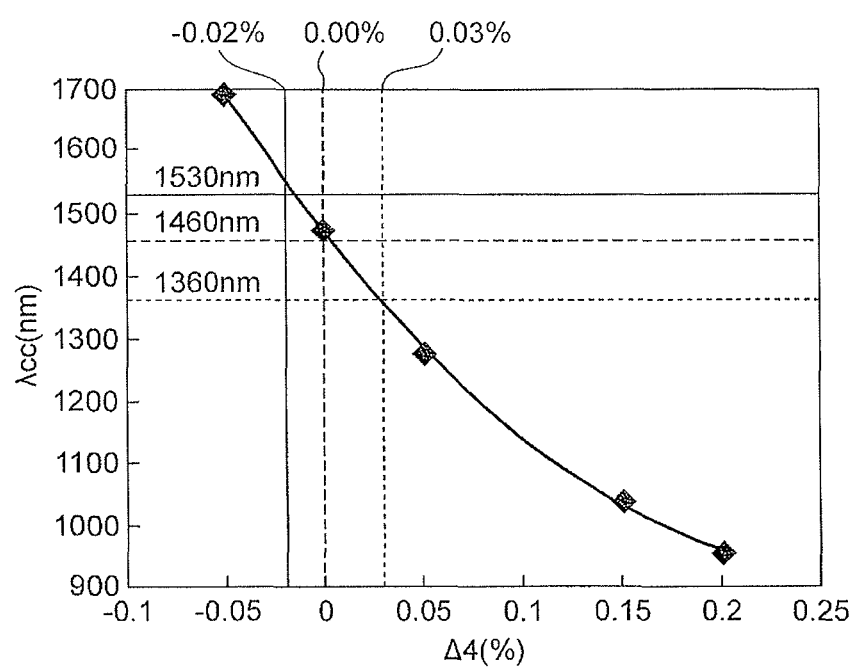
FIG. 14 is a drawing showing a relation between Δ4 and $\lambda_{CC}$ in the same trench type cores as in FIG. 8.

The above conditions are based on the inspections shown in FIGS. 8 to 14, i.e., based on the results of investigation on relations between each of the parameters of the trench type core and $\lambda_{CC}$ under the design center conditions of 2a=12.8 μm, Ra=0.6, Rb=0.819, Δ1=0.26%, Δ2=0%, Δ3=−0.55%, and Δ4=0%. FIG. 8 is a drawing showing the relation between 2a and $\lambda_{CC}$; FIG. 9 a drawing showing the relation between Ra and $\lambda_{CC}$; FIG. 10 a drawing showing the relation between 1/Rb and $\lambda_{CC}$; FIG. 11 a drawing showing the relation between Δ1 and $\lambda_{CC}$; FIG. 12 a drawing showing the relation between Δ2 and $\lambda_{CC}$; FIG. 13 a drawing showing the relation between Δ3 and $\lambda_{CC}$; FIG. 14 a drawing showing the relation between Δ4 and $\lambda_{CC}$. A conceivable reason for intermediate change of dependence tendency as to 1/Rb (FIG. 10) and Δ3 (FIG. 13) is that the way of leakage of higher mode changes depending upon whether the effective refractive index by the higher mode to be cut off is higher or lower than the refractive index of the cladding.

Figure 15:
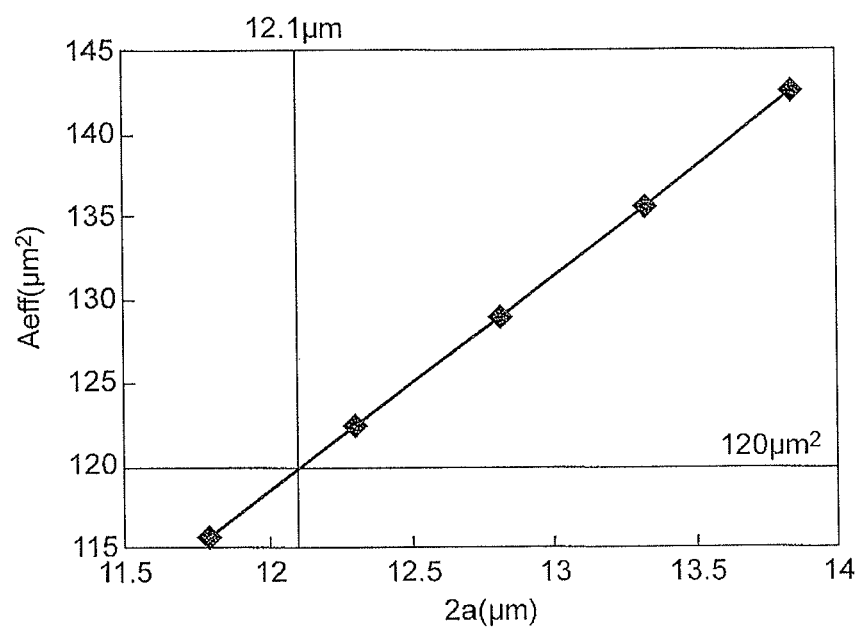
FIG. 15 is a drawing showing a relation between 2a and $A_{eff}$ in trench type cores under the design center conditions of 2a=12.8 μm, Ra=0.6, Rb=0.819, Δ1=0.26%, Δ2=0%, Δ3=−0.55%, and Δ4=0%.
Figure 16:
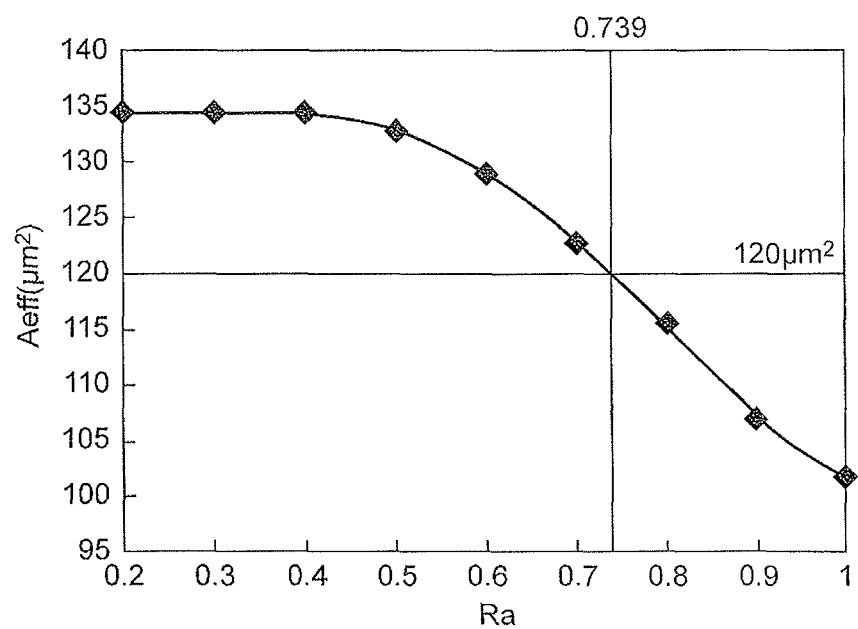
FIG. 16 is a drawing showing a relation between Ra and $A_{eff}$ in the same trench type cores as in FIG. 15.
Figure 17:
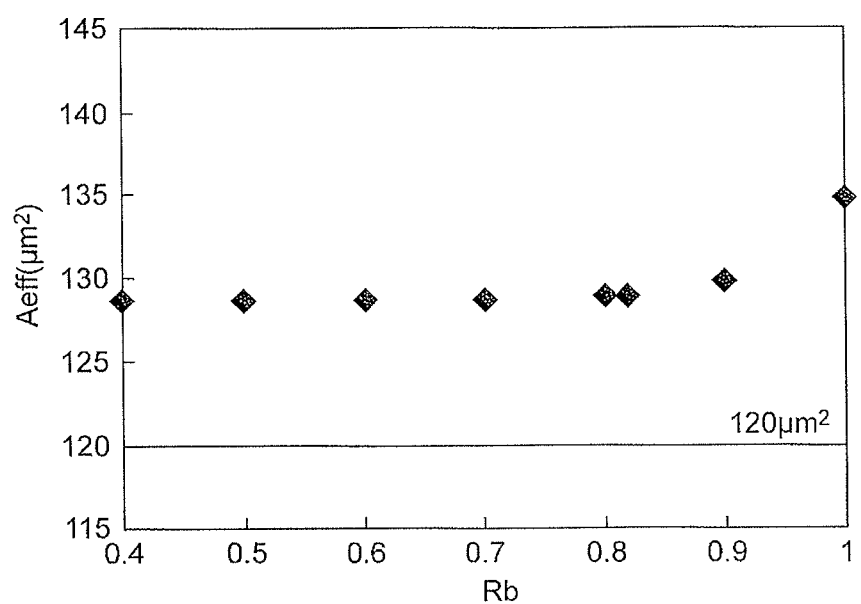
FIG. 17 is a drawing showing a relation between 1/Rb and $A_{eff}$ in the same trench type cores as in FIG. 15.
Figure 18:
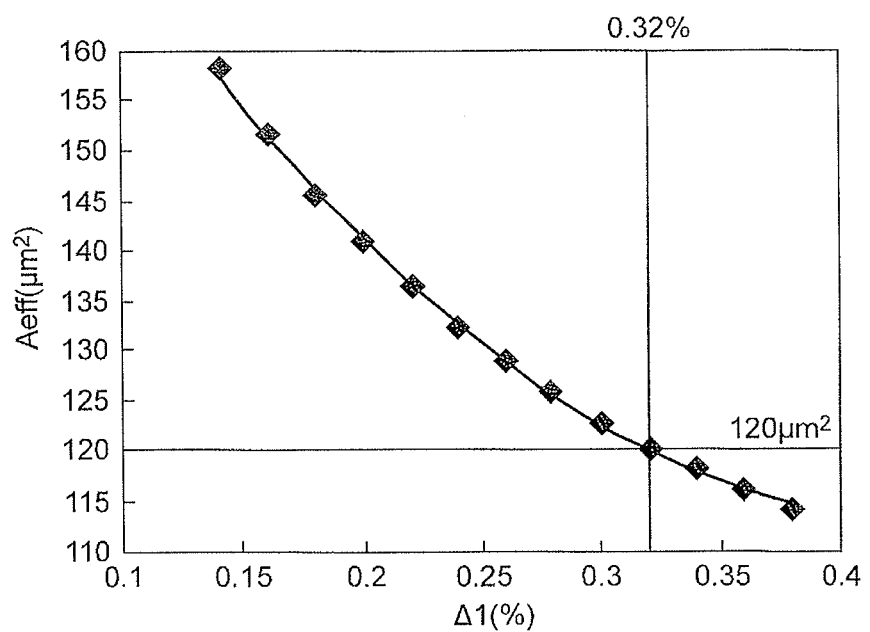
FIG. 18 is a drawing showing a relation between Δ1 and $A_{eff}$ in the same trench type cores as in FIG. 15.
Figure 19:
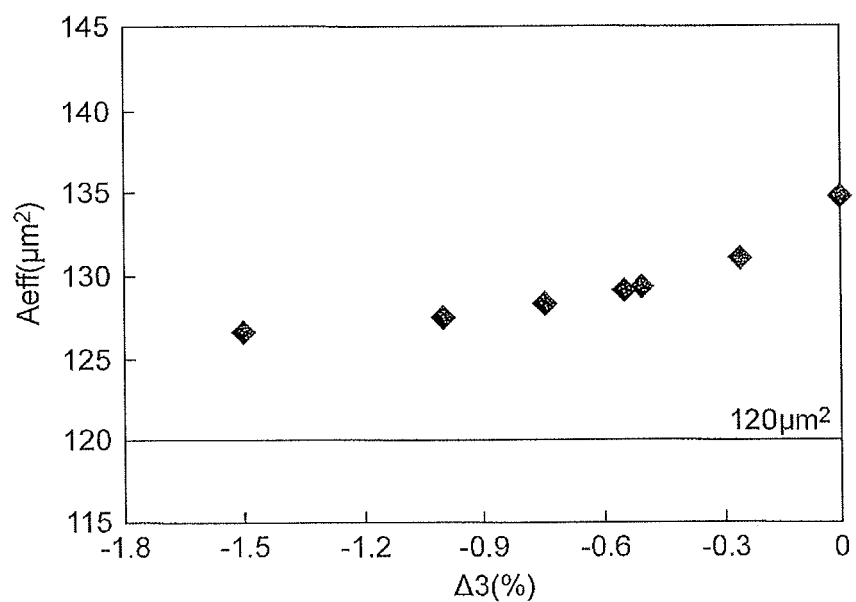
FIG. 19 is a drawing showing a relation between Δ2 and $A_{eff}$ in the same trench type cores as in FIG. 15.
Figure 20:
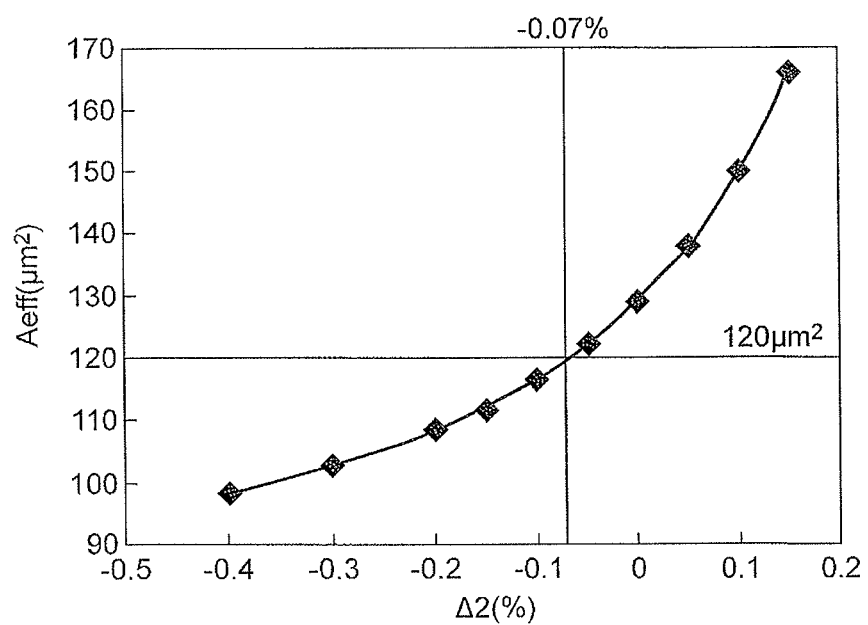
FIG. 20 is a drawing showing a relation between Δ3 and $A_{eff}$ in the same trench type cores as in FIG. 15.
Figure 21:
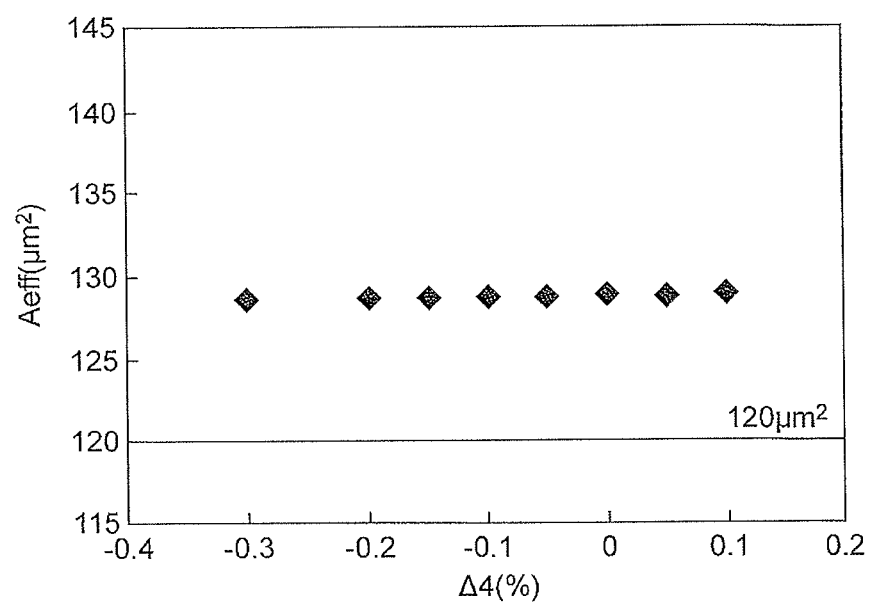
FIG. 21 is a drawing showing a relation between Δ4 and $A_{eff}$ in the same trench type cores as in FIG. 15.

FIGS. 15 to 21 show the results of investigation on relations between each of the parameters of the trench type core and $A_{eff}$ under the design center conditions of 2a=12.8 μm, Ra=0.6, Rb=0.819, Δ1=0.26%, Δ2=0%, Δ3=−0.55%, and Δ4=0%. FIG. 15 is a drawing showing the relation between 2a and $A_{eff}$; FIG. 16 a drawing showing the relation between Ra and $A_{eff}$; FIG. 17 a drawing showing the relation between 1/Rb and $A_{eff}$; FIG. 18 a drawing showing the relation between Δ1 and $A_{eff}$; FIG. 19 a drawing showing the relation between Δ2 and $A_{eff}$; FIG. 20 a drawing showing the relation between Δ3 and $A_{eff}$; FIG. 21 a drawing showing the relation between Δ4 and $A_{eff}$. It is found from these results that the necessary conditions for satisfying $A_{eff} \geq 120$ μm² are as follows:

$2a(\mu m) \geq 12.1$;

$Ra \leq 0.739$;

$\Delta 1(\%) \leq 0.32$ $\Delta 2(\%) \geq -0.07$.

Figure 22:
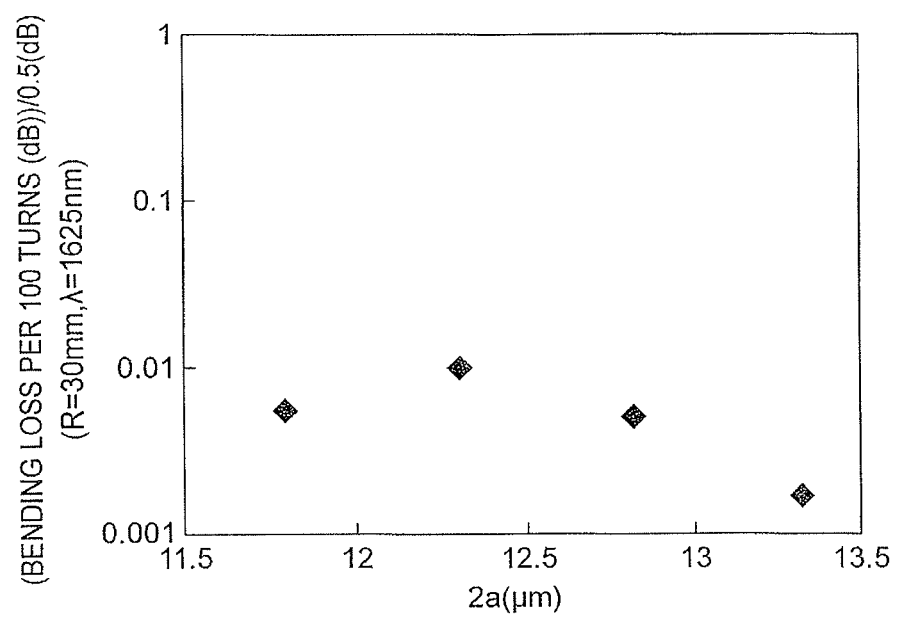
FIG. 22 is a drawing showing a relation between 2a and normalized bending loss in trench type cores under the design center conditions of 2a=12.8 μm, Ra=0.6, Rb=0.819, Δ1=0.26%, Δ2=0%, Δ3=−0.55%, and Δ4=0%.
Figure 23:
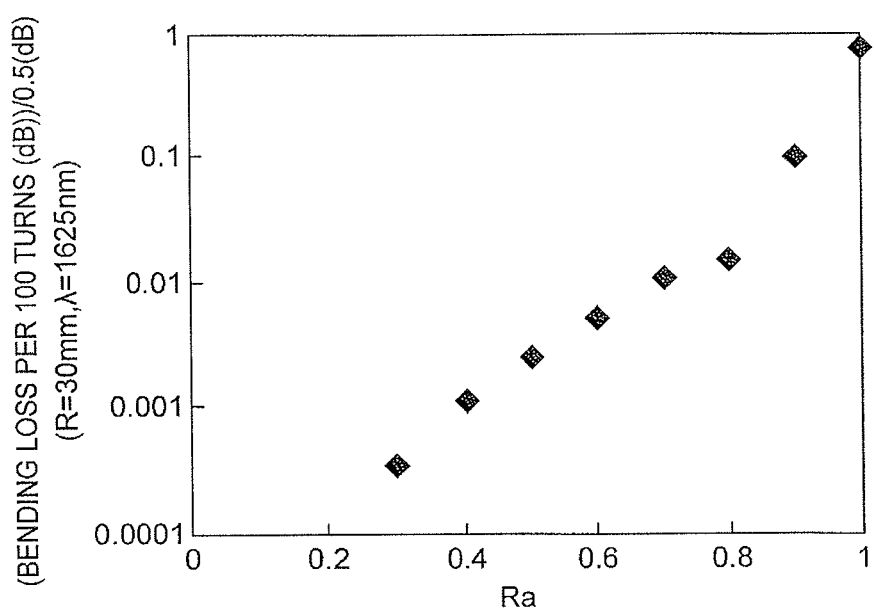
FIG. 23 is a drawing showing a relation between Ra and normalized bending loss in the same trench type cores as in FIG. 22.
Figure 24:
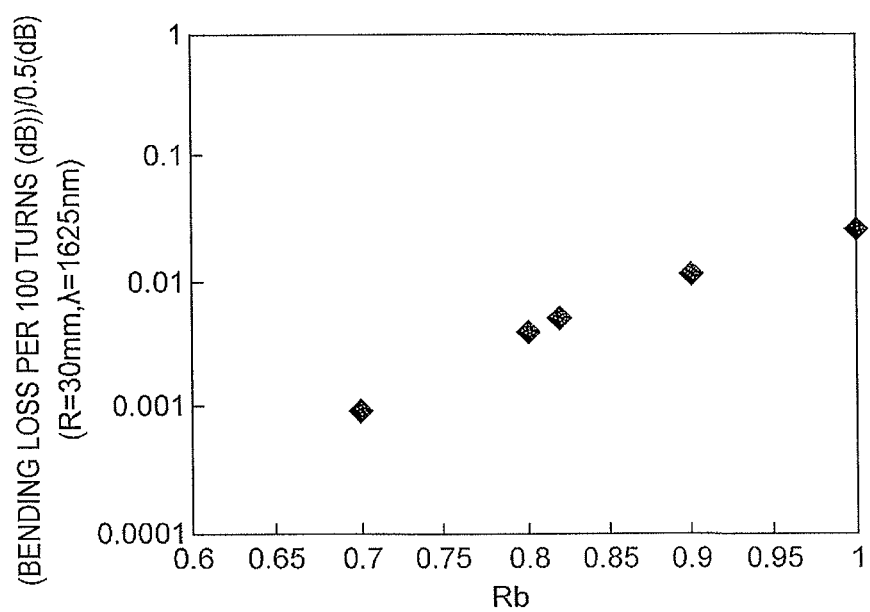
FIG. 24 is a drawing showing a relation between 1/Rb and normalized bending loss in the same trench type cores as in FIG. 22.
Figure 25:
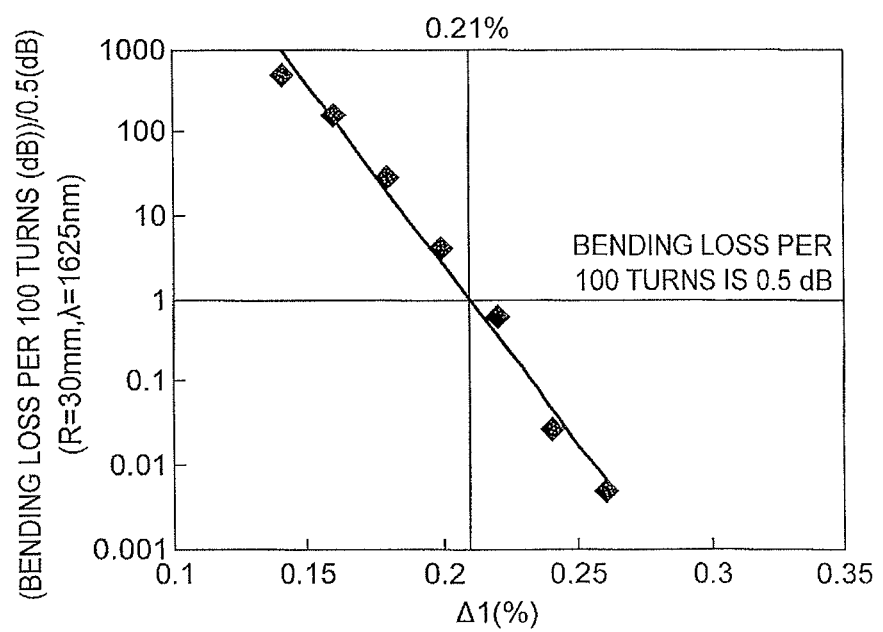
FIG. 25 is a drawing showing a relation between Δ1 and normalized bending loss in the same trench type cores as in FIG. 22.
Figure 26:
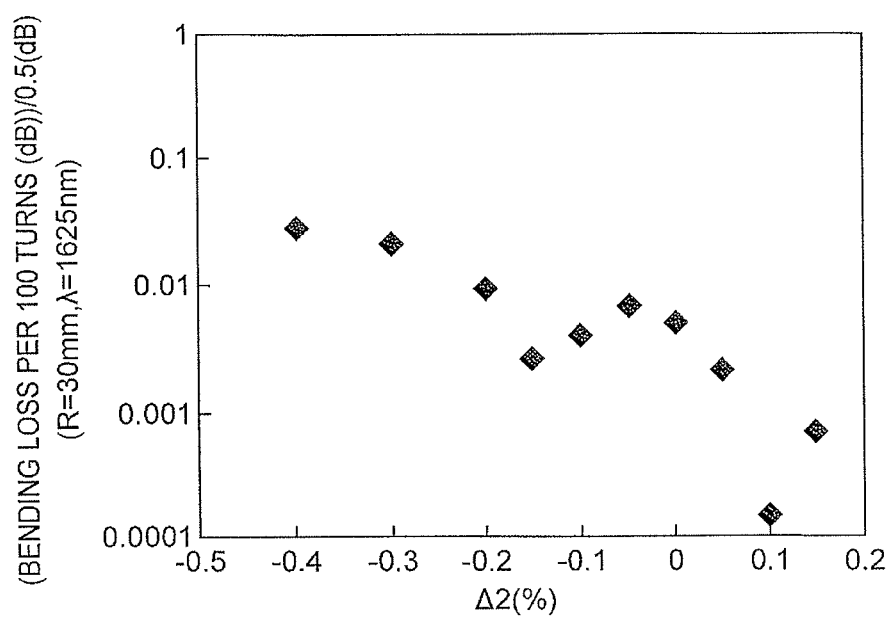
FIG. 26 is a drawing showing a relation between Δ2 and normalized bending loss in the same trench type cores as in FIG. 22.
Figure 27:
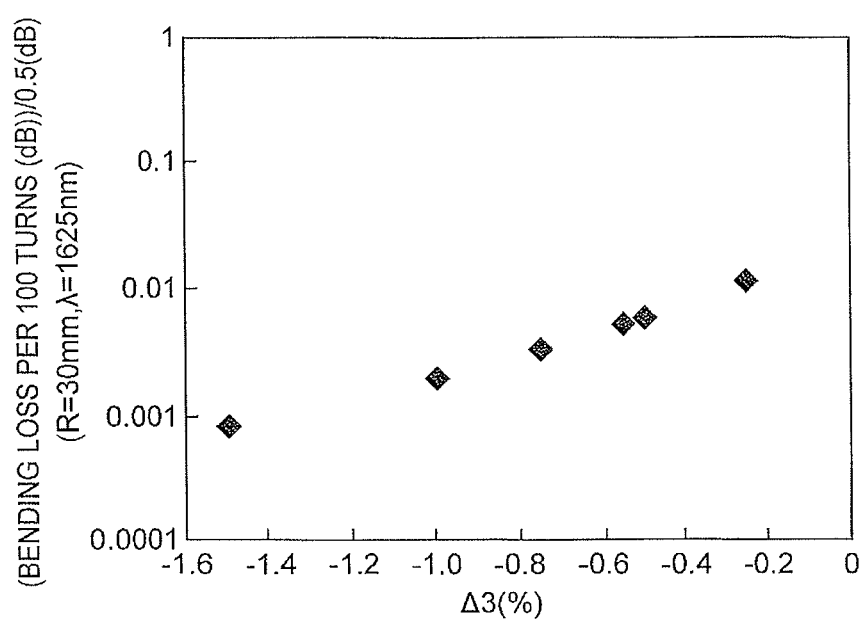
FIG. 27 is a drawing showing a relation between Δ3 and normalized bending loss in the same trench type cores as in FIG. 22.
Figure 28:
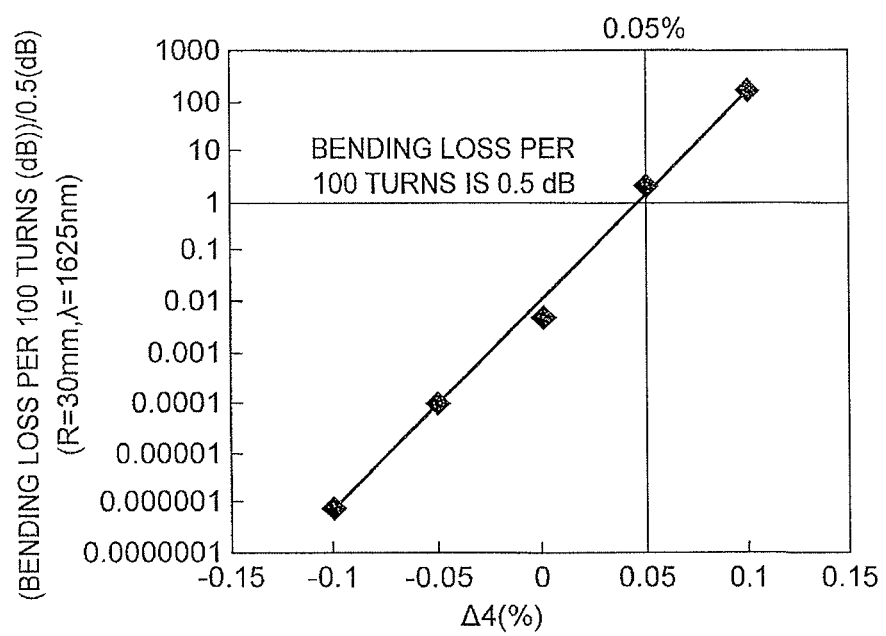
FIG. 28 is a drawing showing a relation between Δ4 and normalized bending loss in the same trench type cores as in FIG. 22.

Furthermore, FIGS. 22 to 28 show the results of investigation on relations between each of the parameters of the trench type core and normalized bending loss under the design center conditions of 2a=12.8 μm, Ra=0.6, Rb=0.819, Δ1=0.26%, Δ2=0%, Δ3=−0.55%, and Δ4=0%. The normalized bending loss herein refers to a value obtained by dividing a bending loss per 100 turns (dB/100 turns) in the bending radius of 30 mm at the wavelength 1625 nm, by 0.5 dB. If it is 1 or less, the bending loss per 100 turns becomes 0.5 dB/100 turns or less. FIG. 22 is a drawing showing the relation between 2a and normalized bending loss; FIG. 23 a drawing showing the relation between Ra and normalized bending loss; FIG. 24 a drawing showing the relation between 1/Rb and normalized bending loss; FIG. 25 a drawing showing the relation between Δ1 and normalized bending loss; FIG. 26 a drawing showing the relation between Δ2 and normalized bending loss; FIG. 27 a drawing showing the relation between Δ3 and normalized bending loss; FIG. 28 a drawing showing the relation between Δ4 and normalized bending loss. It is found from these results that the necessary conditions for the bending loss per 100 turns in the bending radius of 30 mm at the wavelength of 1625 nm to satisfy 0.5 dB/100 turns or less are as follows:

$\Delta 1(\%) \geq 0.21$;

$\Delta 4(\%) \leq 0.05$.

In terms of the chromatic dispersion, in the range satisfying the structure (i. 1), the chromatic dispersion at the wavelength of 1550 nm is preferably a value over at least 20 ps/nm/km.

In terms of the transmission loss as well, the structure satisfying the structure (i. 1) is preferred. The major factor for the transmission loss is Rayleigh scattering, and the transmission loss due to Rayleigh scattering can be calculated from a distribution of Rayleigh scattering coefficients (Rayleigh scattering coefficients of materials) in the cross section of MCF and a power distribution of propagation modes. It is, however, confirmed by calculation that the transmission loss due to Rayleigh scattering at the wavelength of 1550 nm in the case of the structure (i. 1) is smaller than that in the core structure described in Reference Literature 5 realizing 0.181 dB/km or less.

Figure 29:
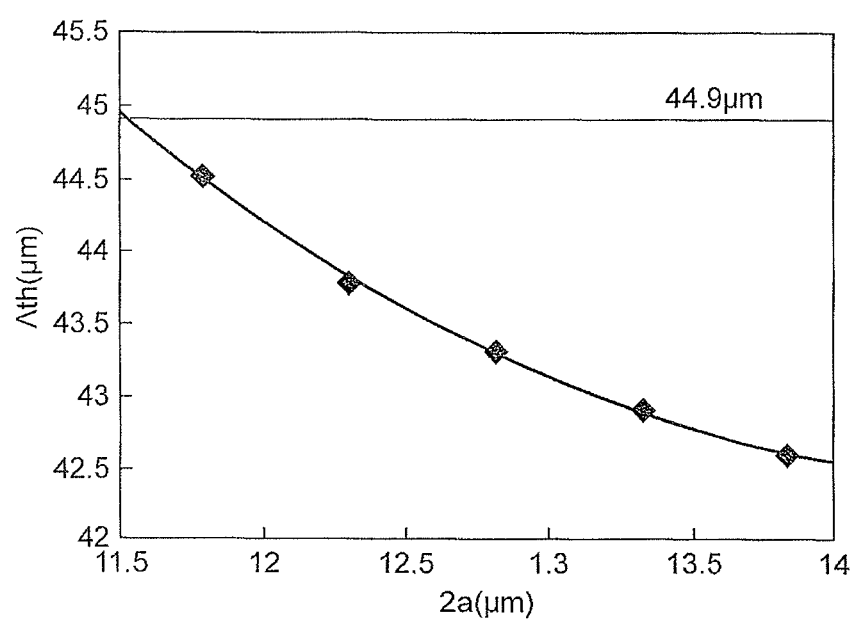
FIG. 29 is a drawing showing a relation between 2a and $\Lambda_{th}$ at the wavelength of 1565 nm in trench type cores under the design center conditions of 2a=12.8 μm, Ra=0.6, Rb=0.819, Δ1=0.26%, Δ2=0%, Δ3=−0.55%, and Δ4=0%.
Figure 30:
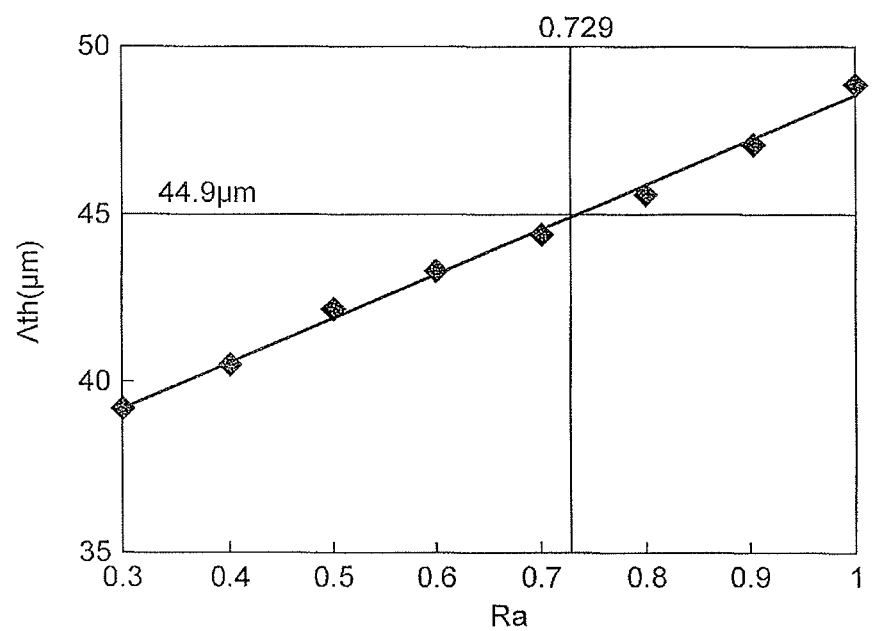
FIG. 30 is a drawing showing a relation between Ra and $\Lambda_{th}$ in the same trench type cores as in FIG. 29.
Figure 31:
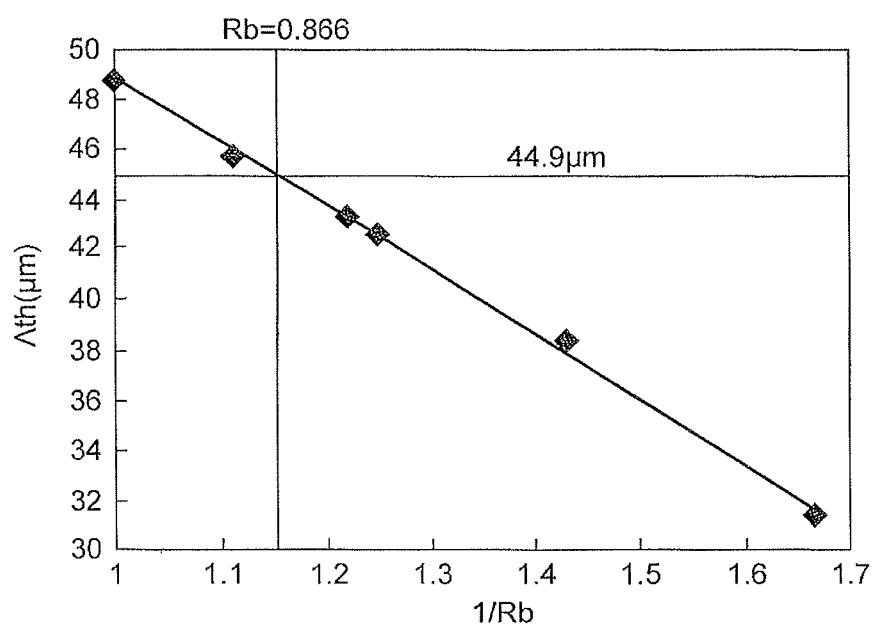
FIG. 31 is a drawing showing a relation between 1/Rb and $\Lambda_{th}$ in the same trench type cores as in FIG. 29.
Figure 32:
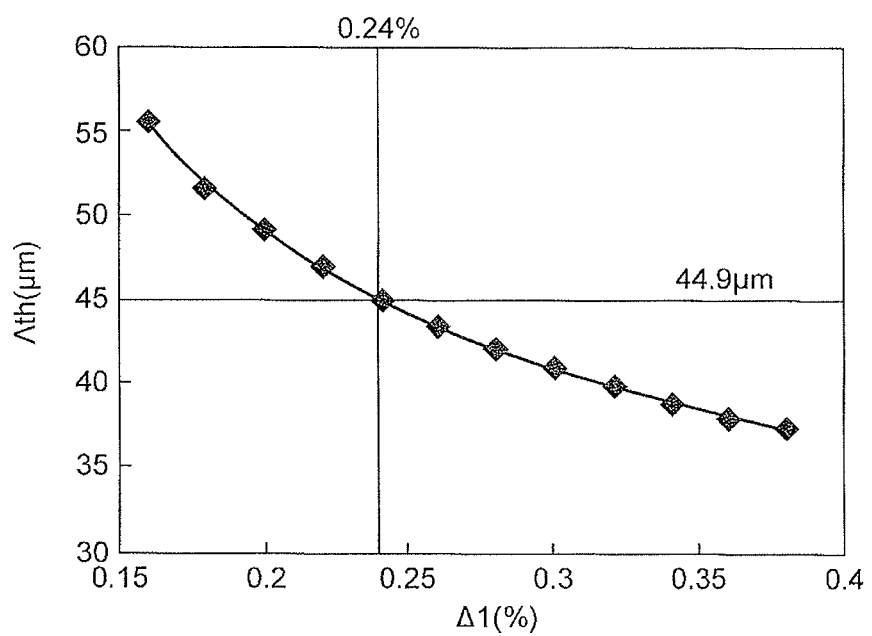
FIG. 32 is a drawing showing a relation between Δ1 and $\Lambda_{th}$ in the same trench type cores as in FIG. 29.
Figure 33:
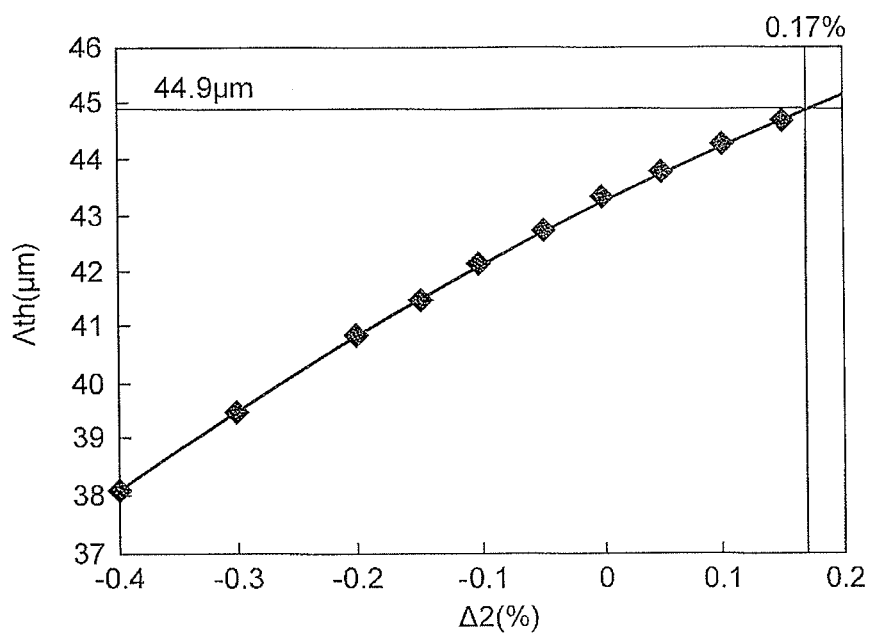
FIG. 33 is a drawing showing a relation between Δ2 and $\Lambda_{th}$ in the same trench type cores as in FIG. 29.
Figure 34:
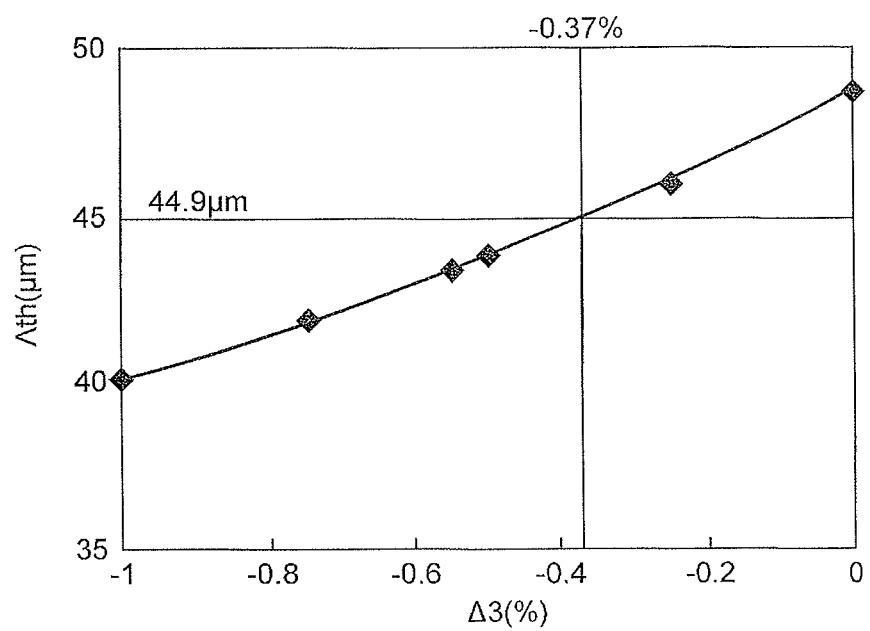
FIG. 34 is a drawing showing a relation between Δ3 and $\Lambda_{th}$ in the same trench type cores as in FIG. 29.
Figure 35:
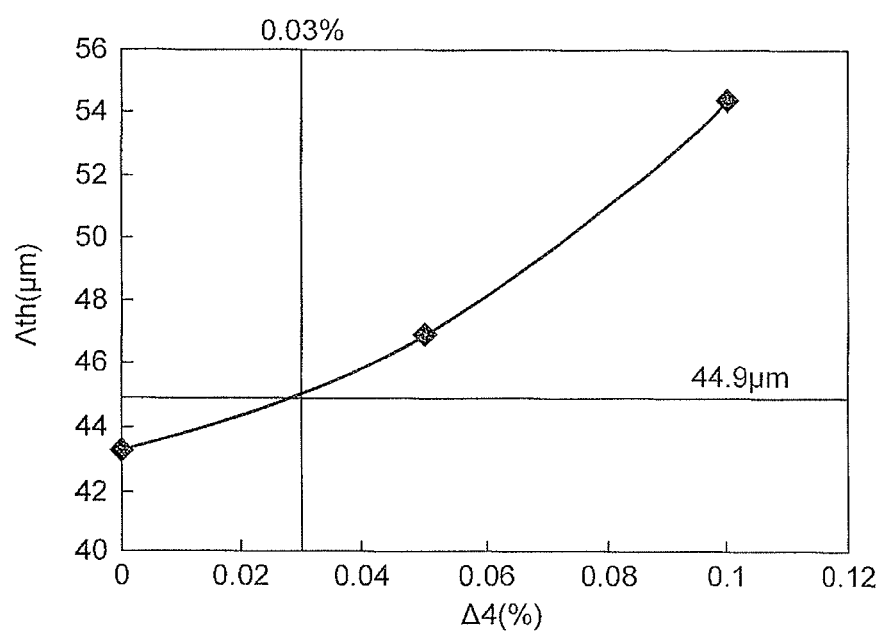
FIG. 35 is a drawing showing a relation between Δ4 and $\Lambda_{th}$ in the same trench type cores as in FIG. 29.

A further necessary condition in addition to the above conditions in order to keep $\Lambda_{th}$ smaller than in the case of the step-index type core with $A_{eff}$=130 μm² and $\lambda_{CC}$=1530 nm can be, in the case of $\Lambda_{th}$ at the wavelength of 1565 nm, that $\Lambda_{th}$ is not more than about 44.9 μm. Investigation was conducted in view of this point. FIGS. 29 to 35 show the results of investigation on relations between each of the parameters of the trench type core and $\Lambda_{th}$ at the wavelength of 1565 nm under the design center conditions of 2a=12.8 μm, Ra=0.6, Rb=0.819, Δ1=0.26%, Δ2=0%, Δ3=−0.55%, and Δ4=0%. FIG. 29 is a drawing showing the relation between 2a and $\Lambda_{th}$; FIG. 30 a drawing showing the relation between Ra and $\Lambda_{th}$;

FIG. 31 a drawing showing the relation between 1/Rb and $\Lambda_{th}$; FIG. 32 a drawing showing the relation between Δ1 and $\Lambda_{th}$; FIG. 33 a drawing showing the relation between Δ2 and $\Lambda_{th}$; FIG. 34 a drawing showing the relation between Δ3 and $\Lambda_{th}$; FIG. 35 a drawing showing the relation between Δ4 and $\Lambda_{th}$. Since it is found by these results that it is preferable to satisfy the following conditions:

$Ra \leq 0.729$;

$Rb \leq 0.866$;

$\Delta 1(\%) \geq 0.24$;

$\Delta 3(\%) \leq -0.37$;

$\Delta 4(\%) \leq 0.03$, it is more preferable in view of these to adopt a structure satisfying structure (i. 2):

$12.1 \leq 2a(\mu m) \leq 13.3$;

$0.496 \leq Ra \leq 0.729$;

$0.713 \leq Rb \leq 0.866$;

$0.24 \leq \Delta 1(\%) \leq 0.28$;

$-0.07 \leq \Delta 2(\%) \leq 0.04$;

$-1.62 \leq \Delta 3(\%) \leq -0.37$;

$-0.02 \leq \Delta 4(\%) \leq 0.03$.

Next, among structures around the structure of (ii), a preferred structure is also one satisfying structure (ii. 1):

$11.7 \leq 2a(\mu m) \leq 12.4$;

$0.596 \leq Ra \leq 0.699$;

$0.618 \leq Rb \leq 0.787$;

$0.18 \leq \Delta 1(\%) \leq 0.22$;

$-0.05 \leq \Delta 2(\%) \leq 0.02$;

$-0.59 \leq \Delta 3(\%) \leq -0.25$;

$-0.01 \leq \Delta 4(\%) \leq 0.04$.

Figure 36:
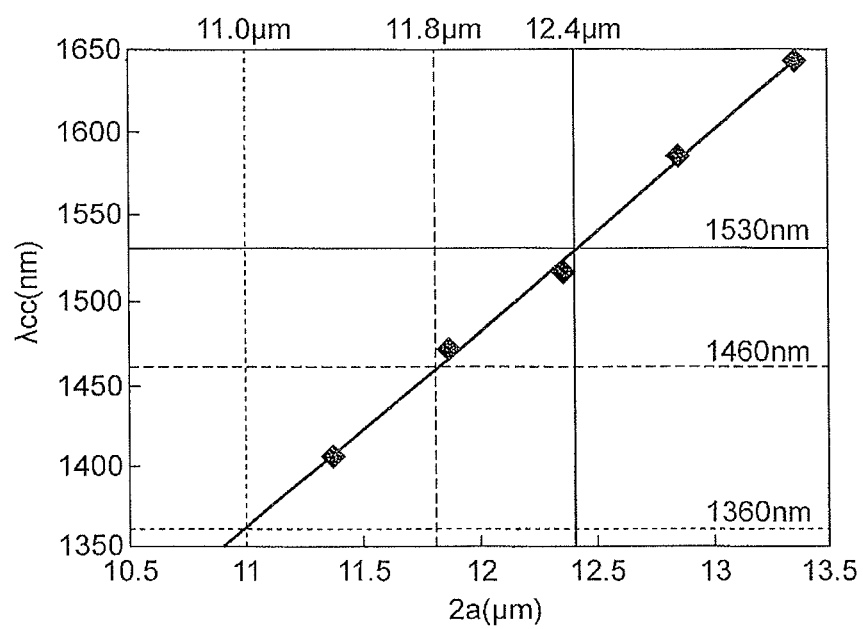
FIG. 36 is a drawing showing a relation between 2a and $\lambda_{CC}$ in trench type cores under the design center conditions of 2a=12.4 μm, Ra=0.6, Rb=0.622, Δ1=0.22%, Δ2=0%, Δ3=−0.59%, and Δ4=0%.
Figure 37:
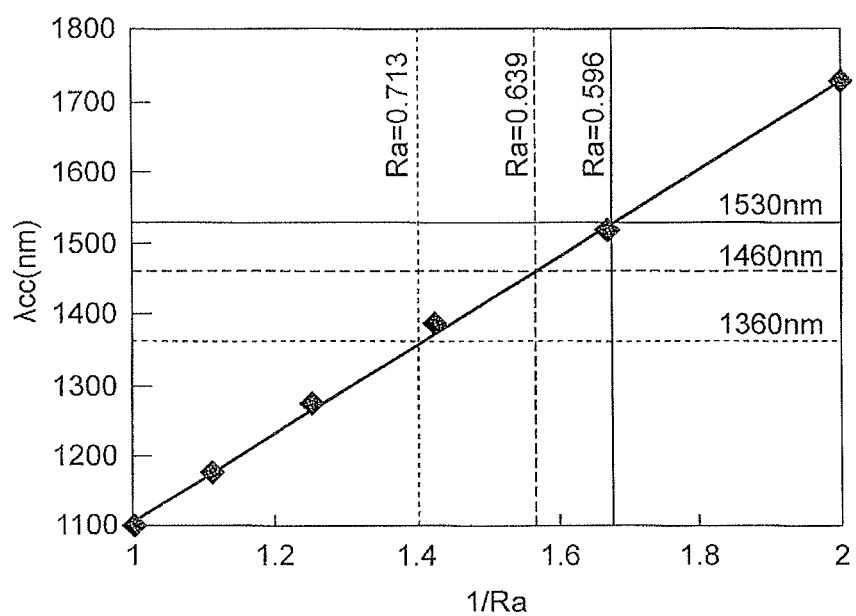
FIG. 37 is a drawing showing a relation between Ra and $\lambda_{CC}$ in the same trench type cores as in FIG. 36.
Figure 38:
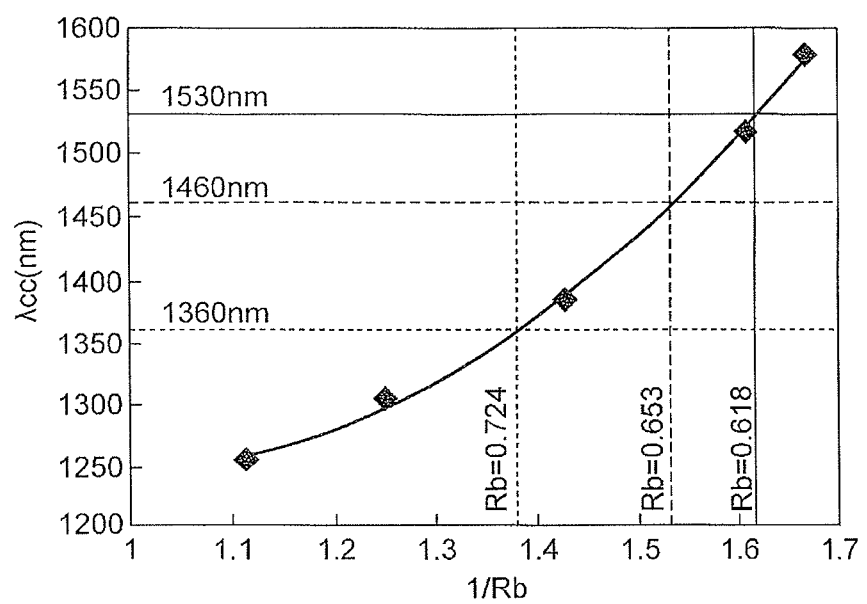
FIG. 38 is a drawing showing a relation between 1/Rb and $\lambda_{CC}$ in the same trench type cores as in FIG. 36.
Figure 39:
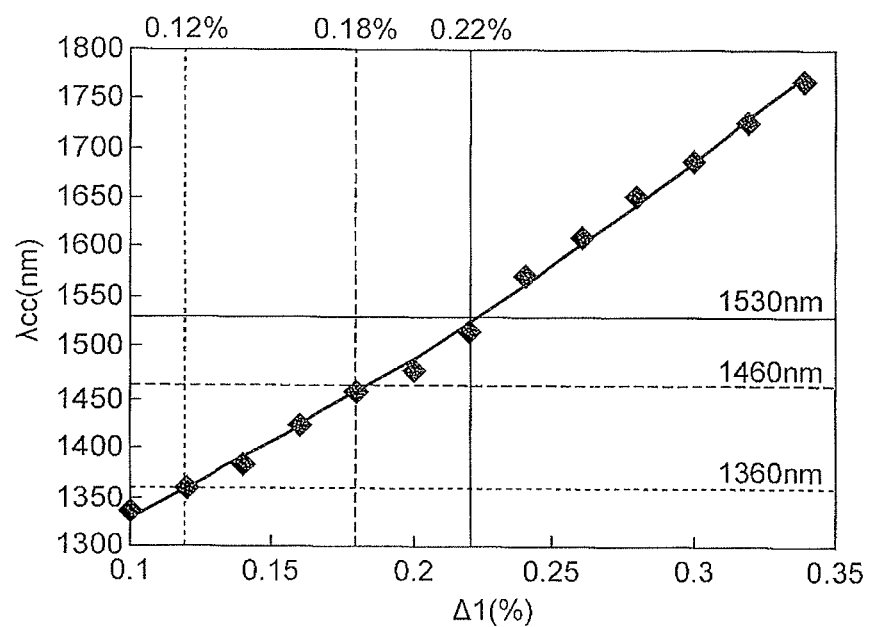
FIG. 39 is a drawing showing a relation between Δ1 and $\lambda_{CC}$ in the same trench type cores as in FIG. 36.
Figure 40:
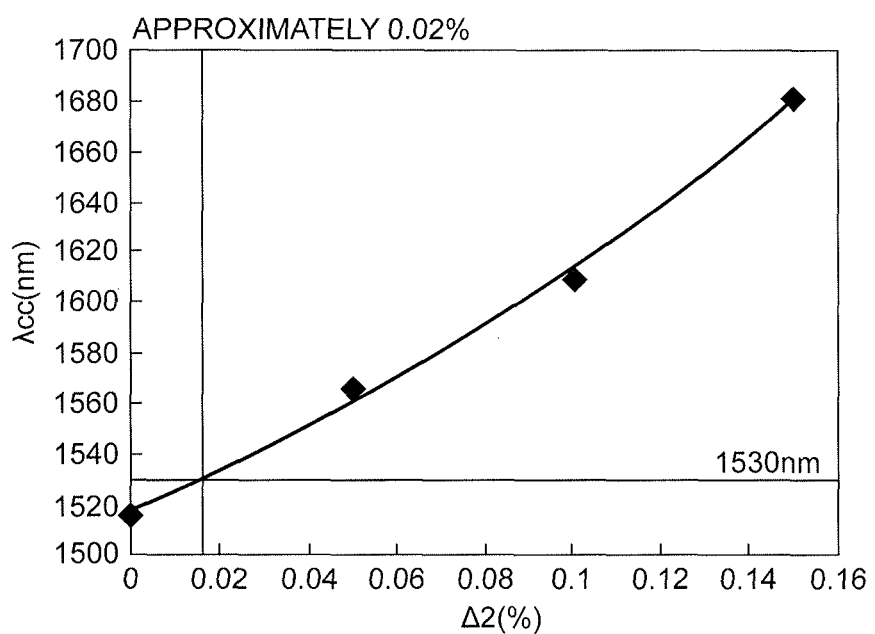
FIG. 40 is a drawing showing a relation between Δ2 and $\lambda_{CC}$ in the same trench type cores as in FIG. 36.
Figure 41:
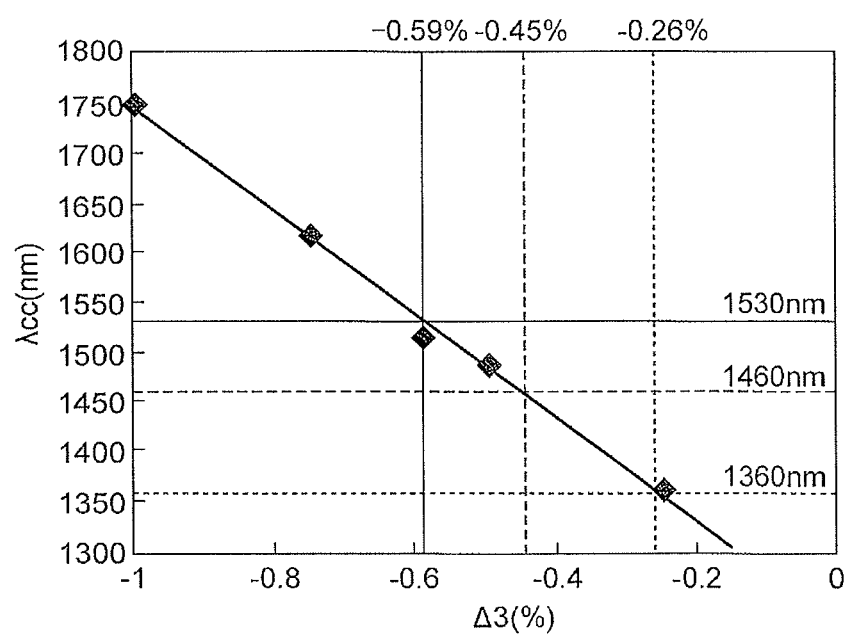
FIG. 41 is a drawing showing a relation between Δ3 and $\lambda_{CC}$ in the same trench type cores as in FIG. 36.
Figure 42:
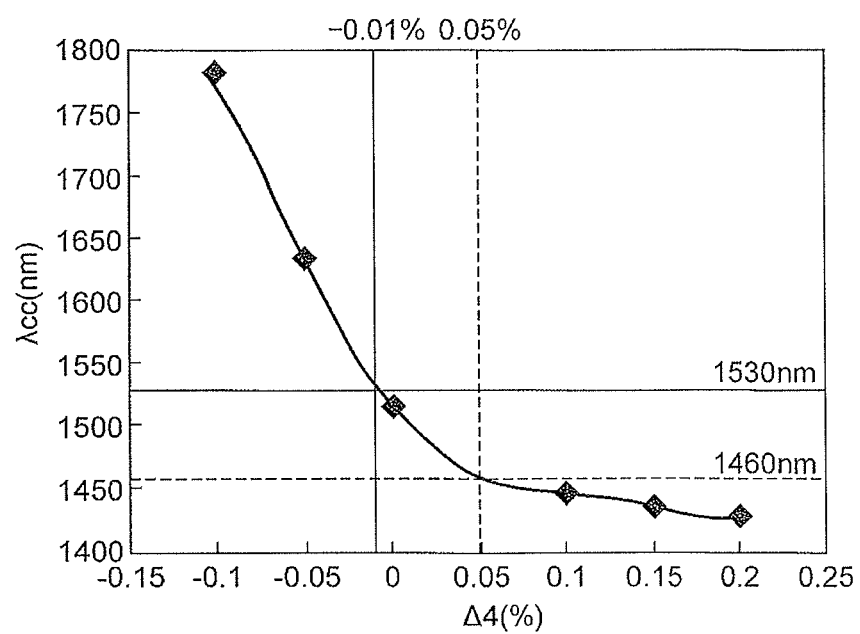
FIG. 42 is a drawing showing a relation between Δ4 and $\lambda_{CC}$ in the same trench type cores as in FIG. 36.

FIGS. 36 to 42 show the results of investigation on relations between each of the parameters of the trench type core and $\lambda_{CC}$ under the design center conditions of 2a=12.4 μm, Ra=0.6, Rb=0.622, Δ1=0.22%, Δ2=0%, Δ3=−0.59%, and Δ4=0%. FIG. 36 is a drawing showing the relation between 2a and $\lambda_{CC}$; FIG. 37 a drawing showing the relation between Ra and $\lambda_{CC}$; FIG. 38 a drawing showing the relation between 1/Rb and $\lambda_{CC}$; FIG. 39 a drawing showing the relation between Δ1 and $\lambda_{CC}$; FIG. 40 a drawing showing the relation between Δ2 and $\lambda_{CC}$; FIG. 41 a drawing showing the relation between Δ3 and $\lambda_{CC}$; FIG. 42 a drawing showing the relation between Δ4 and $\lambda_{CC}$. It is found from these results that the necessary conditions for satisfying $\lambda_{CC} \leq 1530$ nm are as follows:

$2a(\mu m) \leq 12.4$;

$Ra \geq 0.596$;

$Rb \geq 0.618$;

$\Delta 1(\%) \leq 0.22$;

$\Delta 2(\%) \leq 0.02$;

$\Delta 3(\%) \geq -0.59$;

$\Delta 4(\%) \geq -0.01$.

Figure 43:
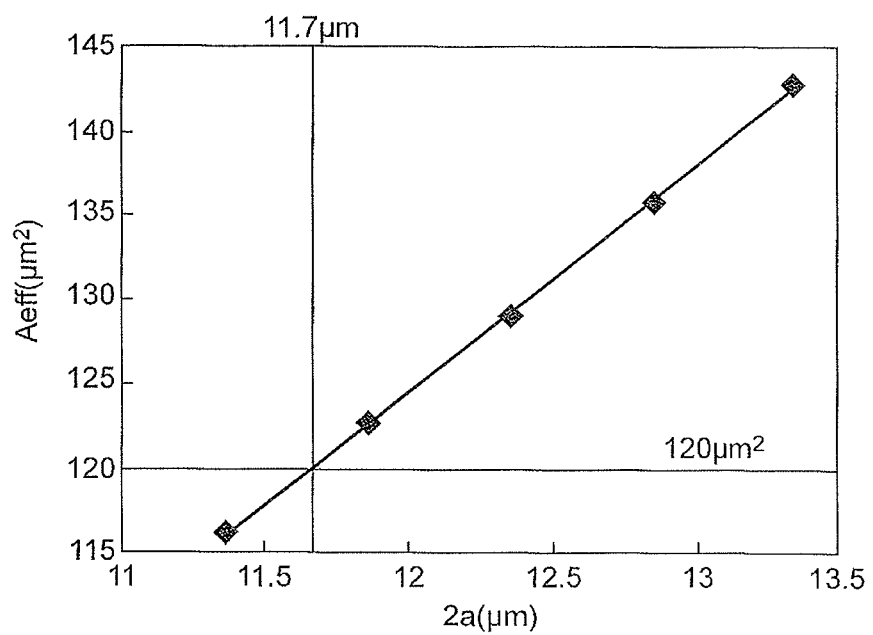
FIG. 43 is a drawing showing a relation between 2a and $A_{eff}$ in trench type cores under the design center conditions of 2a=12.4 μm, Ra=0.6, Rb=0.622, Δ1=0.22%, Δ2=0%, Δ3=−0.59%, and Δ4=0%.
Figure 44:
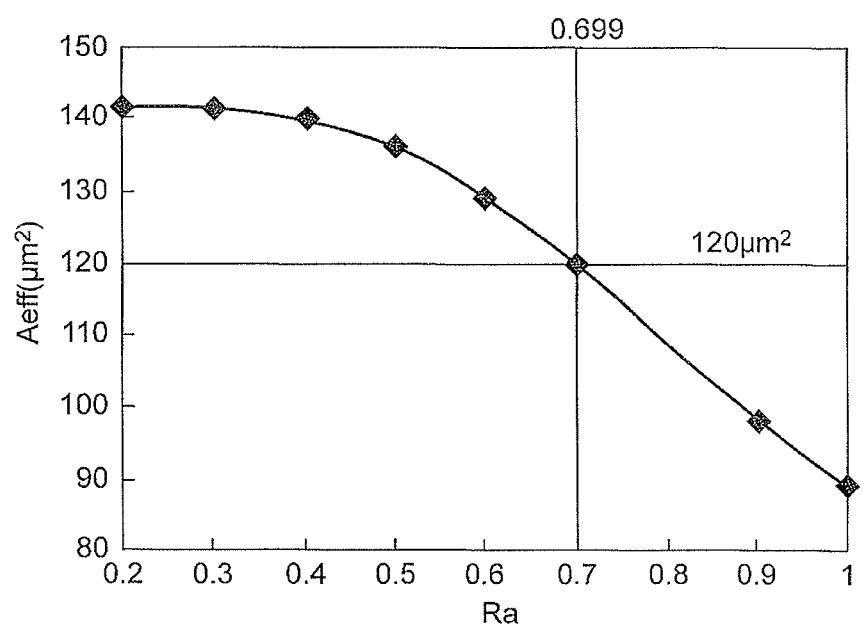
FIG. 44 is a drawing showing a relation between Ra and $A_{eff}$ in the same trench type cores as in FIG. 43.
Figure 45:
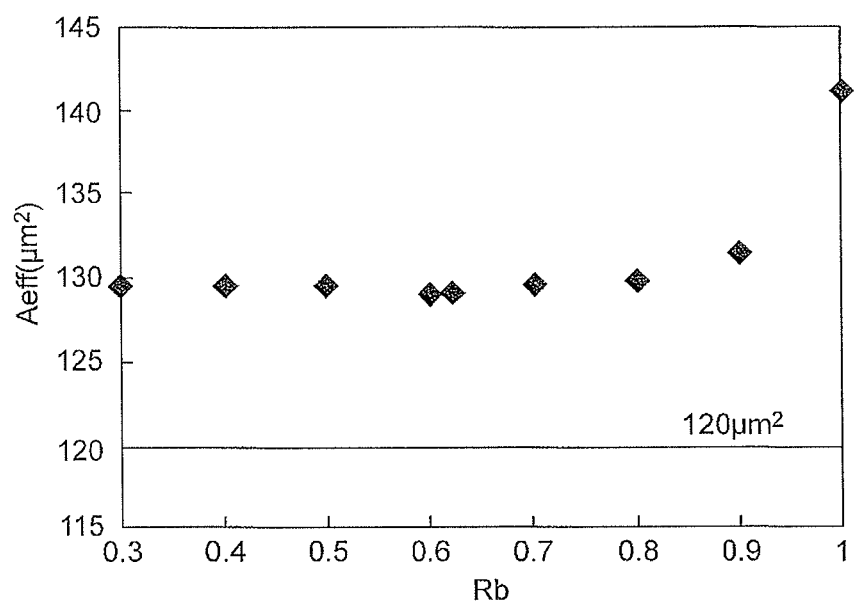
FIG. 45 is a drawing showing a relation between 1/Rb and $A_{eff}$ in the same trench type cores as in FIG. 43.
Figure 46:
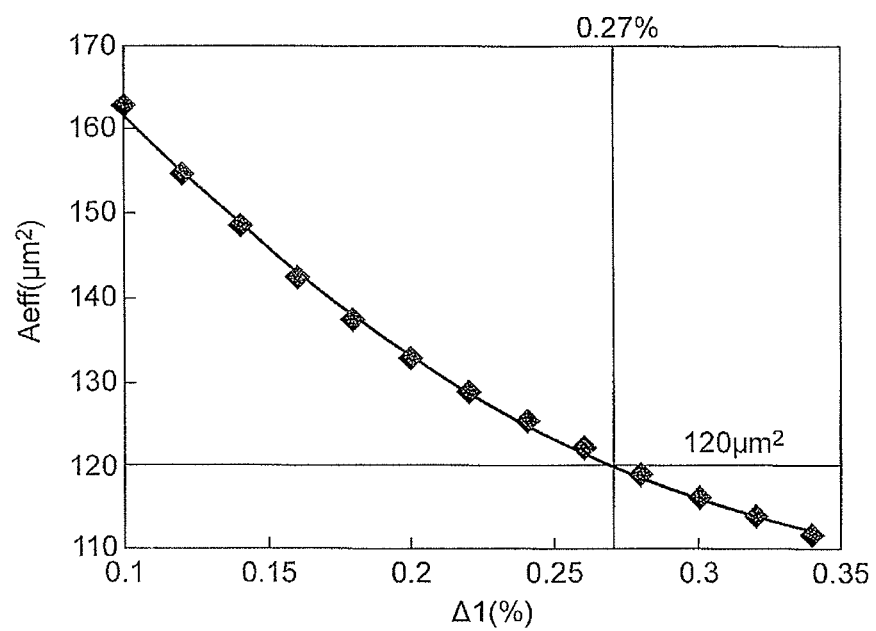
FIG. 46 is a drawing showing a relation between Δ1 and $A_{eff}$ in the same trench type cores as in FIG. 43.
Figure 47:
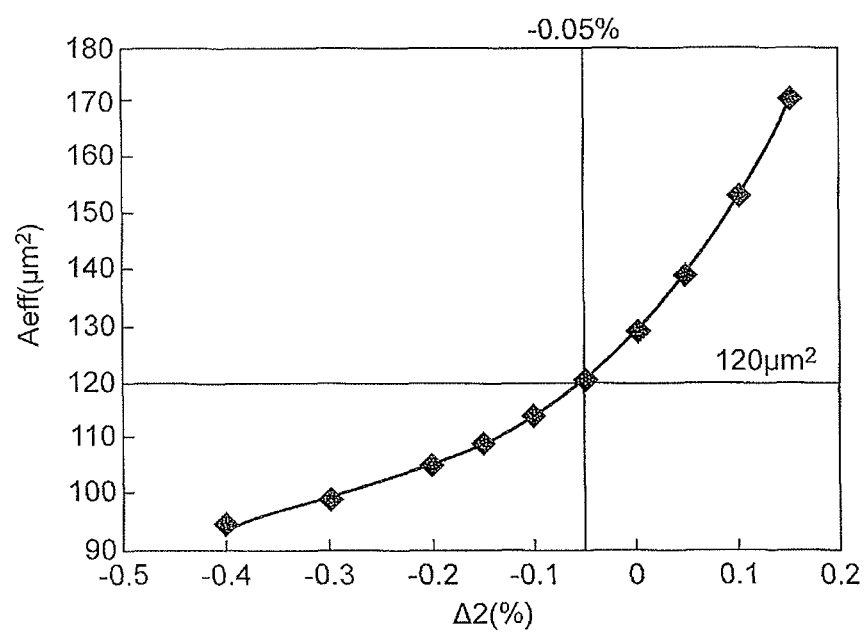
FIG. 47 is a drawing showing a relation between Δ2 and $A_{eff}$ in the same trench type cores as in FIG. 43.
Figure 48:
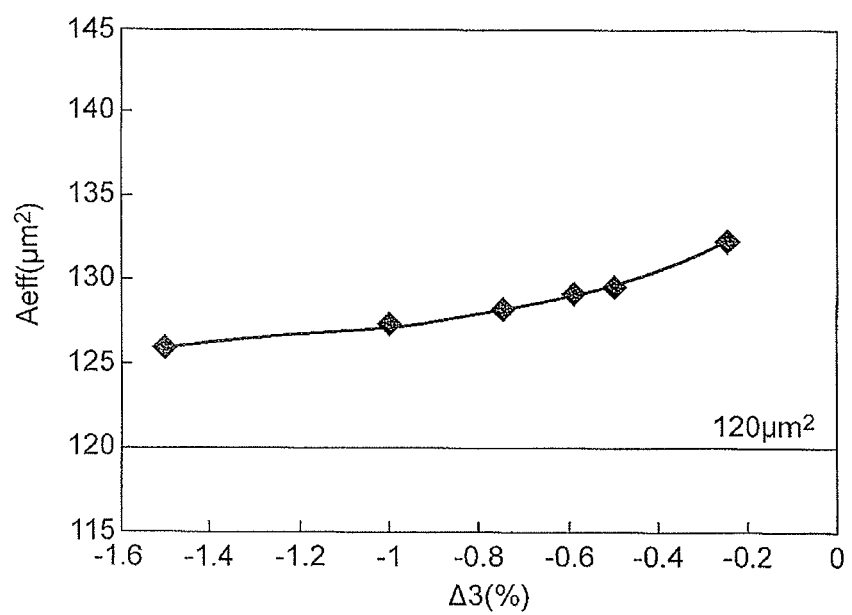
FIG. 48 is a drawing showing a relation between Δ3 and $A_{eff}$ in the same trench type cores as in FIG. 43.
Figure 49:
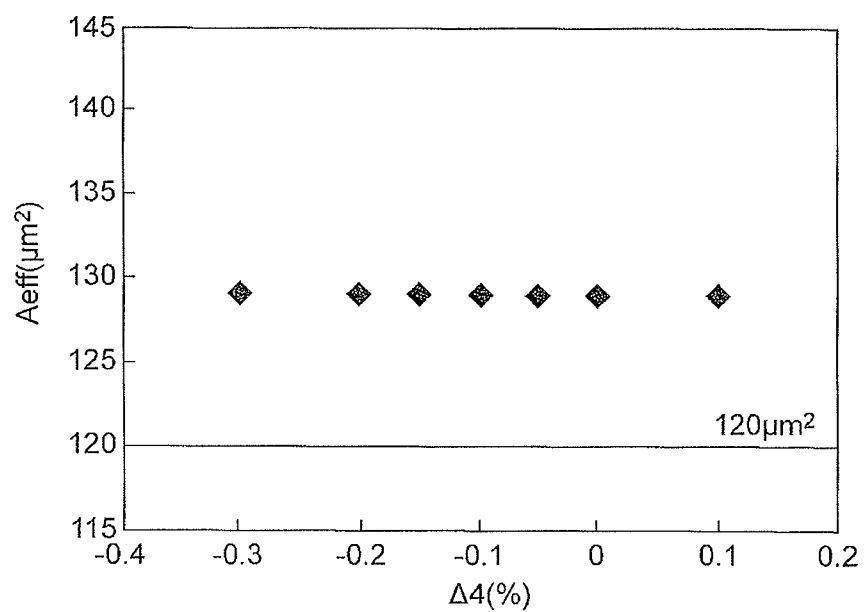
FIG. 49 is a drawing showing a relation between Δ4 and $A_{eff}$ in the same trench type cores as in FIG. 43.

FIGS. 43 to 49 show the results of investigation on relations between each of the parameters of the trench type core and $A_{eff}$ under the design center conditions of 2a=12.4 μm, Ra=0.6, Rb=0.622, Δ1=0.22%, Δ2=0%, Δ3=−0.59%, and Δ4=0%. FIG. 43 is a drawing showing the relation between 2a and $A_{eff}$; FIG. 44 a drawing showing the relation between Ra and $A_{eff}$; FIG. 45 a drawing showing the relation between 1/Rb and $A_{eff}$; FIG. 46 a drawing showing the relation between Δ1 and $A_{eff}$; FIG. 47 a drawing showing the relation between Δ2 and $A_{eff}$; FIG. 48 a drawing showing the relation between Δ3 and $A_{eff}$; FIG. 49 a drawing showing the relation between Δ4 and $A_{eff}$. It is found from these results that the necessary conditions for satisfying $A_{eff} \geq 120$ μm² are as follows:

$2a(\mu m) \geq 11.7$;

$Ra \leq 0.699$;

$\Delta 1(\%) \leq 0.27$;

$\Delta 2(\%) \geq -0.05$.

Figure 50:
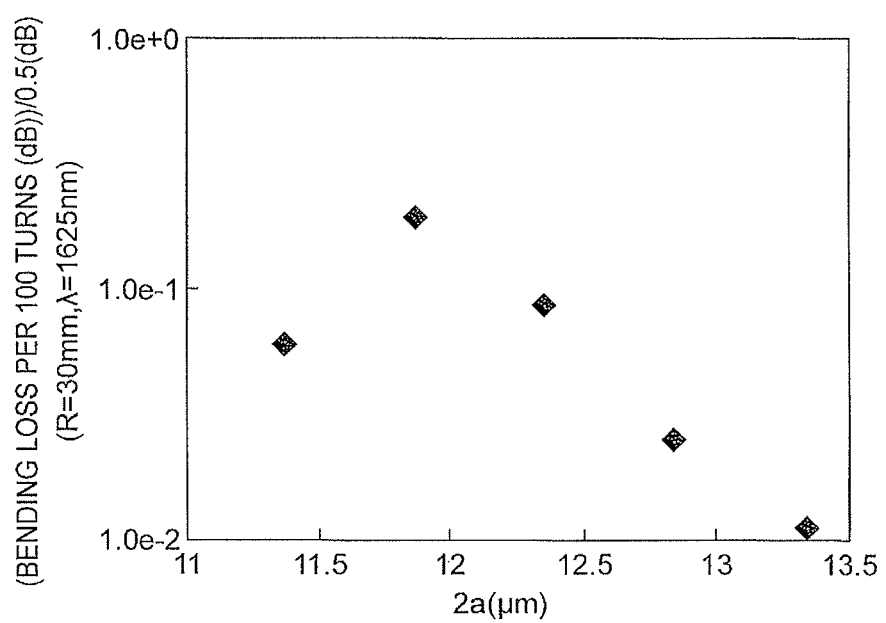
FIG. 50 is a drawing showing a relation between 2a and normalized bending loss in trench type cores under the design center conditions of 2a=12.4 μm, Ra=0.6, Rb=0.622, Δ1=0.22%, Δ2=0%, Δ3=−0.59%, and Δ4=0%.
Figure 51:
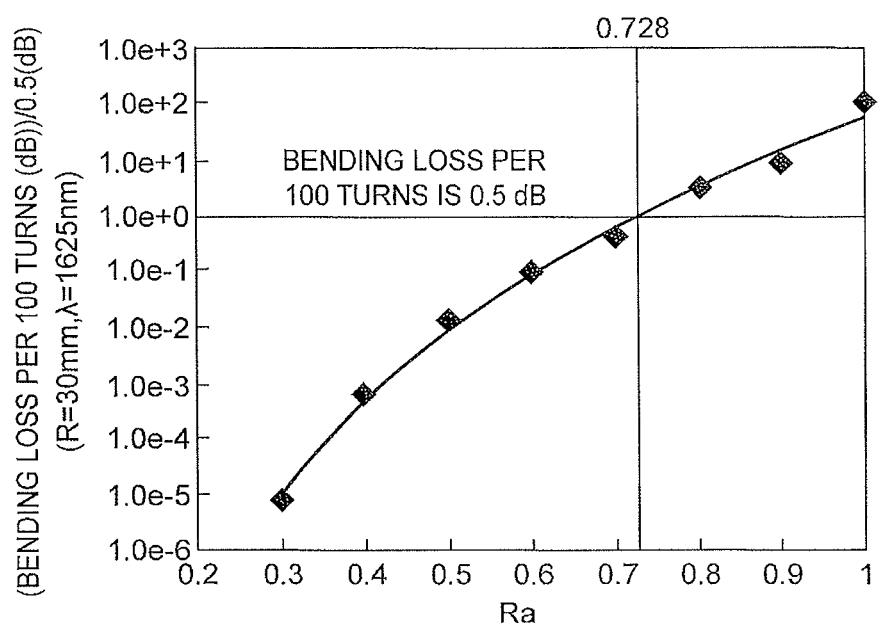
FIG. 51 is a drawing showing a relation between Ra and normalized bending loss in the same trench type cores as in FIG. 50.
Figure 52:
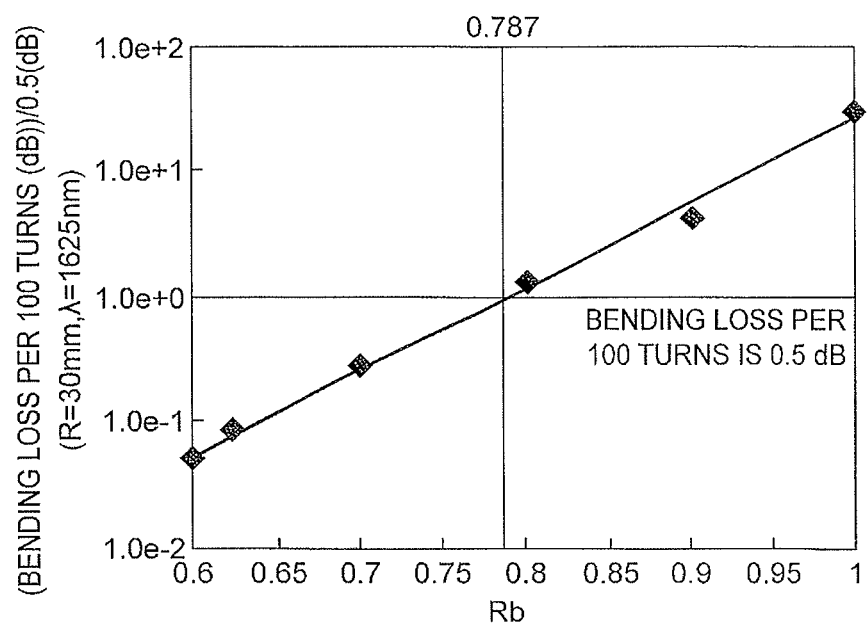
FIG. 52 is a drawing showing a relation between 1/Rb and normalized bending loss in the same trench type cores as in FIG. 50.
Figure 53:
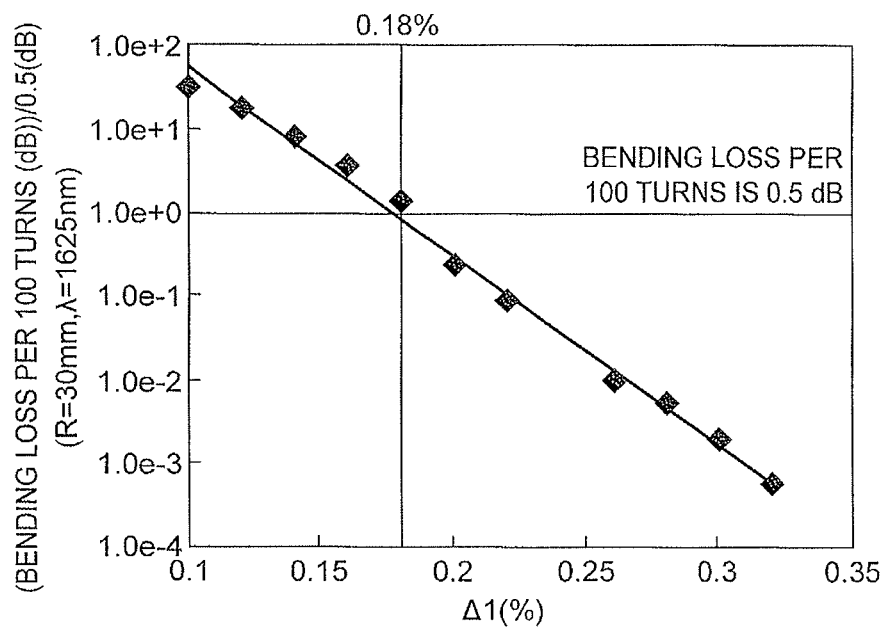
FIG. 53 is a drawing showing a relation between Δ1 and normalized bending loss in the same trench type cores as in FIG. 50.
Figure 54:
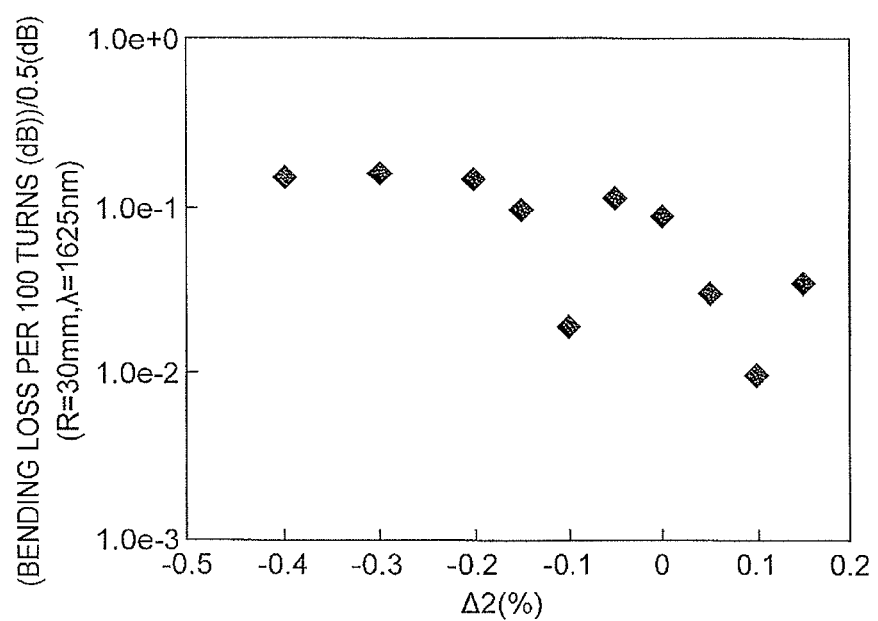
FIG. 54 is a drawing showing a relation between Δ2 and normalized bending loss in the same trench type cores as in FIG. 50.
Figure 55:
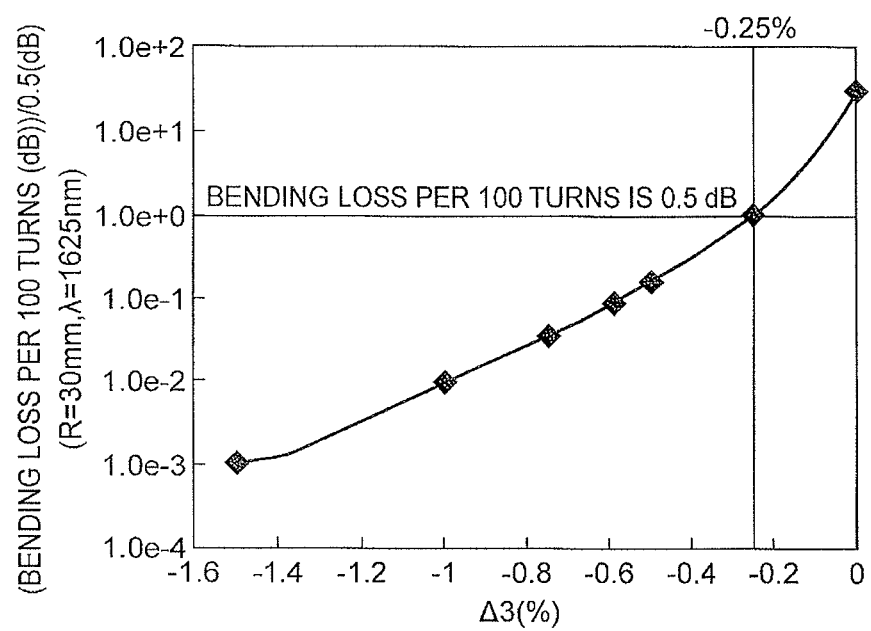
FIG. 55 is a drawing showing a relation between Δ3 and normalized bending loss in the same trench type cores as in FIG. 50.
Figure 56:
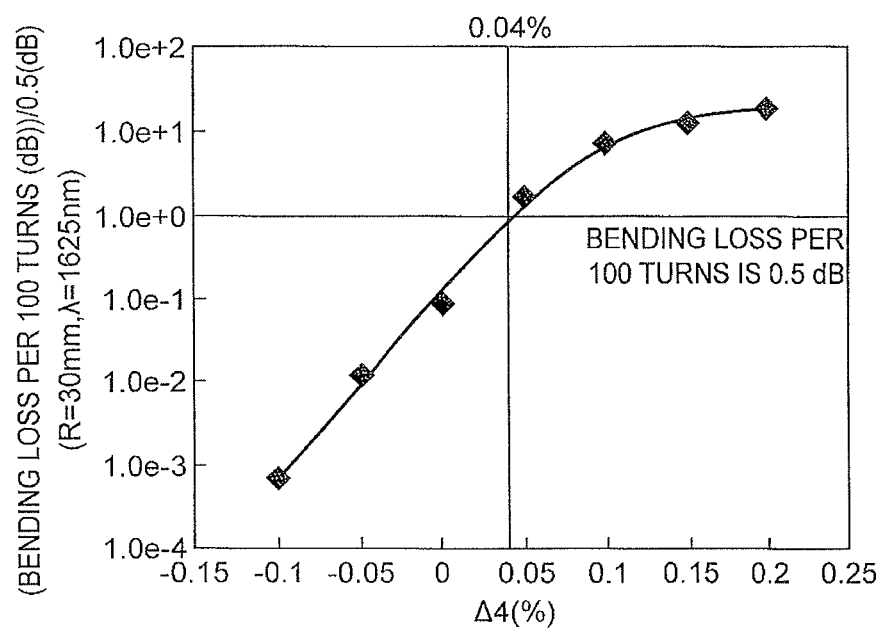
FIG. 56 is a drawing showing a relation between Δ4 and normalized bending loss in the same trench type cores as in FIG. 50.

Furthermore, FIGS. 50 to 56 show the results of investigation on relations between each of the parameters of the trench type core and normalized bending loss under the design center conditions of 2a=12.4 μm, Ra=0.6, Rb=0.622, Δ1=0.22%, Δ2=0%, Δ3=−0.59%, and Δ4=0%. The normalized bending loss herein refers to a value obtained by dividing a bending loss per 100 turns (dB/100 turns) in the bending radius of 30 mm at the wavelength 1625 nm, by 0.5 dB. If it is 1 or less, the bending loss per 100 turns becomes 0.5 dB/100 turns or less. FIG. 50 is a drawing showing the relation between 2a and normalized bending loss; FIG. 51 a drawing showing the relation between Ra and normalized bending loss; FIG. 52 a drawing showing the relation between 1/Rb and normalized bending loss; FIG. 53 a drawing showing the relation between Δ1 and normalized bending loss; FIG. 54 a drawing showing the relation between Δ2 and normalized bending loss; FIG. 55 a drawing showing the relation between Δ3 and normalized bending loss; FIG. 56 a drawing showing the relation between Δ4 and normalized bending loss. It is found from these results that the necessary conditions for the bending loss per 100 turns in the bending radius of 30 mm at the wavelength of 1625 nm to satisfy 0.5 dB/100 turns or less are as follows:

$Ra \leq 0.728$;

$Rb \leq 0.787$;

$\Delta1(\%) \geq 0.18$;

$\Delta3(\%) \leq -0.25$;

$\Delta4(\%) \leq 0.04$.

The structure (ii. 1) is one calculated in view of the above results. In terms of the chromatic dispersion as well, in the range satisfying the structure (ii. 1), the chromatic dispersion at the wavelength of 1550 nm is preferably a value over at least 20 ps/nm/km.

In view of the transmission loss as well, it is also confirmed by calculation that the transmission loss due to Rayleigh scattering at the wavelength of 1550 nm in the case of the structure (ii. 1) is smaller than that in the core structure of Reference Literature 5 realizing 0.181 dB/km or less, and it is thus preferable to adopt a structure satisfying the structure (ii. 1).

Figure 57:
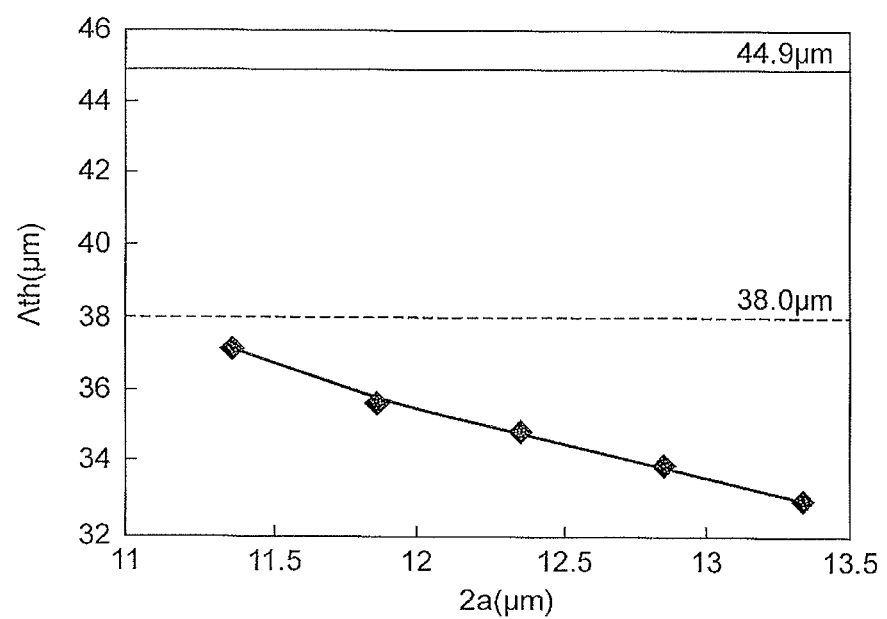
FIG. 57 is a drawing showing a relation between 2a and $\Lambda_{th}$ at the wavelength of 1565 nm in trench type cores under the design center conditions of 2a=12.4 μm, Ra=0.6, Rb=0.622, Δ1=0.22%, Δ2=0%, Δ3=−0.59%, and Δ4=0%.
Figure 58:
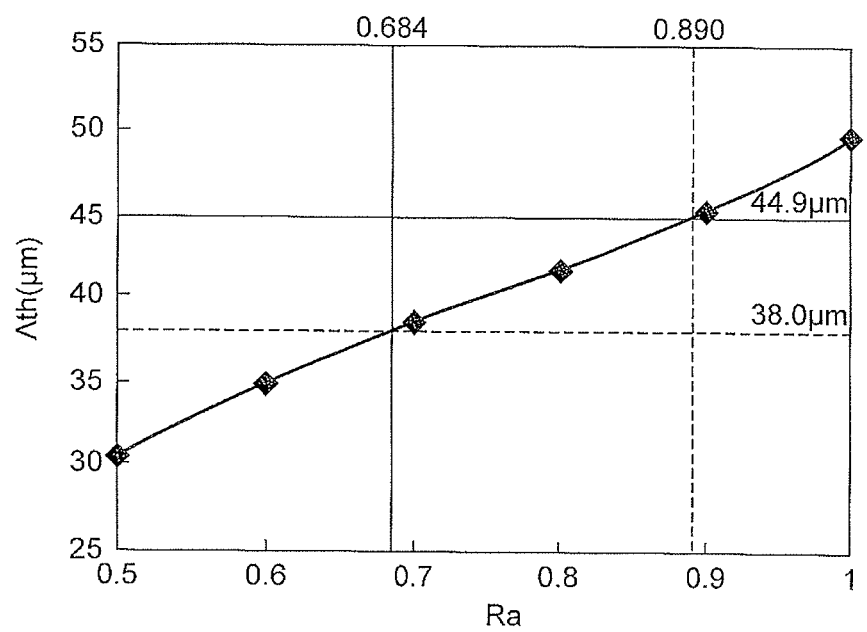
FIG. 58 is a drawing showing a relation between Ra and $\Lambda_{th}$ in the same trench type cores as in FIG. 57.
Figure 59:
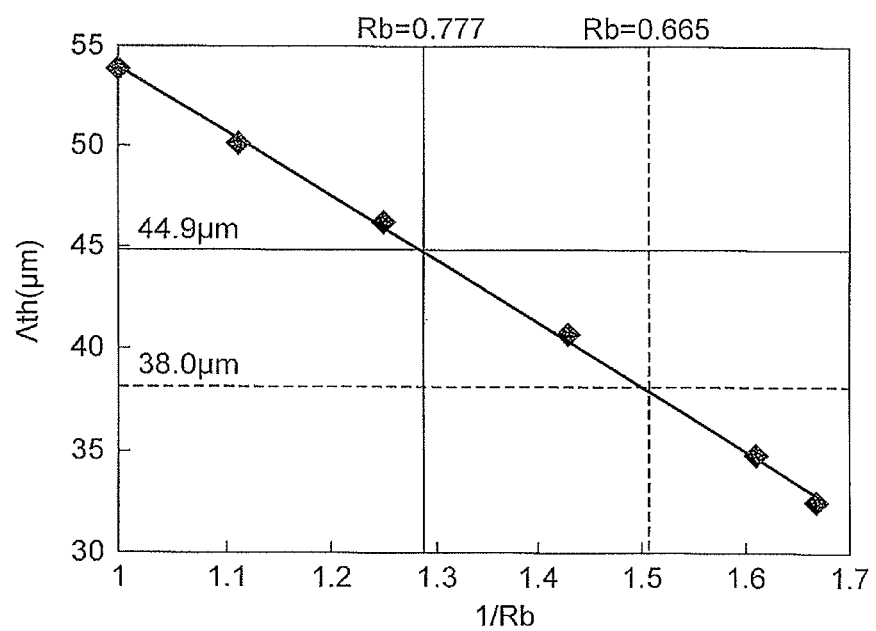
FIG. 59 is a drawing showing a relation between 1/Rb and $\Lambda_{th}$ in the same trench type cores as in FIG. 57.
Figure 60:
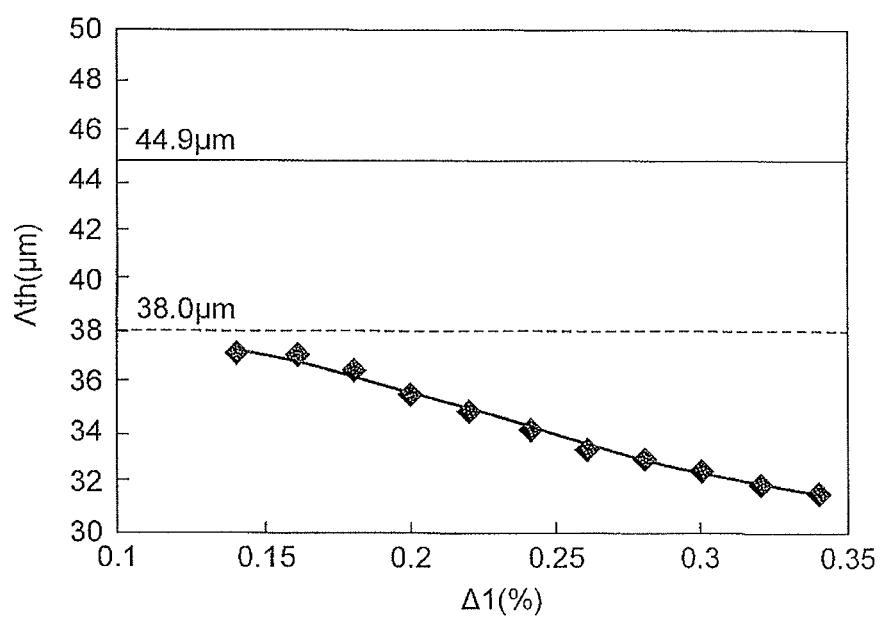
FIG. 60 is a drawing showing a relation between Δ1 and $\Lambda_{th}$ in the same trench type cores as in FIG. 57.
Figure 61:
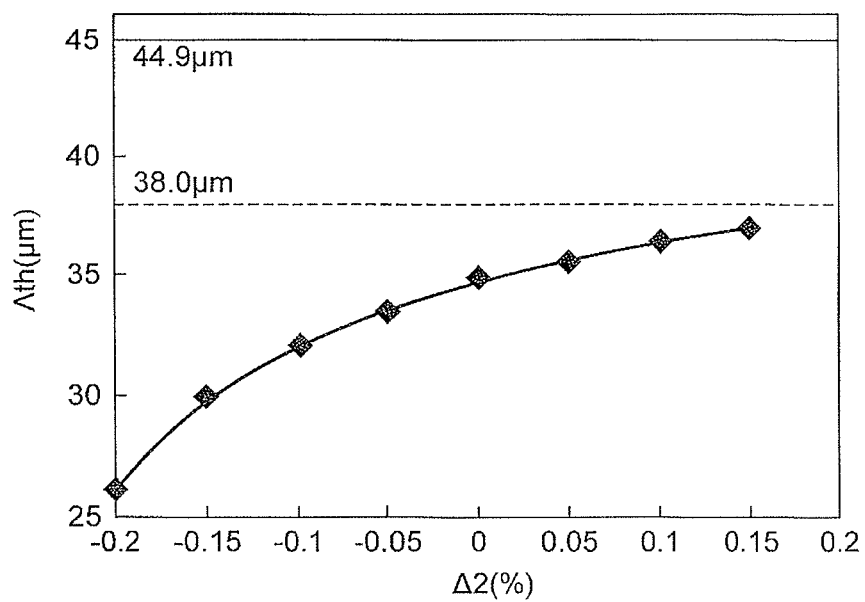
FIG. 61 is a drawing showing a relation between Δ2 and $\Lambda_{th}$ in the same trench type cores as in FIG. 57.
Figure 62:
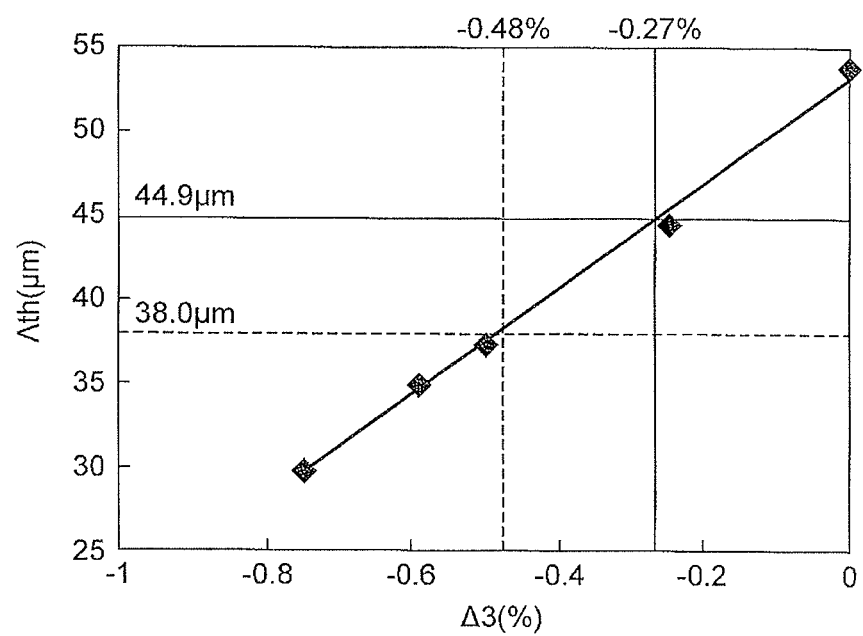
FIG. 62 is a drawing showing a relation between Δ3 and $\Lambda_{th}$ in the same trench type cores as in FIG. 57.
Figure 63:
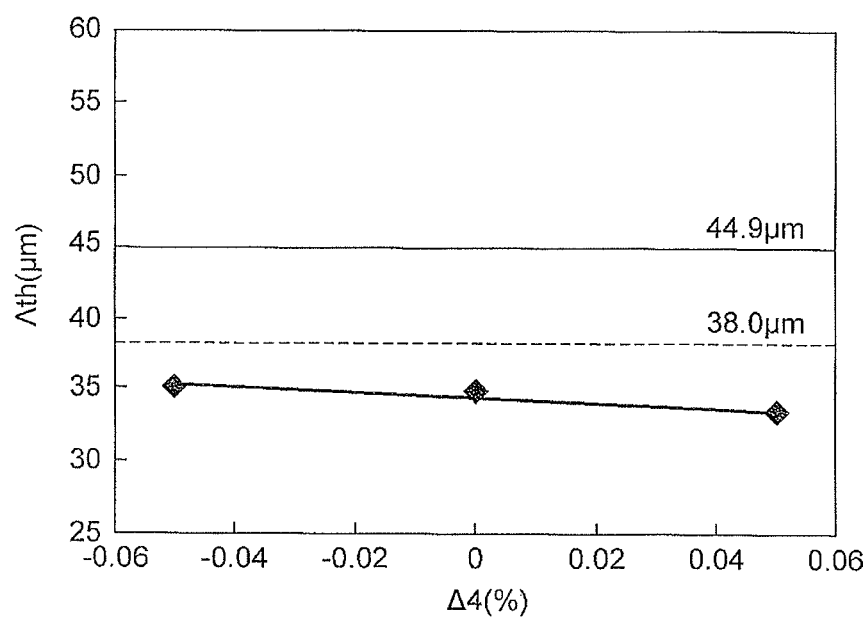
FIG. 63 is a drawing showing a relation between Δ4 and $\Lambda_{th}$ in the same trench type cores as in FIG. 57.

A further necessary condition in addition to the above conditions for keeping $\Lambda_{th}$ smaller than in the case of the step-index type core with $A_{eff}$=130 μm² and $\lambda_{CC}$=1530 nm can be, in the case of $\Lambda_{th}$ at the wavelength of 1565 nm, that $\Lambda_{th}$ is not more than about 44.9 μm. FIGS. 57 to 63 show the results of investigation on relations between each of the parameters of the trench type core and $\Lambda_{th}$ at the wavelength of 1565 nm under the design center conditions of 2a=12.4 μm, Ra=0.6, Rb=0.622, Δ1=0.22%, Δ2=0%, Δ3=−0.59%, and Δ4=0%. FIG. 57 is a drawing showing the relation between 2a and $\Lambda_{th}$; FIG. 58 a drawing showing the relation between Ra and $\Lambda_{th}$; FIG. 59 a drawing showing the relation between 1/Rb and $\Lambda_{th}$; FIG. 60 a drawing showing the relation between Δ1 and $\Lambda_{th}$; FIG. 61 a drawing showing the relation between Δ2 and $\Lambda_{th}$; FIG. 62 a drawing showing the relation between Δ3 and $\Lambda_{th}$; FIG. 63 a drawing showing the relation between Δ4 and $\Lambda_{th}$. Since it is found from these results that the condition for keeping $\Lambda_{th}$ not more than about 44.9 μm is:

$Rb \leq 0.777$, it is more preferable to adopt a structure satisfying structure (ii. 2):

$11.7 \leq 2a(\mu m) \leq 12.4$;

$0.596 \leq Ra \leq 0.699$;

$0.618 \leq Rb \leq 0.777$;

$0.18 \leq \Delta1(\%) \leq 0.22$;

$-0.05 \leq \Delta2(\%) \leq 0.02$ $0.59 \leq \Delta3(\%) \leq -0.25$;

$-0.01 \leq \Delta4(\%) \leq 0.04$.

A further necessary condition in addition to the above conditions for keeping $\Lambda_{th}$ smaller than in the case of the step-index type core with $A_{eff}$=80 m² and $\lambda_{CC}$=1530 nm can be, in the case of $\Lambda_{th}$ at the wavelength of 1565 nm, that $\Lambda_{th}$ is not more than about 38.0 μm. Therefore, since it is found based on the results of FIGS. 57 to 63 that the conditions for keeping $\Lambda_{th}$ not more than about 38.0 μm are as follows:

$Ra \leq 0.684$;

$Rb \leq 0.665$;

$\Delta3(\%) \leq -0.48$, it is more preferable in view of these to adopt a structure satisfying structure (ii. 3):

$11.7 \leq 2a(\mu m) \leq 12.4$;

$0.596 \leq Ra \leq 0.684$;

$0.618 \leq Rb \leq 0.665$;

$0.18 \leq \Delta1(\%) \leq 0.22$;

$-0.05 \leq \Delta2(\%) \leq 0.02$ $0.59 \leq \Delta3(\%) \leq -0.48$;

$-0.01 \leq \Delta4(\%) \leq 0.04$.

Next, among structures around the structure of (iii), a desired structure is also one satisfying structure (iii. 1):

$11.7 \leq 2a(\mu m) \leq 13.2$;

$0.537 \leq Ra \leq 0.704$;

$0.623 \leq Rb \leq 0.792$;

$0.20 \leq \Delta1(\%) \leq 0.26$;

$-0.06 \leq \Delta2(\%) \leq 0.10$ $0.83 \leq \Delta3(\%) \leq -0.32$;

$-0.03 \leq \Delta4(\%) \leq 0.02$.

Figure 64:
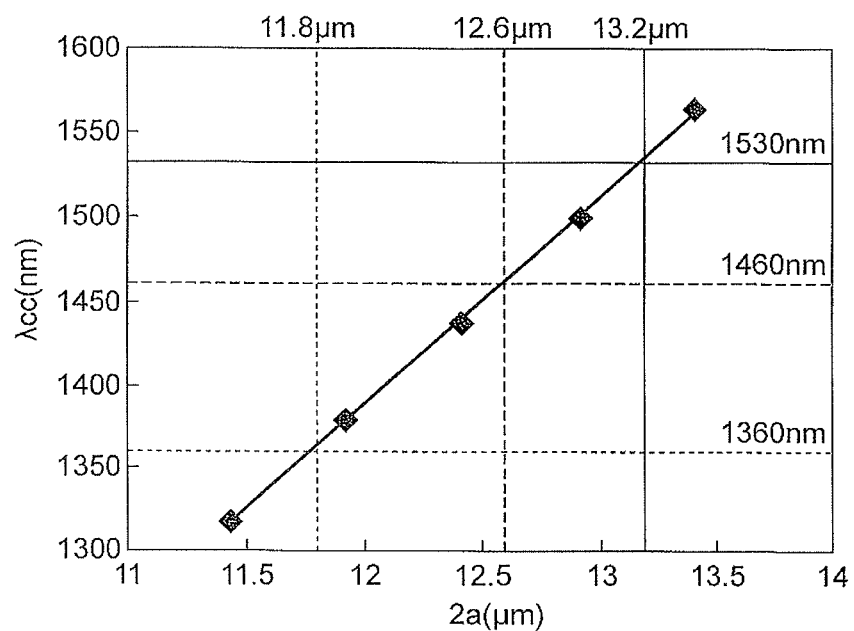
FIG. 64 is a drawing showing a relation between 2a and $\lambda_{CC}$ in trench type cores under the design center conditions of 2a=12.4 μm, Ra=0.6, Rb=0.673, Δ1=0.22%, Δ2=0%, Δ3=−0.59%, and Δ4=0%.
Figure 65:
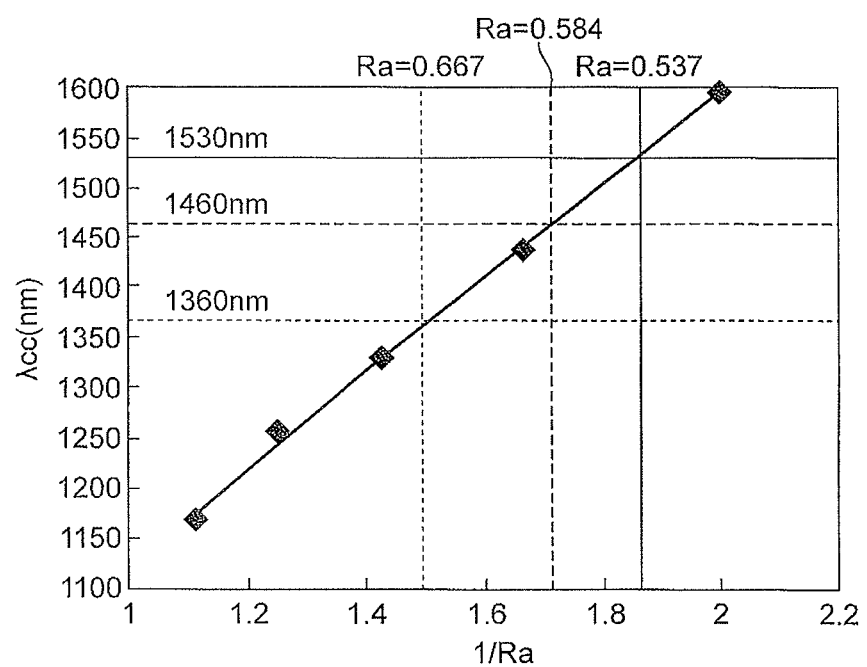
FIG. 65 is a drawing showing a relation between Ra and $\lambda_{CC}$ in the same trench type cores as in FIG. 64.
Figure 66:
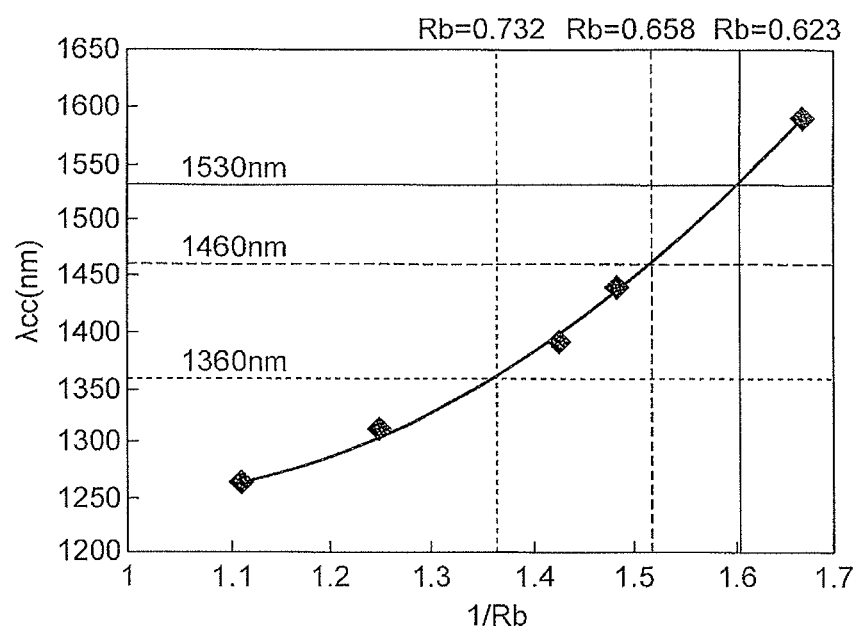
FIG. 66 is a drawing showing a relation between 1/Rb and $\lambda_{CC}$ in the same trench type cores as in FIG. 64.
Figure 67:
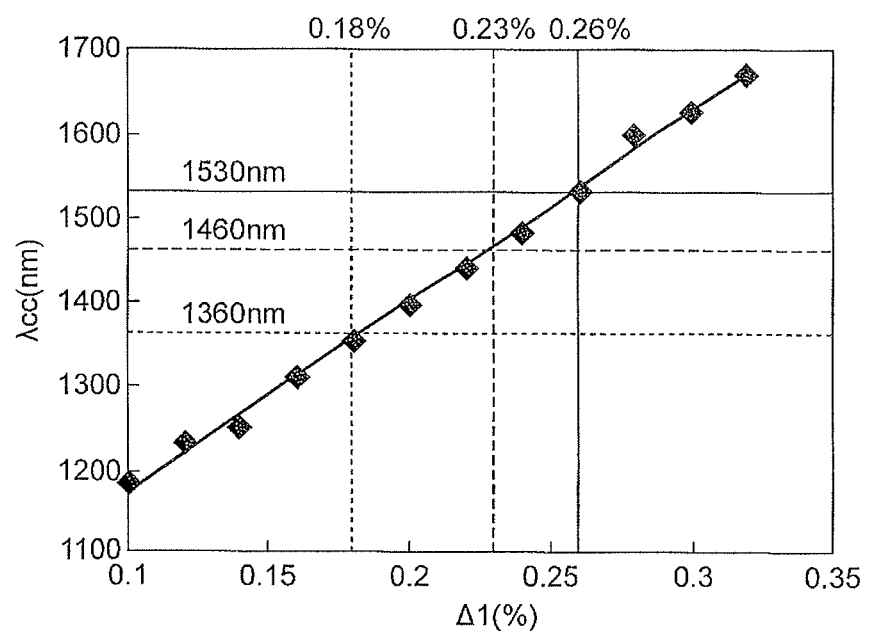
FIG. 67 is a drawing showing a relation between Δ1 and $\lambda_{CC}$ in the same trench type cores as in FIG. 64.
Figure 68:
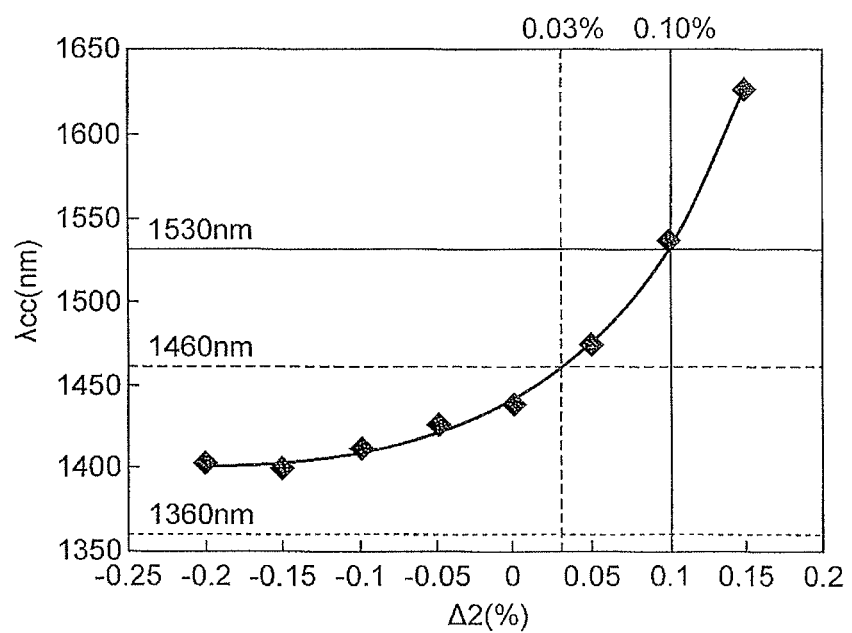
FIG. 68 is a drawing showing a relation between Δ2 and $\lambda_{CC}$ in the same trench type cores as in FIG. 64.
Figure 69:
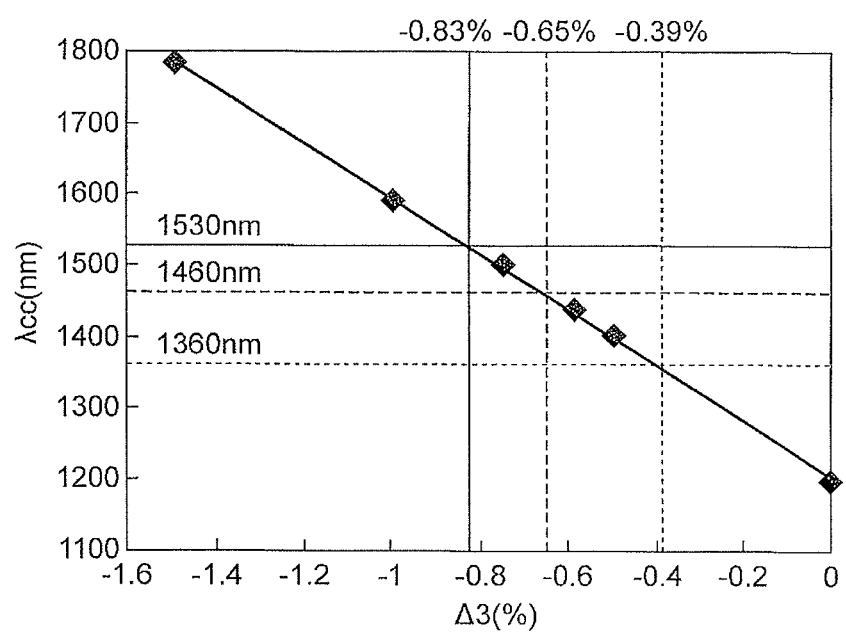
FIG. 69 is a drawing showing a relation between Δ3 and $\lambda_{CC}$ in the same trench type cores as in FIG. 64.
Figure 70:
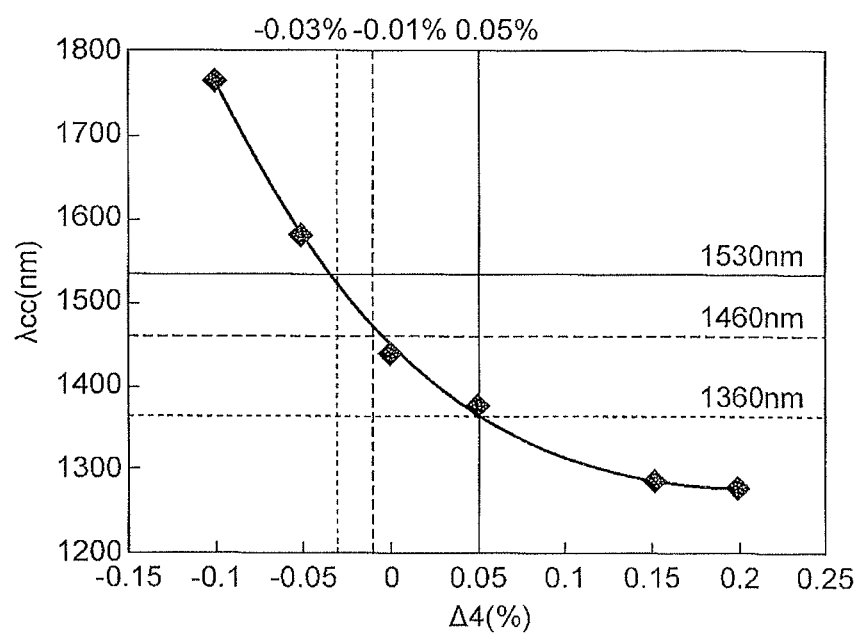
FIG. 70 is a drawing showing a relation between Δ4 and $\lambda_{CC}$ in the same trench type cores as in FIG. 64.

FIGS. 64 to 70 show the results of investigation on relations between each of the parameters of the trench type core and $\lambda_{CC}$ under the design center conditions of 2a=12.4 μm, Ra=0.6, Rb=0.673, Δ1=0.22%, Δ2=0%, Δ3=−0.59%, and Δ4=0%. FIG. 64 is a drawing showing the relation between 2a and $\lambda_{CC}$; FIG. 65 a drawing showing the relation between Ra and $\lambda_{CC}$; FIG. 66 a drawing showing the relation between 1/Rb and $\lambda_{CC}$; FIG. 67 a drawing showing the relation between Δ1 and $\lambda_{CC}$; FIG. 68 a drawing showing the relation between Δ2 and $\lambda_{CC}$; FIG. 69 a drawing showing the relation between Δ3 and $\lambda_{CC}$; FIG. 70 a drawing showing the relation between Δ4 and $\lambda_{CC}$. It is confirmed from these results that the necessary conditions for satisfying $\lambda_{CC} \leq 1530$ nm are as follows:

$2a(\mu m) \leq 13.2$;

$Ra \geq 0.537$;

$Rb \geq 0.623$;

$\Delta1(\%) \leq 0.26$;

$\Delta2(\%) \leq 0.10$;

$\Delta3(\%) \geq -0.83$;

$\Delta4(\%) \geq -0.03$.

Figure 71:
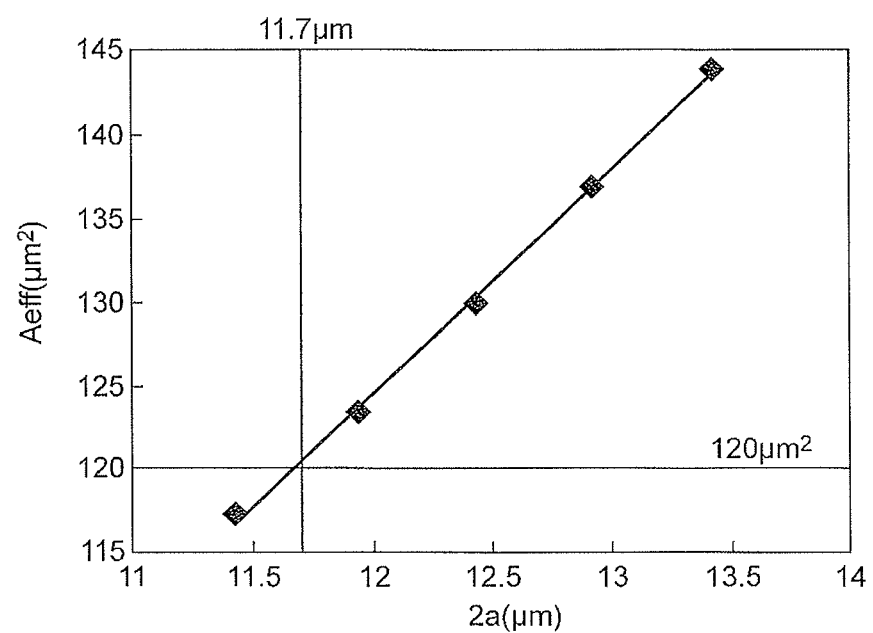
FIG. 71 is a drawing showing a relation between 2a and $A_{eff}$ in trench type cores under the design center conditions of 2a=12.4 μm, Ra=0.6, Rb=0.673, Δ1=0.22%, Δ2=0%, Δ3=−0.59%, and Δ4=0%.
Figure 72:
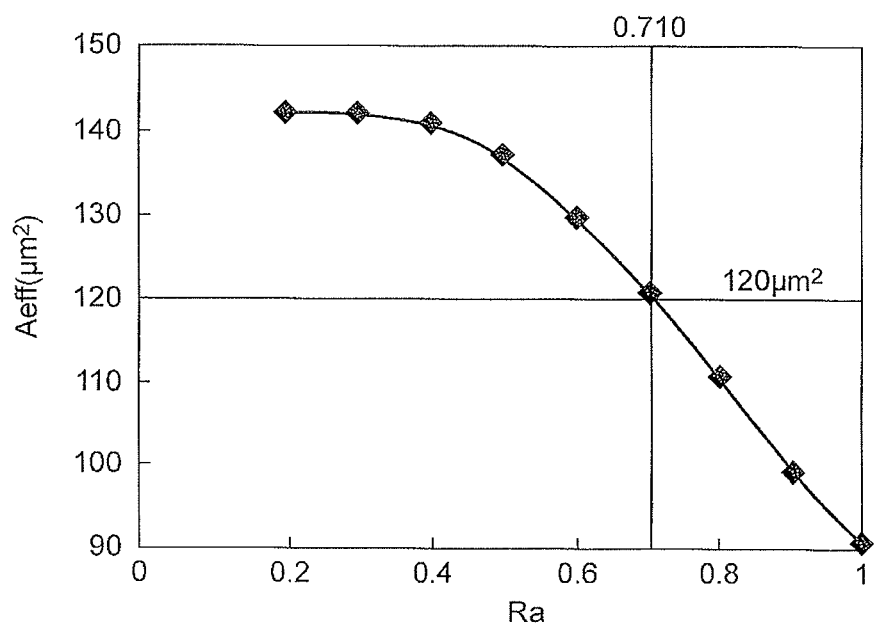
FIG. 72 is a drawing showing a relation between Ra and $A_{eff}$ in the same trench type cores as in FIG. 71.
Figure 73:
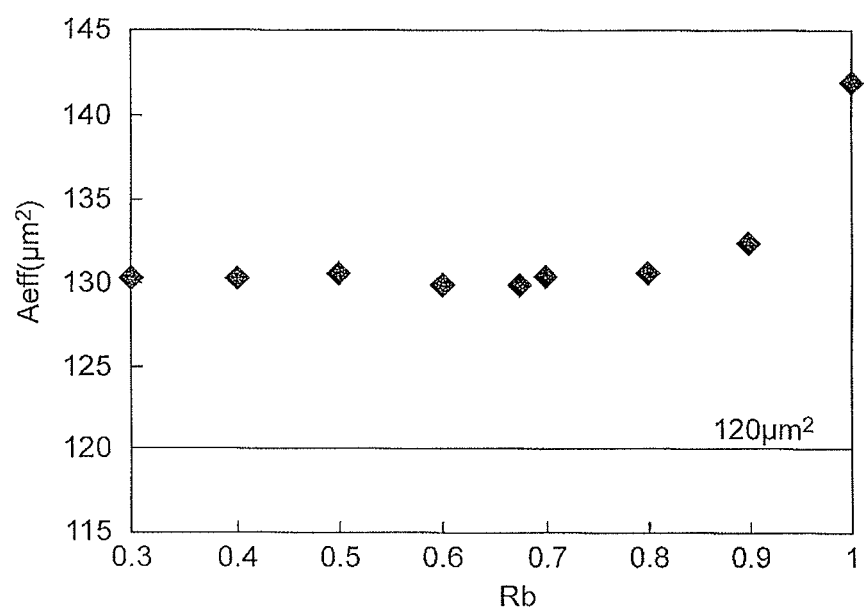
FIG. 73 is a drawing showing a relation between 1/Rb and $A_{eff}$ in the same trench type cores as in FIG. 71.
Figure 74:
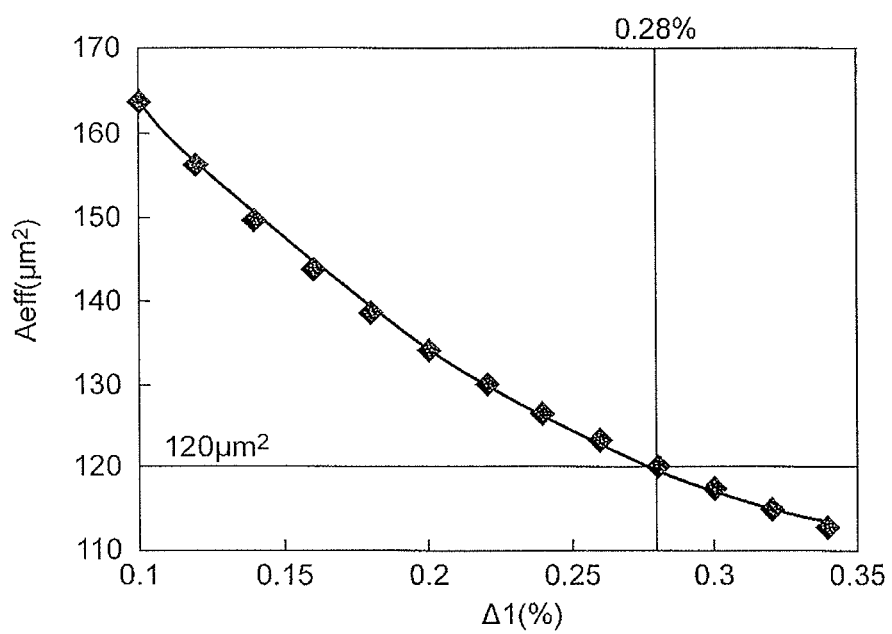
FIG. 74 is a drawing showing a relation between Δ1 and $A_{eff}$ in the same trench type cores as in FIG. 71.
Figure 75:
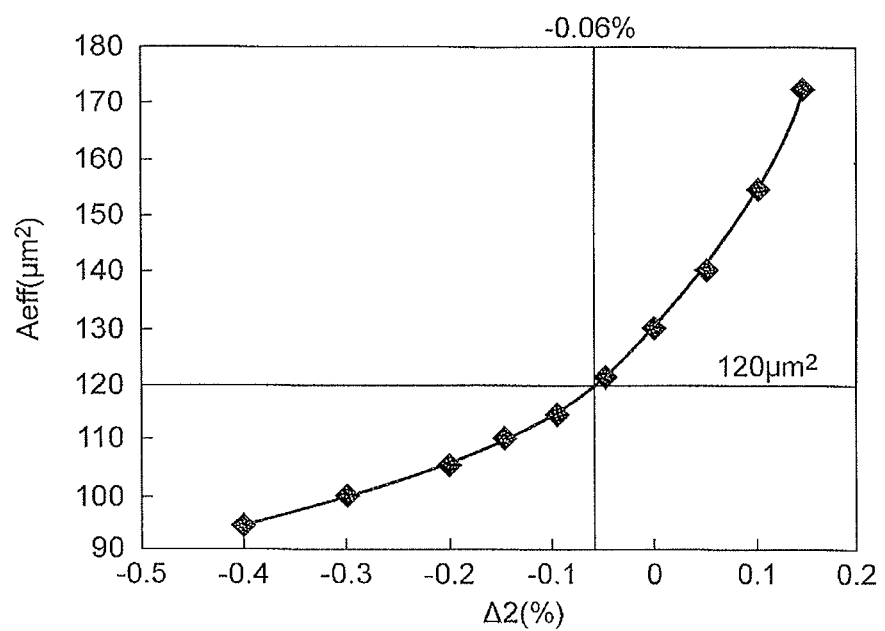
FIG. 75 is a drawing showing a relation between Δ2 and $A_{eff}$ in the same trench type cores as in FIG. 71.
Figure 76:
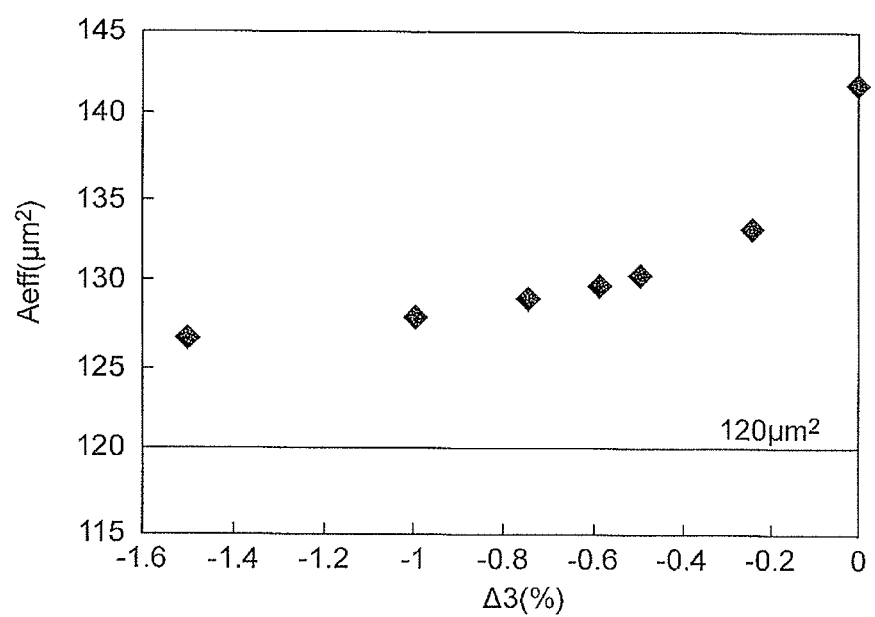
FIG. 76 is a drawing showing a relation between Δ3 and $A_{eff}$ in the same trench type cores as in FIG. 71.
Figure 77:
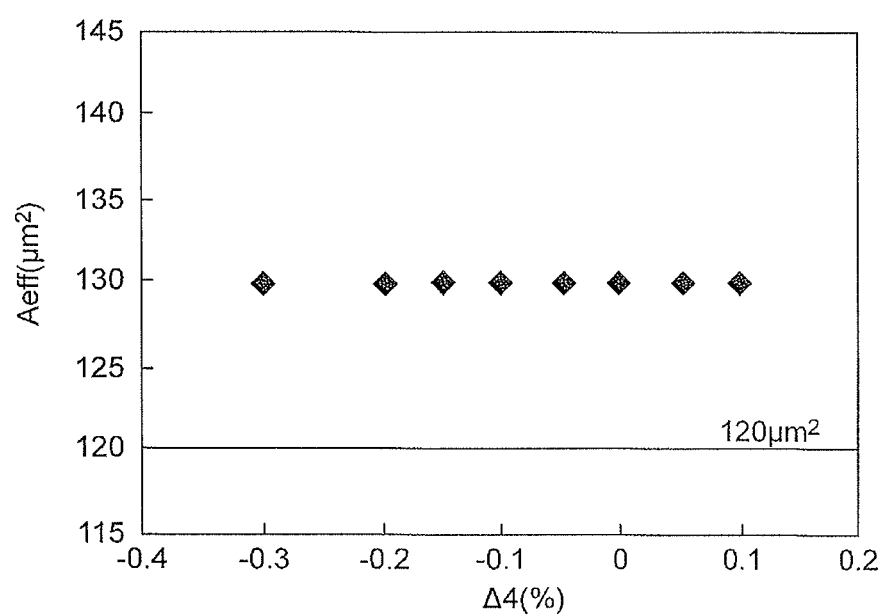
FIG. 77 is a drawing showing a relation between Δ4 and $A_{eff}$ in the same trench type cores as in FIG. 71.
Figure 78:
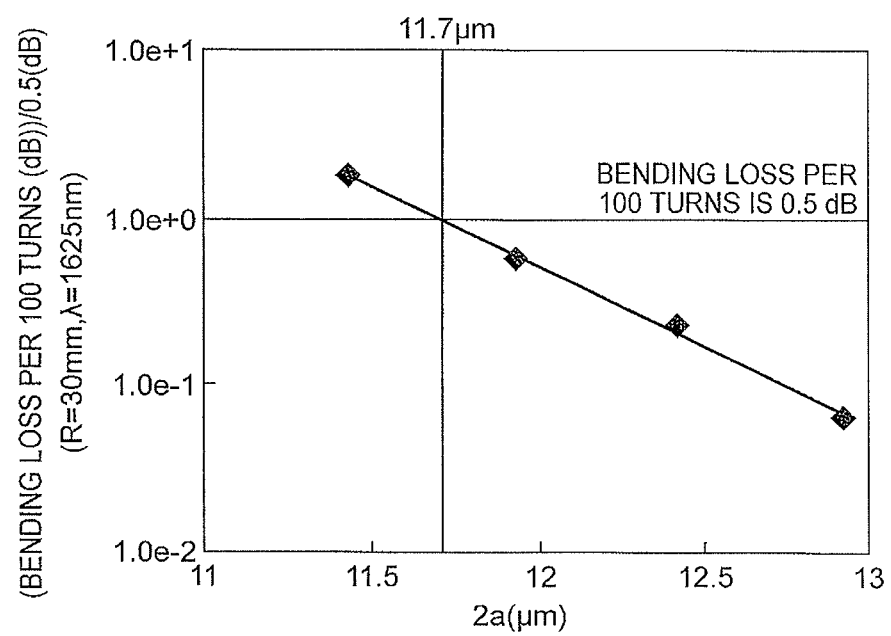
FIG. 78 is a drawing showing a relation between 2a and normalized bending loss in trench type cores under the design center conditions of 2a=12.4 µm, Ra=0.6, Rb=0.673, Δ1=0.22%, Δ2=0%, Δ3=−0.59%, and Δ4=0%.
Figure 79:
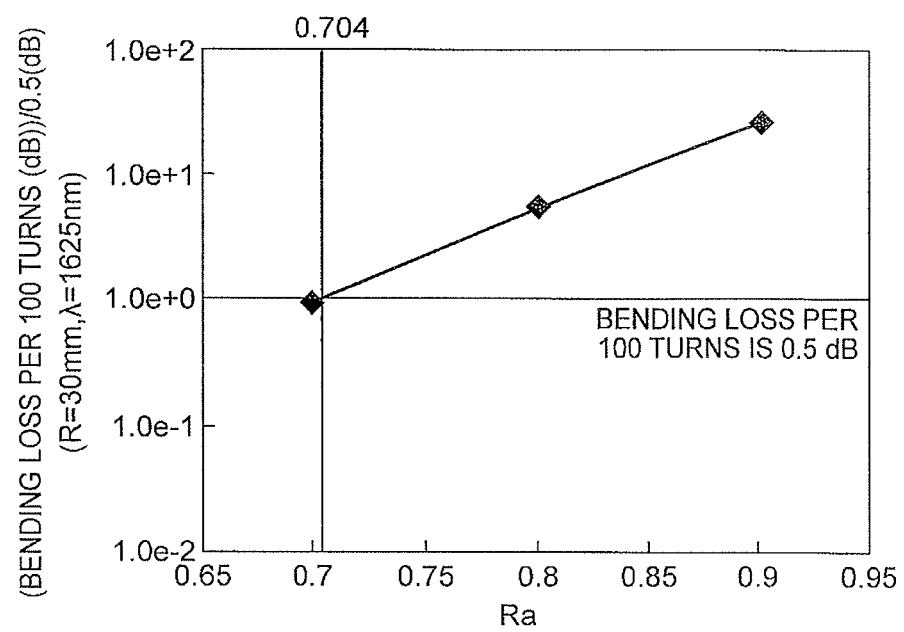
FIG. 79 is a drawing showing a relation between Ra and normalized bending loss in the same trench type cores as in FIG. 78.
Figure 80:
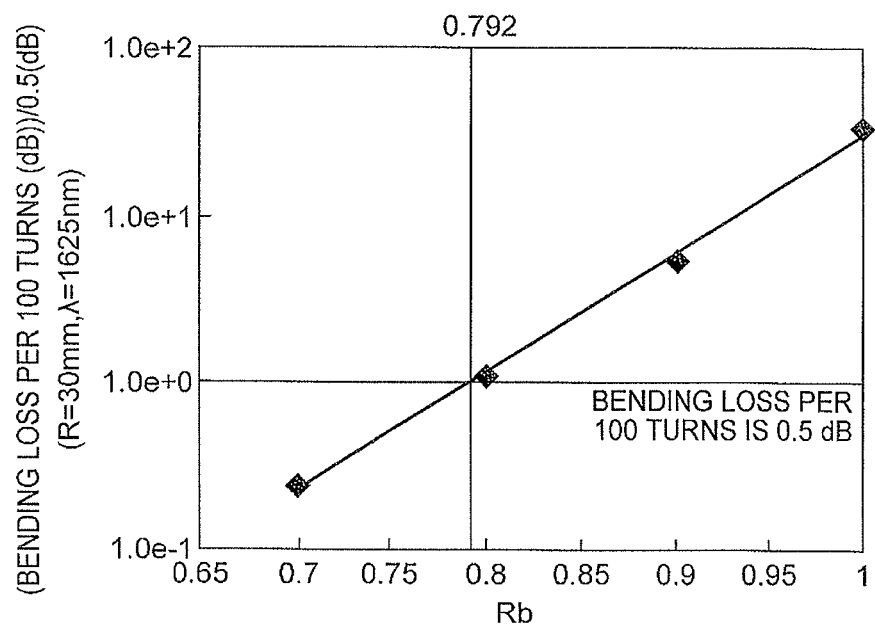
FIG. 80 is a drawing showing a relation between 1/Rb and normalized bending loss in the same trench type cores as in FIG. 78.
Figure 81:
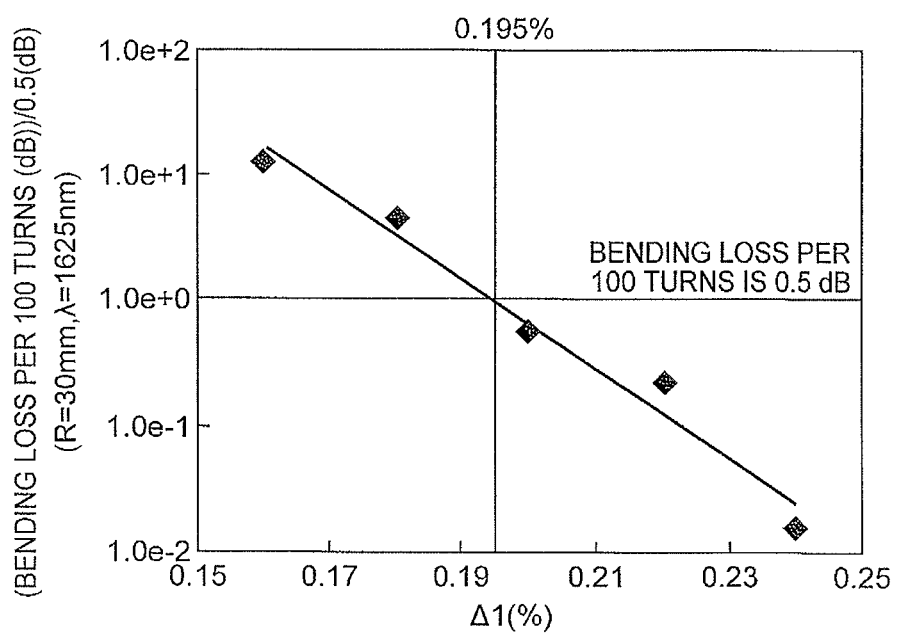
FIG. 81 is a drawing showing a relation between Δ1 and normalized bending loss in the same trench type cores as in FIG. 78.
Figure 82:
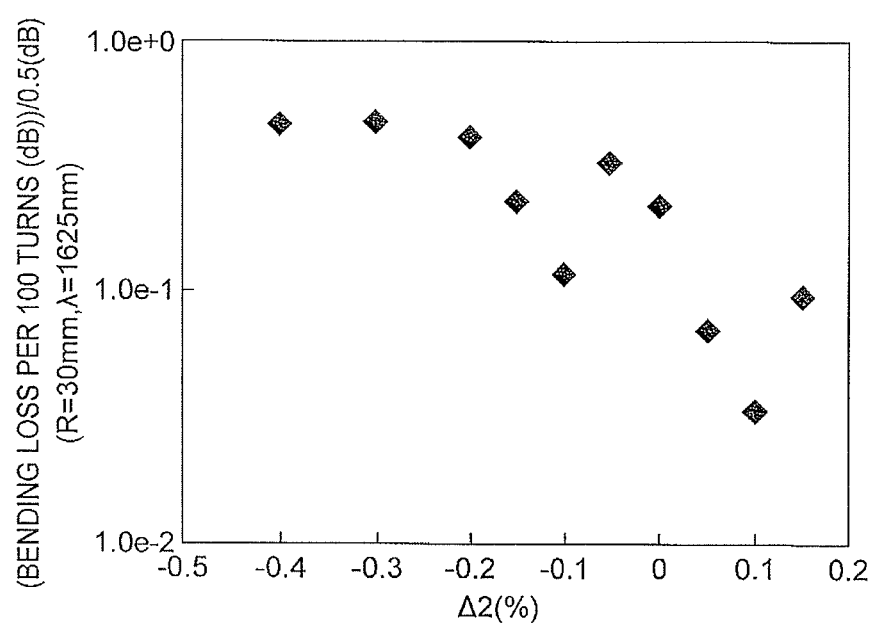
FIG. 82 is a drawing showing a relation between Δ2 and normalized bending loss in the same trench type cores as in FIG. 78.
Figure 83:
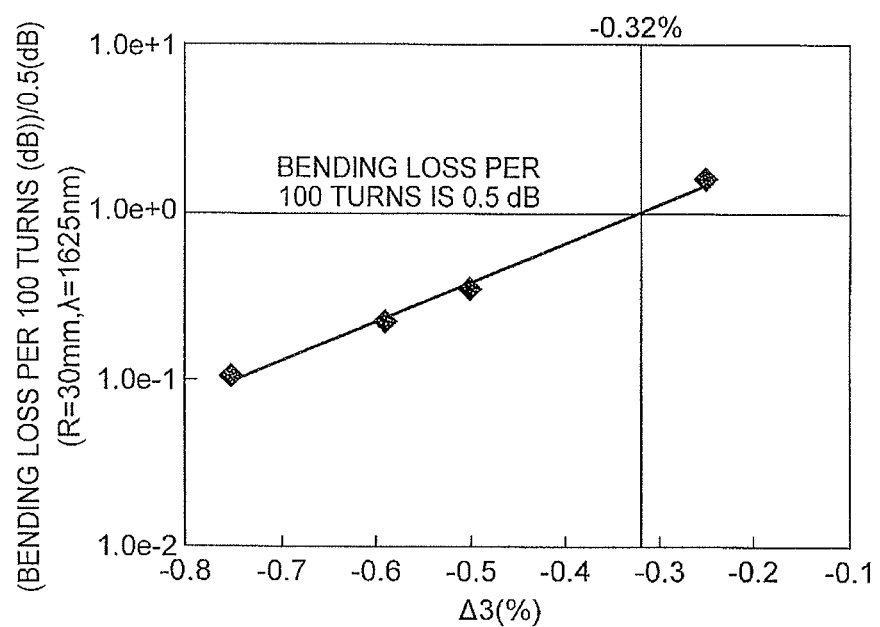
FIG. 83 is a drawing showing a relation between Δ3 and normalized bending loss in the same trench type cores as in FIG. 78.
Figure 84:
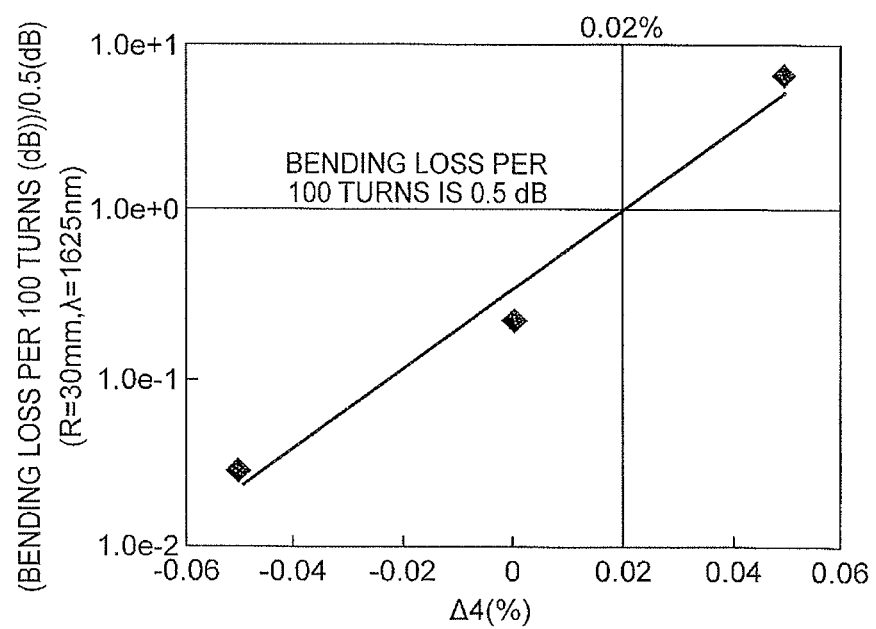
FIG. 84 is a drawing showing a relation between Δ4 and normalized bending loss in the same trench type cores as in FIG. 78.

FIGS. 71 to 77 show the results of investigation on relations between each of the parameters of the trench type core and $A_{eff}$ under the design center conditions of 2a=12.4 μm, Ra=0.6, Rb=0.673, Δ1=0.22%, Δ2=0%, Δ3=−0.59%, and Δ4=0%. FIG. 71 is a drawing showing the relation between 2a and $A_{eff}$; FIG. 72 a drawing showing the relation between Ra and $A_{eff}$; FIG. 73 a drawing showing the relation between 1/Rb and $A_{eff}$; FIG. 74 a drawing showing the relation between Δ1 and $A_{eff}$; FIG. 75 a drawing showing the relation between Δ2 and $A_{eff}$; FIG. 76 a drawing showing the relation between Δ3 and $A_{eff}$; FIG. 77 a drawing showing the relation between Δ4 and $A_{eff}$. It is confirmed from these results that the necessary conditions for satisfying $A_{eff} \geq 120$ μm² are as follows:

$2a(\mu m) \geq 11.7;$ $Ra \leq 0.710;$ $\Delta 1(\%) \leq 0.28;$ $\Delta 2(\%) \geq -0.06.$ Furthermore, FIGS. 78 to 84 show the results of investigation on relations between each of the parameters of the trench type core and normalized bending loss under the design center conditions of 2a=12.4 μm, Ra=0.6, Rb=0.673, Δ1=0.22%, Δ2=0%, Δ3=−0.59%, and Δ4=0%. The normalized bending loss herein refers to a value obtained by dividing a bending loss per 100 turns (dB/100 turns) in the bending radius of 30 mm at the wavelength of 1625 nm, by 0.5 dB. If it is 1 or less, the bending loss per 100 turns becomes 0.5 dB/100 turns or less. FIG. 78 is a drawing showing the relation between 2a and normalized bending loss; FIG. 79 a drawing showing the relation between Ra and normalized bending loss; FIG. 80 a drawing showing the relation between 1/Rb and normalized bending loss; FIG. 81 a drawing showing the relation between Δ1 and normalized bending loss; FIG. 82 a drawing showing the relation between Δ2 and normalized bending loss; FIG. 83 a drawing showing the relation between Δ3 and normalized bending loss; FIG. 84 a drawing showing the relation between Δ4 and normalized bending loss. It is confirmed from these results that the necessary conditions for the bending loss per 100 turns in the bending radius of 30 mm at the wavelength of 1625 nm to satisfy 0.5 dB/100 turns or less are as follows:

$2a(\mu m) \geq 11.7$ $Ra \leq 0.704;$ $Rb \leq 0.792;$ $\Delta 1(\%) \geq 0.20;$ $\Delta 3(\%) \leq -0.32;$ $\Delta 4(\%) \leq 0.02.$ It is found from FIGS. 64 to 70 that necessary conditions in addition to the above conditions for satisfying $\lambda_{CC} \leq 1460$ nm allowing application to the S-band range are as follows:

$2a(\mu m) \leq 12.6;$ $Ra \geq 0.584;$ $Rb \geq 0.658;$ $\Delta 1(\%) \leq 0.23;$ $\Delta 2(\%) \leq 0.03;$ $\Delta 3(\%) \geq -0.65;$ $\Delta 4(\%) \geq -0.01.$ Therefore, it is more preferable to adopt a structure satisfying the following conditions:

$11.7 \leq 2a(\mu m) \leq 12.6;$ $0.584 \leq Ra \leq 0.704;$ $0.658 \leq Rb \leq 0.792;$ $0.20 \leq \Delta 1(\%) \leq 0.23;$ $-0.06 \leq \Delta 2(\%) \leq 0.03$ $-0.65 \leq \Delta 3(\%) \leq -0.32;$ $-0.01 \leq \Delta 4(\%) \leq 0.02.$ In terms of the chromatic dispersion, in the range satisfying the structure (iii. 1), the chromatic dispersion at the wavelength of 1550 nm is preferably a value over at least 20 ps/nm/km.

In terms of the transmission loss, it is confirmed by calculation that the transmission loss due to Rayleigh scattering at the wavelength of 1550 nm in the case of the structure (iii. 1) is smaller than that in the core structure described in Reference Literature 5 realizing 0.181 dB/km or less, and it is thus preferable to adopt a structure satisfying the structure (iii. 1).

Figure 85:
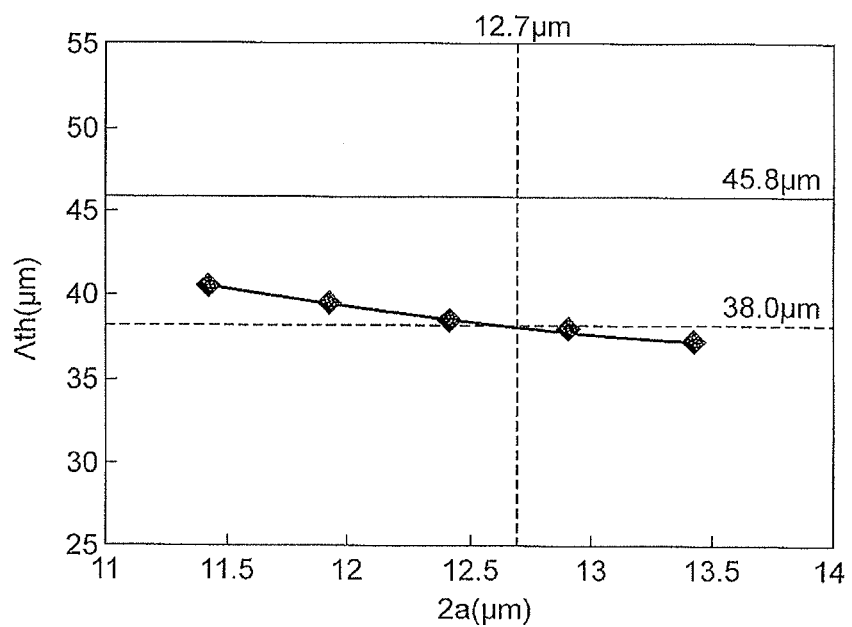
FIG. 85 is a drawing showing a relation between 2a and $\Lambda_{th}$ at the wavelength of 1565 nm in trench type cores under the design center conditions of 2a=12.4 µm, Ra=0.6, Rb=0.673, Δ1=0.22%, Δ2=0%, Δ3=−0.59%, and Δ4=0%.
Figure 86:
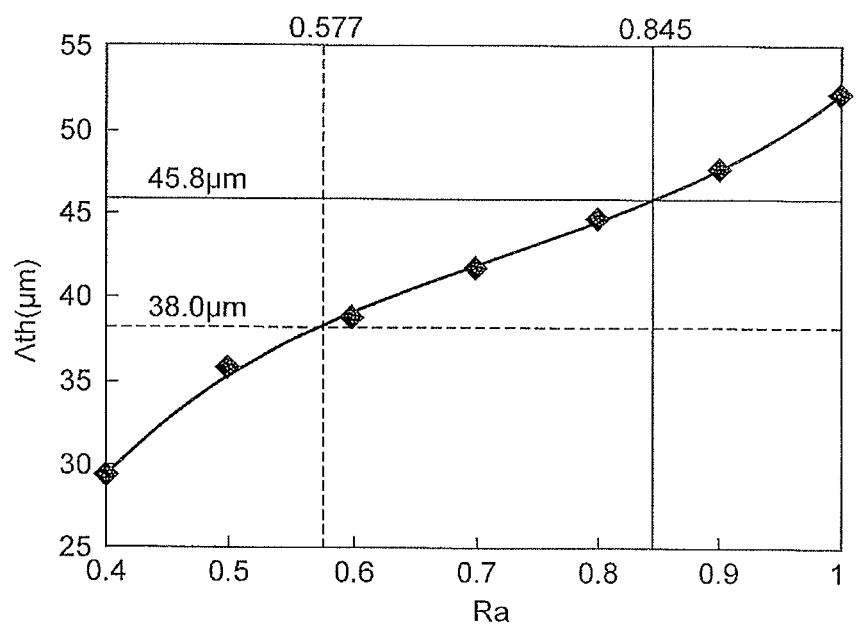
FIG. 86 is a drawing showing a relation between Ra and $\Lambda_{th}$ in the same trench type cores as in FIG. 85.
Figure 87:
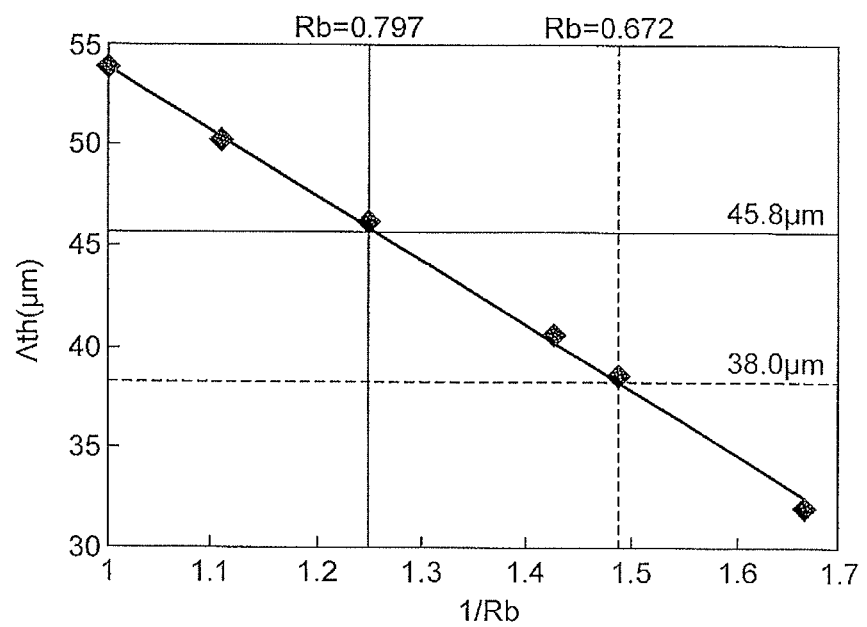
FIG. 87 is a drawing showing a relation between 1/Rb and $\Lambda_{th}$ in the same trench type cores as in FIG. 85.
Figure 88:
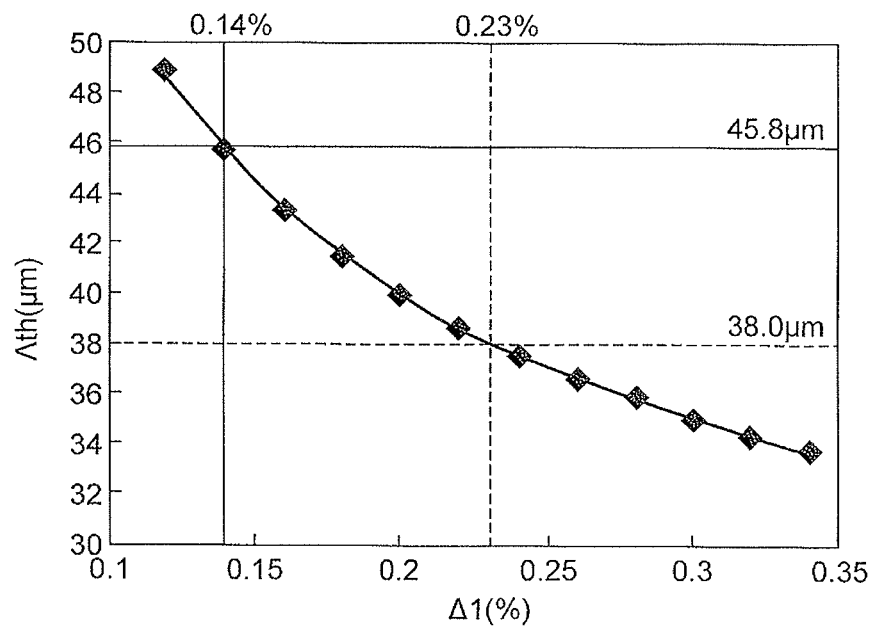
FIG. 88 is a drawing showing a relation between Δ1 and $\Lambda_{th}$ in the same trench type cores as in FIG. 85.
Figure 89:
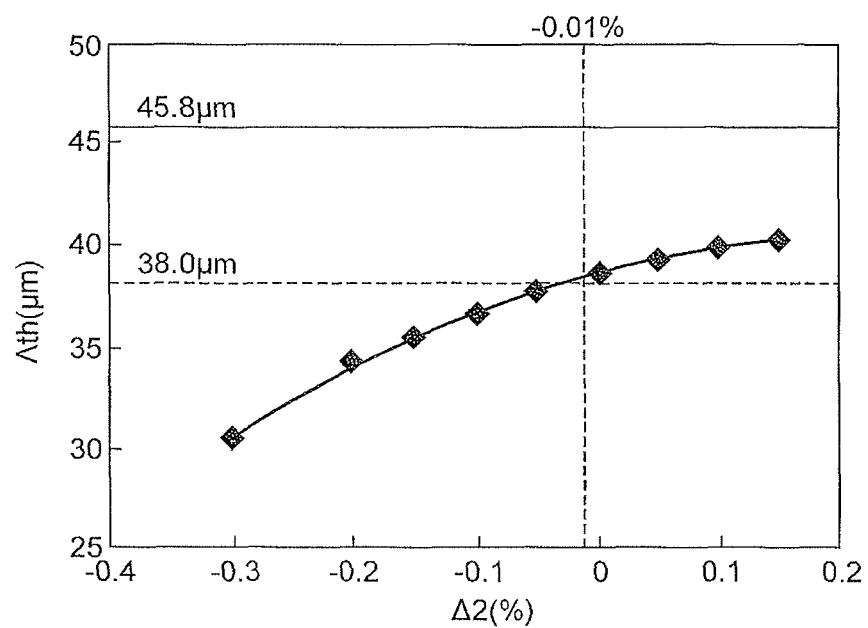
FIG. 89 is a drawing showing a relation between Δ2 and $\Lambda_{th}$ in the same trench type cores as in FIG. 85.
Figure 90:
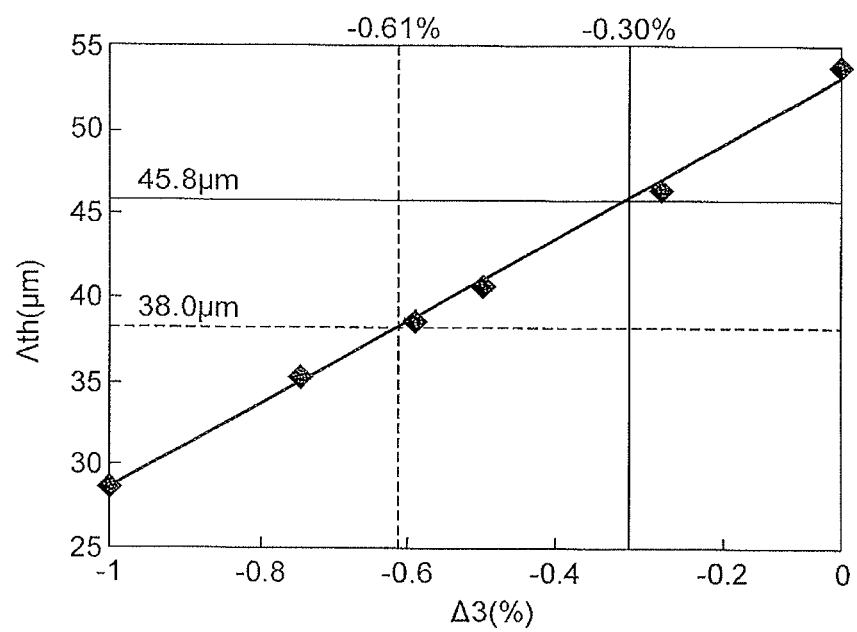
FIG. 90 is a drawing showing a relation between Δ3 and $\Lambda_{th}$ in the same trench type cores as in FIG. 85.
Figure 91:
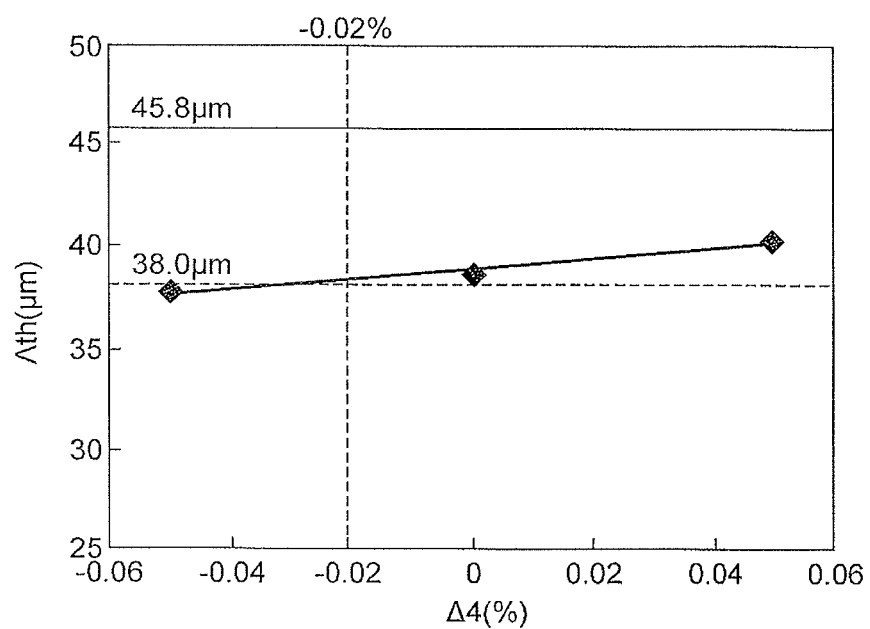
FIG. 91 is a drawing showing a relation between Δ4 and $\Lambda_{th}$ in the same trench type cores as in FIG. 85.

A further necessary condition in addition to the above conditions for keeping $\Lambda_{th}$ smaller than in the case of the step-index type core with $A_{eff}=130$ μm² and $\lambda_{CC}=1460$ nm can be, in the case of $\Lambda_{th}$ at the wavelength of 1565 nm, that $\Lambda_{th}$ is not more than about 45.8 μm. FIGS. 85 to 91 show the results of investigation on relations between each of the parameters of the trench type core and $\Lambda_{th}$ at the wavelength of 1565 nm under the design center conditions of 2a=12.4 μm, Ra=0.6, Rb=0.673, Δ1=0.22%, Δ2=0%, Δ3=−0.59%, and Δ4=0%. FIG. 85 is a drawing showing the relation between 2a and $\Lambda_{th}$; FIG. 86 a drawing showing the relation between Ra and $\Lambda_{th}$; FIG. 87 a drawing showing the relation between 1/Rb and $\Lambda_{th}$; FIG. 88 a drawing showing the relation between Δ1 and $\Lambda_{th}$; FIG. 89 a drawing showing the relation between Δ2 and $\Lambda_{th}$; FIG. 90 a drawing showing the relation between Δ3 and $\Lambda_{th}$; FIG. 91 a drawing showing the relation between Δ4 and $\Lambda_{th}$. It is confirmed from these results that the necessary condition for $\Lambda_{th}$ to satisfy about 45.8 μm or less is as follows:

$\Delta 3(\%) \leq -0.30.$

Therefore, it is more preferable to adopt a structure satisfying the structure (iii. 2):

$11.7 \leq 2a(\mu m) \leq 12.4;$ $0.596 \leq Ra \leq 0.699;$ $0.618 \leq Rb \leq 0.777;$ $0.18 \leq \Delta 1(\%) \leq 0.22;$ $-0.05 \leq \Delta 2(\%) \leq 0.02$ $0.59 \leq \Delta 3(\%) \leq -0.30;$ $-0.01 \leq \Delta 4(\%) \leq 0.04.$ The present invention provides the multi-core optical fibers with increased transmission capacities in the respective cores.

The above described the embodiments of the present invention and it should be noted that the present invention is by no means limited to the above embodiments but can be modified in many ways.

What is claimed is:

1. A multi-core optical fiber comprising a plurality of cores, the multi-core optical fiber satisfying at least one of first to third conditions, wherein the first condition is defined by satisfying at least either of relations of Expressions (1) and (2) below at a wavelength of 1550 nm, when a first core represents a core with a largest crosstalk from other core, D [ps/(nm·km)] represents a chromatic dispersion of the first core, $A_{eff}$ [μm²] represents an effective area of the first core, $\alpha_{dB}$ [dB/km] represents a transmission loss of the first core, $\eta_{WC}$ [/km] represents a sum of power coupling coefficients to the first core from the other cores, $\mu_{X,WC}^{[dB]}$ [dB] represents a sum of statistical averages of crosstalks to the first core from the other cores after 80 km propagation, $$\eta_{WC} \leq 1.57 \times 10^{-5} \left[ 0.71 - 1.39 \frac{(10^{10\alpha_{dB}} - 1)}{(|D|A_{eff}^2 \alpha_{dB} 10^{10\alpha_{dB}})^{\frac{1}{3}}} \right] \quad (1)$$

$$-49.3 \leq \frac{10}{3} \log_{10} \left[ |D|A_{eff}^2 \frac{\alpha_{dB} 10^{8\alpha_{dB}}}{(10^{8\alpha_{dB}} - 1)^3} \right] + \mu_{X,WC}^{[dB]} \leq -31.8, \quad (2)$$

wherein the second condition is defined by:

a fundamental mode in each of the plurality of cores having an effective area of not less than 120 μm² at the wavelength of 1550 nm, a transmission loss of not more than 0.195 dB/km at the wavelength of 1550 nm, a chromatic dispersion of not less than about 17 ps/(nm·km) at the wavelength of 1550 nm, and a bending loss per 100 turns of not more than 0.5 dB in a bending radius of 30 mm at a wavelength of 1625 nm;

a difference of the transmission loss of the fundamental mode at the wavelength of 1550 nm between different cores out of the plurality of cores, the difference being at most 0.02 dB/km or less; and a sum of statistical averages of crosstalks to a core from other cores out of the plurality of cores after 80 km propagation, the sum being not more than −32.9 dB, and wherein the third condition is defined by:

a fundamental mode in each of the plurality of cores having an effective area of not less than 80 μm² at the wavelength of 1550 nm, a transmission loss of not more than 0.195 dB/km at the wavelength of 1550 nm, a chromatic dispersion of not less than about 17 ps/(nm·km) at the wavelength of 1550 nm, and a bending loss per 100 turns of not more than 0.5 dB in a bending radius of 30 mm at the wavelength of 1625 nm;

a difference of the transmission loss of the fundamental mode at the wavelength of 1550 nm between different cores out of the plurality of cores, the difference being at most 0.02 dB/km or less; and a sum of statistical averages of crosstalks to a certain core from other cores out of the plurality of cores after 80 km propagation, the certain core representing a core with a largest crosstalk from other cores, the sum being not less than −53.4 dB and not more than −33.9 dB.

2. The multi-core optical fiber according to claim 1, wherein when κ represents a mode coupling coefficient between different cores out of the plurality of cores, Λ represents a core pitch, and β represents a propagation constant of each core, $\Lambda_{th}$ is defined as Λ satisfying Expression (3) below:

$$\frac{\kappa^2}{\Lambda} = \frac{\beta}{12} 10^{-6}, \quad (3)$$

wherein the plurality of cores include a core of a structure satisfying any one of said $\Lambda_{th}$ of not more than 44.4 μm at the wavelength of 1550 nm, said $\Lambda_{th}$ of not more than 44.9 μm at the wavelength of 1565 nm, and said $\Lambda_{th}$ of not more than 46.7 μm at the wavelength of 1625 nm, and wherein the shortest Λ between different cores out of the plurality of cores is not less than said $\Lambda_{th}$.

3. The multi-core optical fiber according to claim 1, wherein a core neighboring region including at least any one of the plurality of cores has a trench type structure comprised of:

a cladding surrounding an outer peripheral surface of the core and having a refractive index lower than the core;

a trench layer provided between the core and the cladding and having a refractive index lower than the cladding; and an inner cladding layer provided between the trench layer and the core and having a refractive index higher than the trench layer and lower than the core.

4. The multi-core optical fiber according to claim 1, which has a cable cutoff wavelength of not more than 1530 nm.

5. The multi-core optical fiber according to claim 4, which has the cable cutoff wavelength of not less than 1460 nm.

6. The multi-core optical fiber according to claim 1, which has the cable cutoff wavelength of not less than 1360 nm and not more than 1460 nm.

7. The multi-core optical fiber according to claim 1, wherein a core neighboring region including at least any one of the plurality of cores is comprised of:

a cladding surrounding an outer peripheral surface of the core and having a refractive index lower than the core;

a trench layer provided between the core and the cladding and having a refractive index lower than the cladding; and an inner cladding layer provided between the trench layer and the core and having a refractive index higher than the trench layer and lower than the core, and wherein when Ra represents a ratio of an outside diameter of the core to an outside diameter of the inner cladding layer, Δ1 a relative index difference of the core with respect to a certain refractive index, Δ3 a relative index difference of the trench layer with respect to the certain refractive index, and Δ4 a relative index difference of the cladding with respect to the certain refractive index, said Ra, Δ1, Δ3, and Δ4 satisfy either:

a first relation that Ra is not less than about 0.5, and, Δ3−Δ4 is not more than about −0.53%, and, Δ1−Δ4 is not more than about 0.28%; or, a second relation that Ra is not less than about 0.6, and Δ3−Δ4 is not more than about −0.51%, and, Δ1−Δ4 is not more than about 0.30%.

8. The multi-core optical fiber according to claim 1, wherein a core neighboring region including at least any one of the plurality of cores is comprised of:

a cladding surrounding an outer peripheral surface of the core and having a refractive index lower than the core;

a trench layer provided between the core and the cladding and having a refractive index lower than the cladding; and an inner cladding layer provided between the trench layer and the core and having a refractive index higher than the trench layer and lower than the core, and wherein when 2a represents an outside diameter of the core, Ra a ratio of the outside diameter 2a of the core to an outside diameter of the inner cladding layer, Rb a ratio of the outside diameter of the inner cladding layer to an outside diameter of the trench layer, Δ1 a relative index difference of the core with respect to a certain refractive index, Δ2 a relative index difference of the inner cladding layer with respect to the certain refractive index, Δ3 a relative index difference of the trench layer with respect to the certain refractive index, and Δ4 a relative index difference of the cladding with respect to the certain refractive index, said 2a, Ra, Rb, Δ1, Δ2, Δ3, and Δ4 satisfy the following relations:

$12.1 \leq 2a(\mu m) \leq 13.3;$ $0.496 \leq Ra \leq 0.739;$ $0.713 \leq Rb;$ $0.21 \leq \Delta 1(\%) \leq 0.28;$ $-0.07 \leq \Delta 2(\%) \leq 0.04;$ $-1.62 \leq \Delta 3(\%);$ $-0.02 \leq \Delta 4(\%) \leq 0.05.$ 9. The multi-core optical fiber according to claim 8, wherein a core pitch between the plurality of cores is not less than 43.3 μm.

10. The multi-core optical fiber according to claim 1, wherein a core neighboring region including at least any one of the plurality of cores is comprised of:

a cladding surrounding an outer peripheral surface of the core and having a refractive index lower than the core;

a trench layer provided between the core and the cladding and having a refractive index lower than the cladding; and an inner cladding layer provided between the trench layer and the core and having a refractive index higher than the trench layer and lower than the core, and wherein when 2a represents an outside diameter of the core, Ra a ratio of the outside diameter 2a of the core to an outside diameter of the inner cladding layer, Rb a ratio of the outside diameter of the inner cladding layer to an outside diameter of the trench layer, Δ1 a relative index difference of the core with respect to a certain refractive index, Δ2 a relative index difference of the inner cladding layer with respect to the certain refractive index, Δ3 a relative index difference of the trench layer with respect to the certain refractive index, and Δ4 a relative index difference of the cladding with respect to the certain refractive index, said 2a, Ra, Rb, Δ1, Δ2, Δ3, and Δ4 satisfy the following relations:

$11.7 \leq 2a(\mu m) \leq 12.4;$ $0.596 \leq Ra \leq 0.699;$ $0.618 \leq Rb \leq 0.787;$ $0.18 \leq \Delta 1(\%) \leq 0.22;$ $-0.05 \leq \Delta 2(\%) \leq 0.02;$ $-0.59 \leq \Delta 3(\%) \leq -0.25;$ $-0.01 \leq \Delta 4(\%) \leq 0.04.$ 11. The multi-core optical fiber according to claim 10, wherein a core pitch between the plurality of cores is not less than 34.9 μm.

12. The multi-core optical fiber according to claim 1, wherein a core neighboring region including at least any one of the plurality of cores is comprised of:

a cladding surrounding an outer peripheral surface of the core and having a refractive index lower than the core;

a trench layer provided between the core and the cladding and having a refractive index lower than the cladding; and an inner cladding layer provided between the trench layer and the core and having a refractive index higher than the trench layer and lower than the core, and wherein when 2a represents an outside diameter of the core, Ra a ratio of the outside diameter 2a of the core to an outside diameter of the inner cladding layer, Rb a ratio of the outside diameter of the inner cladding layer to an outside diameter of the trench layer, Δ1 a relative index difference of the core with respect to a certain refractive index, Δ2 a relative index difference of the inner cladding layer with respect to the certain refractive index, Δ3 a relative index difference of the trench layer with respect to the certain refractive index, and Δ4 a relative index difference of the cladding with respect to the certain refractive index, said 2a, Ra, Rb, Δ1, Δ2, Δ3, and Δ4 satisfy the following relations:

$11.7 \leq 2a(\mu m) \leq 13.2;$ $0.537 \leq Ra \leq 0.704;$ $0.623 \leq Rb \leq 0.792;$ $0.20 \leq \Delta 1(\%) \leq 0.26;$ $-0.06 \leq \Delta 2(\%) \leq 0.10$ $-0.83 \leq \Delta 3(\%) \leq -0.32;$ $-0.03 \leq \Delta 4(\%) \leq 0.02.$ 13. The multi-core optical fiber according to claim 12, wherein a core pitch between the plurality of cores is not less than 38.7 μm.

* * * * *